US012463684B2

(12) United States Patent
Kumagai et al.

(10) Patent No.: US 12,463,684 B2
(45) Date of Patent: Nov. 4, 2025

(54) REFLECT ARRAY AND WIRELESS COMMUNICATION APPARATUS

(71) Applicant: AGC Inc., Tokyo (JP)

(72) Inventors: Akira Kumagai, Tokyo (JP); Kotaro Enomoto, Tokyo (JP); Osamu Kagaya, Tokyo (JP); Yutaka Ui, Tokyo (JP)

(73) Assignee: AGC Inc., Tokyo (JP)

( * ) Notice: Subject to any disclaimer, the term of this patent is extended or adjusted under 35 U.S.C. 154(b) by 30 days.

(21) Appl. No.: 18/401,820

(22) Filed: Jan. 2, 2024

(65) Prior Publication Data

US 2024/0137075 A1  Apr. 25, 2024
US 2024/0235619 A9  Jul. 11, 2024

Related U.S. Application Data

(63) Continuation of application No. PCT/JP2022/026867, filed on Jul. 6, 2022.

(30) Foreign Application Priority Data

Jul. 9, 2021 (JP) .................................. 2021-114605
Jan. 27, 2022 (JP) .................................. 2022-011317

(51) Int. Cl.
*H04B 7/04* (2017.01)
*H01Q 5/378* (2015.01)

(52) U.S. Cl.
CPC ......... *H04B 7/04013* (2023.05); *H01Q 5/378* (2015.01)

(58) Field of Classification Search
CPC .. H04B 7/04013; H01Q 5/378; H01Q 15/148; H01Q 3/46

(Continued)

(56) References Cited

U.S. PATENT DOCUMENTS 5,136,269 A * 8/1992 Seitzer ............... H01P 1/20363
                                                      333/204
9,306,276 B2 * 4/2016 Shi ........................ H01Q 5/371
(Continued)

FOREIGN PATENT DOCUMENTS

JP    2010-233025 A    10/2010
JP    2013-62802 A     4/2013
JP    6755179 B2       9/2020

OTHER PUBLICATIONS

Shao Qianqian et al, "Low-loss Reflectarray Element with Continuously Tunable Reflection Phase", 2021 International Conference On Microwave and Millimeter Wave Technology (ICMMT), IEEE, May 23, 2021 (May 23, 2021), pp. 1-3.

(Continued)

Primary Examiner — Emmanuel Bayard
(74) Attorney, Agent, or Firm — Oblon, McClelland, Maier & Neustadt, L.L.P.

(57) ABSTRACT

A reflect array that sets a reflection angle of a radio wave to an angle that is different from an angle of specular reflection. The reflect array includes a plurality of cells arranged in an array. Each of the plurality of cells includes at least two main resonant elements and a parasitic resonant element coupled to the at least two main resonant elements. The parasitic resonant element is configured to adjust a resonant frequency of the parasitic resonant element and adjust a reflection phase of a surface of the reflect array by adjusting a resonant frequency of the at least two main resonant elements each adjacent to the parasitic resonant element, to which the parasitic resonant element is coupled.

21 Claims, 32 Drawing Sheets

(58) Field of Classification Search
USPC .......................................................... 375/262
See application file for complete search history.

(56) References Cited

U.S. PATENT DOCUMENTS

| | | | |
|---|---|---|---|
| 10,224,626 B1* | 3/2019 | Pajona ................. | H04B 7/0404 |
| 10,389,334 B2* | 8/2019 | Lee ......................... | H01L 23/34 |
| 2007/0126532 A1* | 6/2007 | Mikami .................... | H01P 1/16 |
| | | | 333/204 |
| 2008/0042244 A1* | 2/2008 | Anzue ................. | H01L 21/0254 |
| | | | 257/E25.001 |
| 2013/0076579 A1* | 3/2013 | Zhang .................... | H01Q 1/521 |
| | | | 343/834 |
| 2013/0241770 A1 | 9/2013 | Legay et al. | |
| 2013/0293425 A1* | 11/2013 | Zhu ........................ | H01Q 1/521 |
| | | | 343/702 |
| 2016/0233971 A1* | 8/2016 | Fink ........................ | H04W 4/80 |
| 2022/0344816 A1* | 10/2022 | Coutts ..................... | H01Q 3/26 |
| 2023/0057121 A1* | 2/2023 | Prasannakumar ..... | H01Q 1/521 |
| 2023/0178879 A1* | 6/2023 | Prasannakumar ..... | H01Q 1/521 |
| | | | 343/848 |

OTHER PUBLICATIONS

Chang Tin et al, "Microstrip Reflectarray With QUAD-EMC Element", IEEE Transactions On Antennas and Propagation, IEEE, USA, vol. 53, No. 6, Jun. 1, 2005 (Jun. 1, 2005), pp. 1993-1997.

* cited by examiner

FIG.8
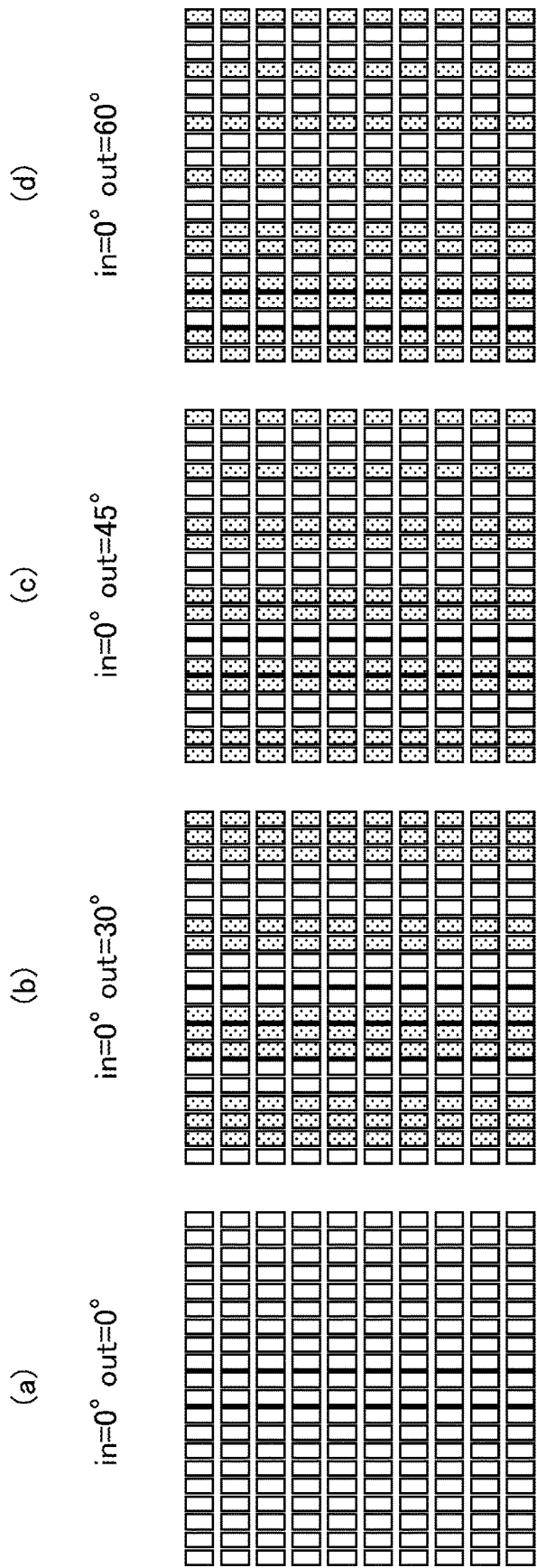
(a) in=0° out=0°
(b) in=0° out=30°
(c) in=0° out=45°
(d) in=0° out=60°
ALL PINS ARE OFF

<COMPARATIVE EXAMPLE>

(a) <COMPARATIVE EXAMPLE>   (b)

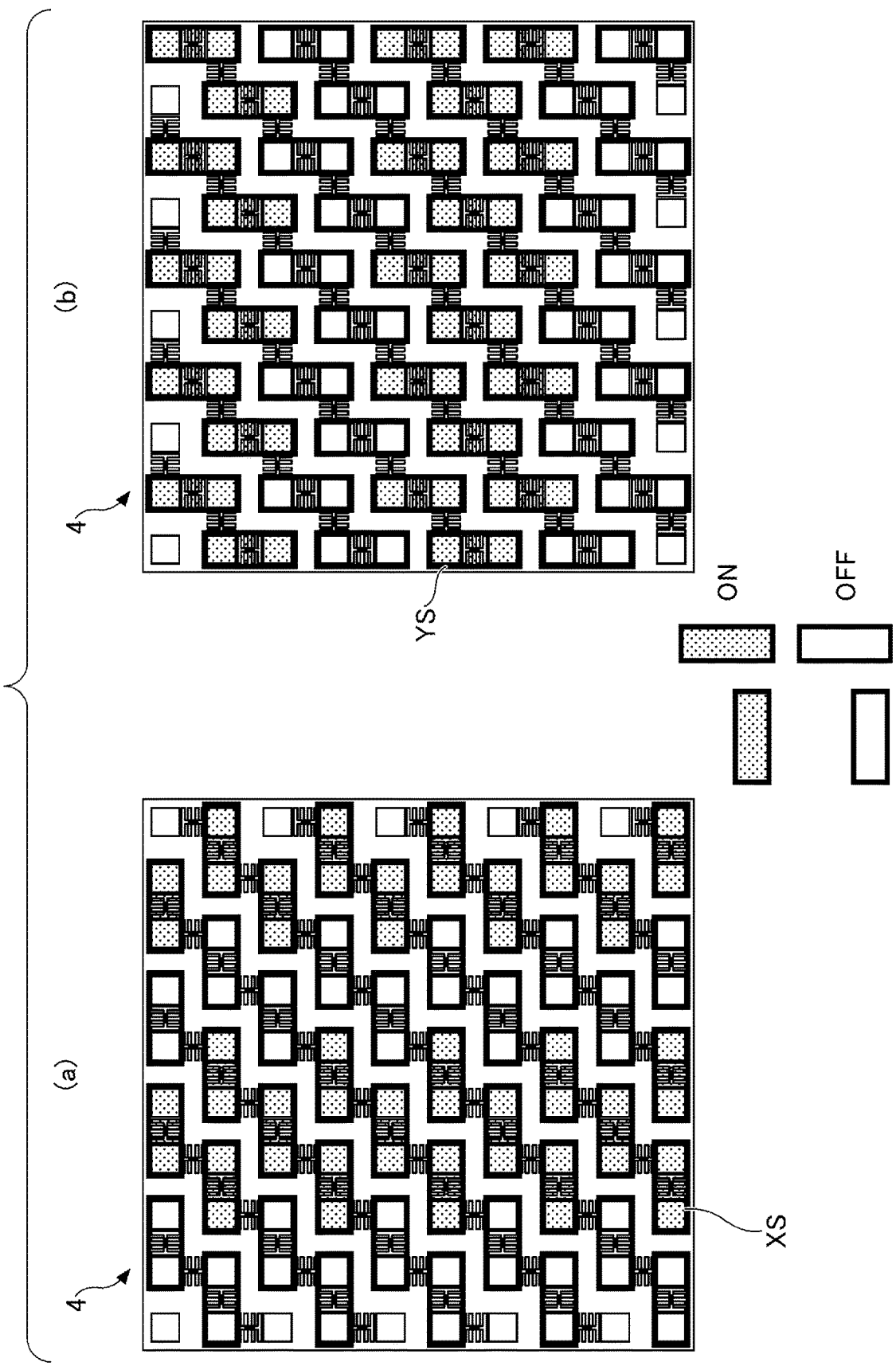

REFLECT ARRAY AND WIRELESS COMMUNICATION APPARATUS

CROSS-REFERENCE TO RELATED APPLICATION

The present application is a continuation application of International Application No. PCT/JP2022/026867, filed Jul. 6, 2022, which claims priority to Japanese Patent Applications No. 2021-114605 filed Jul. 9, 2021 and No. 2022-011317 filed Jan. 27, 2022. The contents of these applications are incorporated herein by reference in their entirety.

BACKGROUND OF THE INVENTION

1. Field of the Invention

The present invention relates to a reflect array and a wireless communication apparatus including the reflect array.

2. Description of the Related Art

Conventionally, there has been known a technique related to a directional array such as a reflect array for adjusting and reflecting a radio wave from a base station. For example, Japanese Patent No. 6755179 proposes a wave shaping device that adjusts a reflection direction by using a coupling between a resonator and a parasitic resonator.

SUMMARY OF THE INVENTION

Problem to be Solved by the Invention

In the wave shaping device described in Japanese Patent No. 6755179, a reflection direction is adjusted by an array in which a plurality of cells (see FIG. 1) each including one parasitic resonator and one diode for adjusting a resonant frequency of the parasitic resonator are arranged for one main resonator. In this configuration, the reflection direction is adjusted with respect to a vertically polarized wave. Because the same number of parasitic resonators and diodes as the number of main resonators are provided in the cells of the array, the number of components per one polarization direction of the polarized wave increases.

The present disclosure provides a reflect array and a wireless communication apparatus that can reduce the number of the parasitic resonant elements relative to the number of the main resonant elements in the array.

Means for Solving the Problem

According to an aspect of the present disclosure, a reflect array that sets a reflection angle of a radio wave to an angle that is different from an angle of specular reflection, the reflect array including a plurality of cells arranged in an array, each of the plurality of cells including at least two main resonant elements and a parasitic resonant element coupled to the at least two main resonant elements, and the parasitic resonant element being configured to adjust a resonant frequency of the parasitic resonant element and adjust a reflection phase of a surface of the reflect array by adjusting a resonant frequency of the at least two main resonant elements each adjacent to the parasitic resonant element, to which the parasitic resonant element is coupled; and a wireless communication apparatus having the reflect array, are provided.

Effect of the Invention

According to the present disclosure, in a reflect array, a number of parasitic resonant elements relative to a number of main resonant elements in an array can be reduced.

BRIEF DESCRIPTION OF THE DRAWINGS

Other objects and further features of the present disclosure will be apparent from the following detailed description when read in conjunction with the accompanying drawings, in which:

FIG. 8 is a diagram for explaining a voltage application pattern of cells arranged in the reflect array according to the first embodiment;

FIG. 34 is a diagram for explaining a voltage application pattern for a sub-array in the reflect array of the fourth embodiment.

DESCRIPTION OF THE EMBODIMENT

Figure 1:
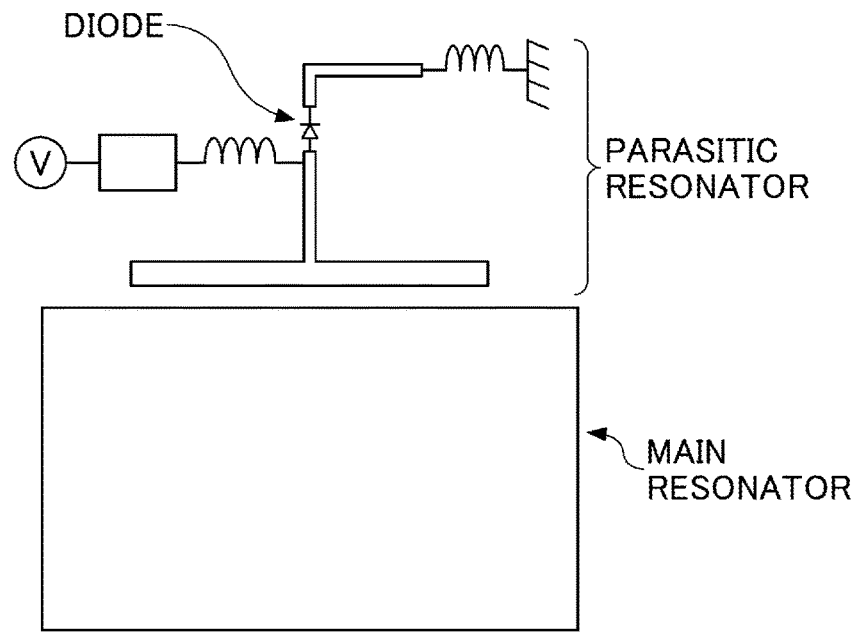
FIG. 1 is a diagram illustrating an example of a cell in which one parasitic resonator and one diode are provided for one main resonator according to a conventional example.

Hereinafter, embodiments of the present invention will be described with reference to the drawings. For ease of understanding, the scale of each member in the drawings may be different from the actual scale. In directions such as parallel, right angle, orthogonal, horizontal, vertical, up-down, left-right, and the like, shifts are allowed to such an extent that the functions and effects of the embodiment are not impaired. The shape of the corner is not limited to a right angle and may be rounded in an arcuate shape. Parallel, perpendicular, orthogonal, horizontal, and vertical may include substantially parallel, substantially perpendicular, substantially orthogonal, substantially horizontal, and substantially vertical, respectively.

In the present specification, a three-dimensional orthogonal coordinate system having three axis directions (an X-axis direction, a Y-axis direction, and a Z-axis direction) is used, a width direction of a wall is defined as the X-axis direction, a height direction of the wall is defined as the Y-axis direction, and a thickness direction of the wall is defined as the Z-axis direction. The direction from the bottom to the top of the wall is defined as a +Y-axis direction, and an opposite direction thereto is defined as a −Y-axis direction. The direction from the indoor side to the outdoor side is defined as a +Z-axis direction, and an opposite direction thereto is defined as a −Z-axis direction. In the following description of FIGS. 4 and 5, the +Y-axis direction may be referred to as "above" and the −Y-axis direction may be referred to as "below". The +Z-axis direction may be referred to as an outdoor side, and the −Z-axis direction may be referred to as an indoor side.

The X-axis direction, the Y-axis direction, and the Z-axis direction represent a direction parallel to the X-axis, a direction parallel to the Y-axis, and a direction parallel to the Z-axis, respectively. The X-axis direction, the Y-axis direction, and the Z-axis direction are orthogonal to each other. The XY plane, the YZ plane, and the ZX plane represent a virtual plane parallel to the X-axis direction and the Y-axis direction, a virtual plane parallel to the Y-axis direction and the Z-axis direction, and a virtual plane parallel to the Z-axis direction and the X-axis direction, respectively.

<Wireless Communication Apparatus>

Figure 2:
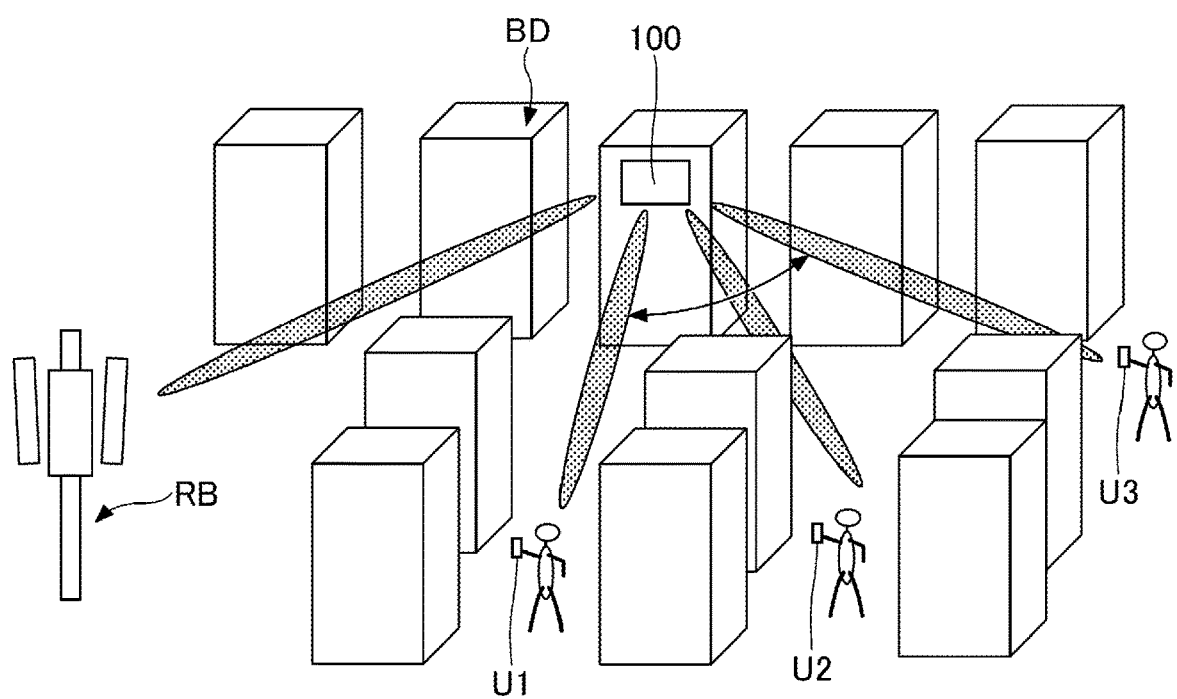
FIG. 2 is a diagram for explaining an operation of a wireless communication apparatus according to an embodiment of the present invention.

FIG. 2 is a diagram for explaining an operation of the wireless communication apparatus according to the embodiment of the present invention.

The wireless communication apparatus 100 of the present invention is disposed on, for example, a wall or a window of an outdoor building BD. The wireless communication apparatus 100 includes a reflect array 1 (see FIG. 3), and the reflect array 1 of the present invention is an array with controllable directivity that is called a reconfigurable intelligent surface (RIS) and can adjust the directivity of a beam.

The wireless communication apparatus 100 is disposed in any type of building BD. For example, the building BD is one of high-rise buildings that stand close together.

In an area where a large number of high-rise buildings stand close together, a dead place where radio waves do not normally reach (an area or a space where a communication environment is not good, also referred to as a "dead zone") is likely to occur. The wireless communication apparatus 100 of the present invention controls a direction of a beam of a reflected radio wave to deliver the radio wave to the dead zone.

Here, in FIG. 2, a radiation mode of a radio wave re-transmitted from the radio relay station RB and a radio wave reflected from the wireless communication apparatus 100 is schematically shown by a hatched region. As shown in FIG. 2, in an area where high-rise buildings stand close together, the radio relay station RB may be provided in order to expand a range in which radio waves can reach outdoors. The radio relay station RB receives and retransmits a radio wave, thereby outputting the radio wave so as to spread the radio wave. The radio relay station RB may be provided near the wireless communication apparatus 100 by about several tens of centimeters to several meters, or may be provided away from the wireless communication apparatus 100 by about several tens of meters to several kilometers.

The wireless communication apparatus 100 of the present invention changes a direction of a beam of an incident radio wave to emit the beam in a specific direction or to form a multi-beam, thereby delivering the radio wave to a dead zone blocked by a building.

As shown in FIG. 2, an outdoor user terminal U1 and an outdoor user terminal U2 can communicate with each other via the wireless communication apparatus 100. To be more specific, for example, radio waves transmitted from the outdoor user terminal U1 are reflected by the wireless communication apparatus 100 and received by the outdoor user terminal U2, whereby communication can be established between the outdoor user terminal U1 and the outdoor user terminal U2.

As shown in FIG. 2, for example, radio waves transmitted from the outdoor user terminal U1 are reflected by the wireless communication apparatus 100 and made incident on the radio relay station RB, whereby the radio waves can be received by the user terminal and the radio base stations via the wireless communication apparatus 100 and the radio relay station RB. Furthermore, radio waves transmitted, for example, from a user terminal and a radio base station are re-transmitted by the radio relay station RB and reflected by the wireless communication apparatus 100, so that the radio waves can be received by a user terminal U3 originally located in the dead zone, via the radio relay station RB and the wireless communication apparatus 100.

Although FIG. 2 shows an example in which the radio relay station RB is provided in addition to the wireless communication apparatus 100, the radio relay station RB may not be provided and the radio wave coming from the radio base station or the like may be directly reflected by the reflect array 1 of the wireless communication apparatus 100.

The radio waves received by the wireless communication apparatus 100 may be used in any communication system such as Long Term Evolution (LTE), LTE-Advanced (LTE-A), fifth generation mobile communication system, Ultra Mobile Broadband (UMB), IEEE802.11 (Wi-Fi (trademark registered)), IEEE802.16 (WiMAX (trademark registered)), IEEE802.20, Ultra-Wideband (UWB), Bluetooth (trademark registered), Low Power Wide Area (LPWA), and other extended communication systems. As the frequency increases, propagation loss according to reflection and diffraction increases, and a dead zone as above is likely to occur. Therefore, the wireless communication apparatus 100 is suitable for communication using a relatively high frequency.

Figure 3:
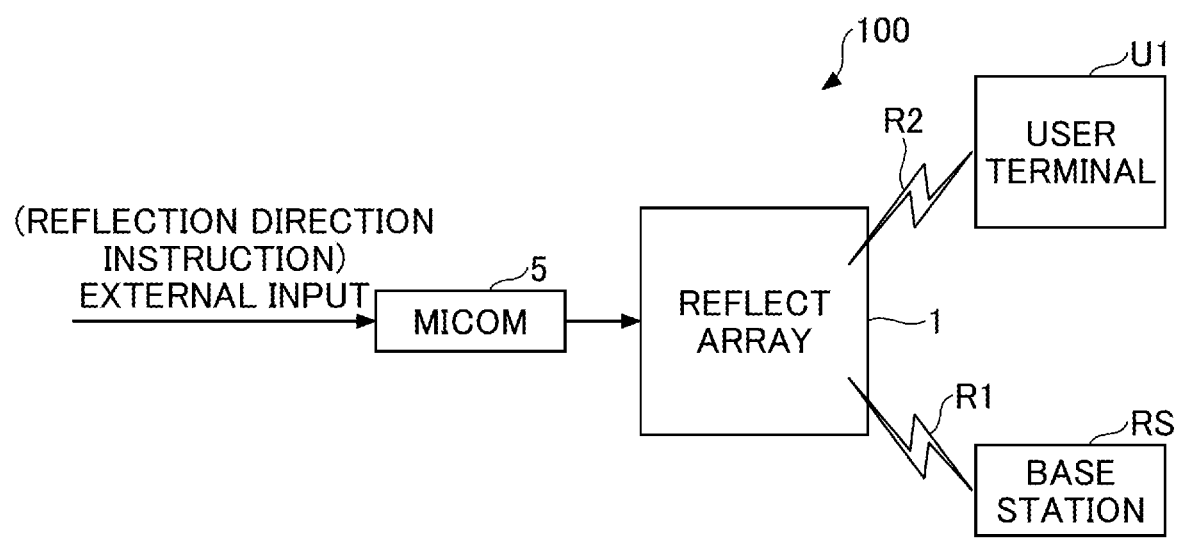
FIG. 3 is a block diagram schematically illustrating a wireless communication apparatus according to the embodiment of the present invention.
Figure 4:
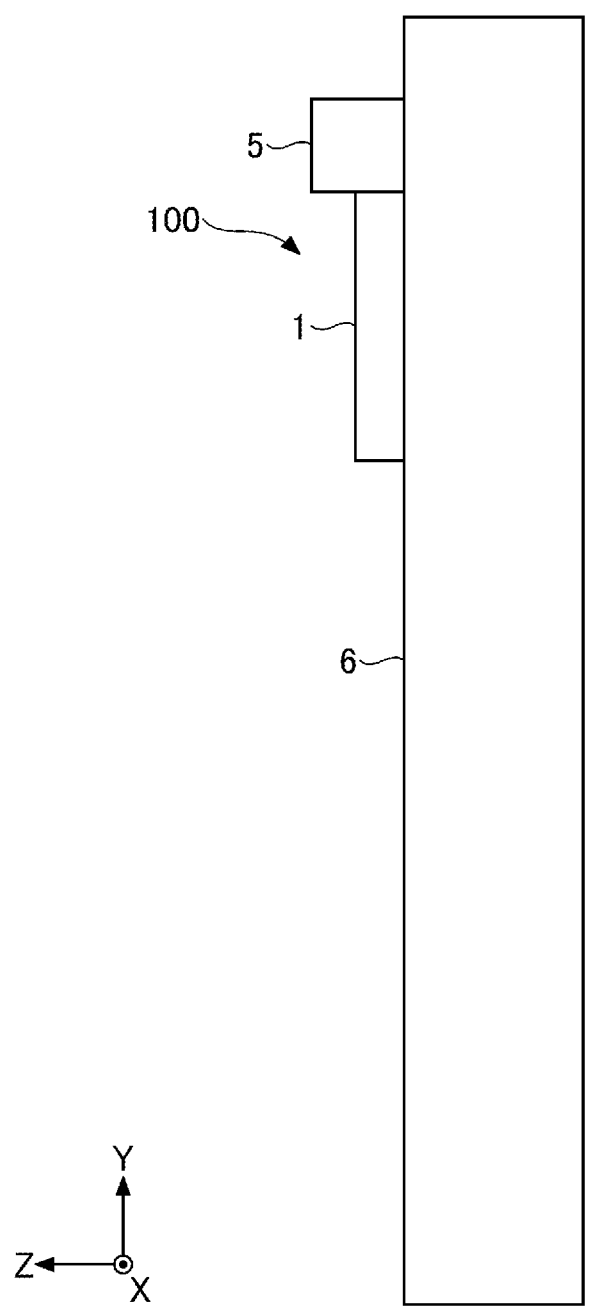
FIG. 4 is a side view schematically illustrating the wireless communication apparatus according to the embodiment of the present invention.

FIG. 3 is a block diagram schematically illustrating a wireless communication apparatus 100 according to the embodiment of the present invention. FIG. 4 is a side view schematically illustrating the wireless communication apparatus 100 according to the embodiment of the present invention.

The wireless communication apparatus 100 includes a reflect array 1 and a controller 5. As shown in FIG. 3, the controller 5 of the present invention is realized, for example, by a microcomputer (MICOM).

The controller 5 receives an input of an incident wave source position (including an arrival direction of a plane wave when set at infinity) and a reflection direction instruction (instruction of directivity) from the outside, and controls a reflection angle of each cell of the plurality of cells of the reflect array 1. The input from the outside of the controller 5 is input, for example, from a management computer (not illustrated) that manages the building BD, or from the user terminal U1. The controller 5 operates based on a power supply voltage generated by a power supply generator (not illustrated).

As shown in FIG. 4, the reflect array 1 and the controller 5 of the wireless communication apparatus 100 of the present invention are provided on a wall 6. Here, the height on the wall 6 of the building BD from the ground at which the wireless communication apparatus 100 is provided is preferably 1 m to 14 m, and particularly preferably 2 m to 10 m, from the viewpoint of the radio wave efficiency.

FIG. 4 illustrates an example in which the wireless communication apparatus 100 is disposed on the wall 6 on the outdoor side. The reflect array 1 in the wireless communication apparatus 100 may be provided on a window glass. When the reflect array 1 is provided on the window glass, the substrate 11 and the conductor 12 (see FIGS. 15 and 16) are preferably formed of a transparent dielectric member (an example of a base material having a visible light transmittance of 50% or more). When the reflect array 1 is provided on the window glass, the controller 5 may be disposed, apart from the reflect array 1, at another position such as a part of the wall adjacent to the window glass or a frame of the window glass.

Furthermore, the wireless communication apparatus 100 of the present invention may be installed on an indoor wall or window glass. In this case, the wireless communication apparatus 100 reduces a dead zone indoors.

<Reflect Array>

Figure 5:
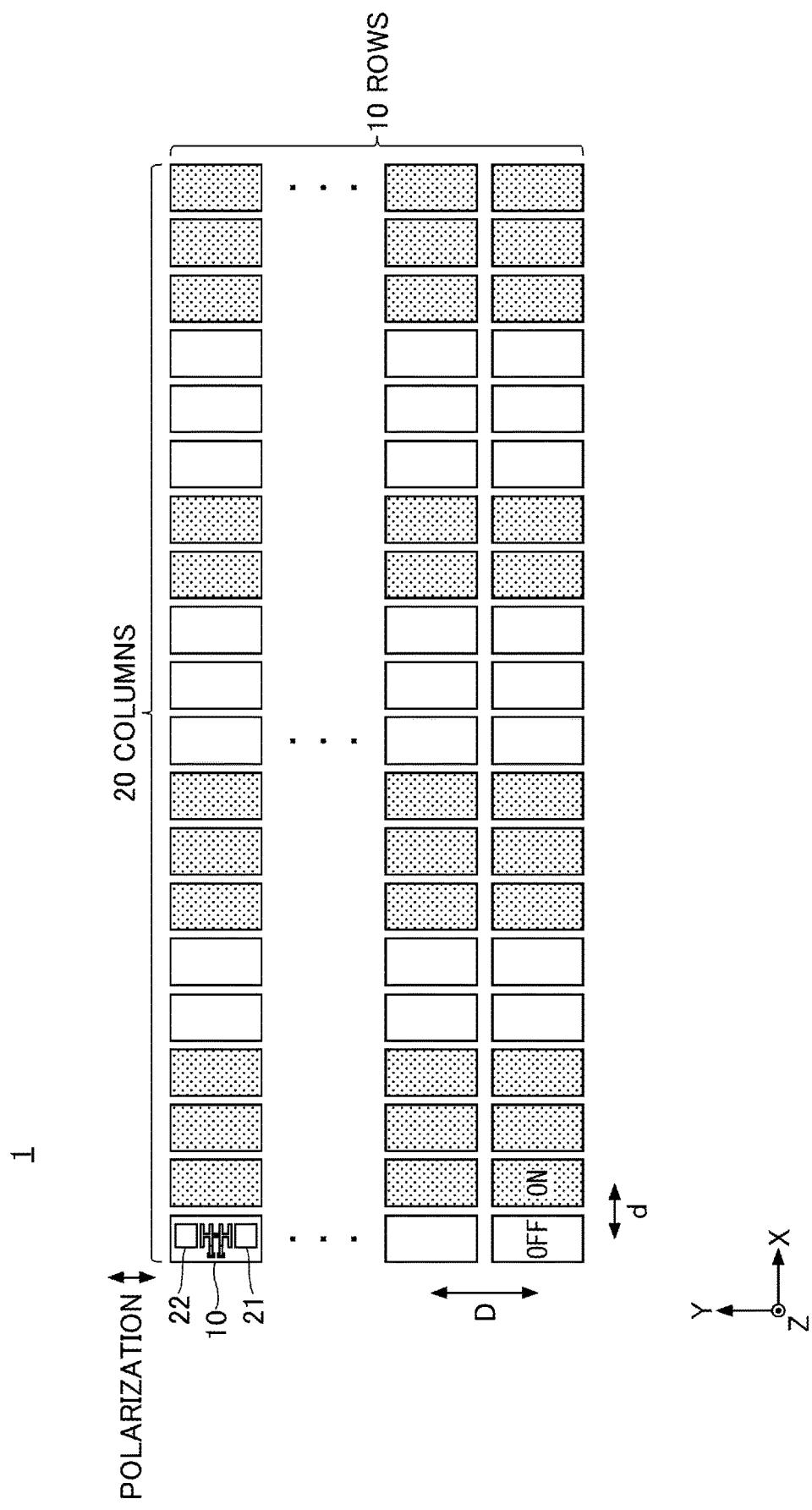
FIG. 5 is a diagram showing an arrangement of a plurality of cells in a reflect array according to a first embodiment of the present invention.

FIG. 5 is a diagram for explaining an arrangement of a plurality of cells in the reflect array 1 according to the first embodiment of the present invention.

As shown in FIG. 5, in the reflect array 1 of the present invention, a plurality of cells 10 are regularly arranged. The cell 10 is a unit cell serving as a repeating unit, and in the example shown in FIG. 5, ten sets of cells are arranged in the vertical direction and twenty sets of cells are arranged in the horizontal direction.

In addition, in the first embodiment, since two main resonant elements 21 and 22, which are reflective elements, are arranged side by side in the vertical direction in each cell 10, each adjacent cell 10 has a vertically long shape in which an inter-cell distance D in the vertical direction, which is an interval in the vertical direction between the center positions of the cells, is longer than an inter-cell distance d in the horizontal direction.

By controlling ON/OFF of the plurality of cells 10 arranged in this manner, the reflect array 1 can set an angle, at which an incident radio wave is reflected, in a desired direction.

The arrangement of the cells 10 in the reflect array 1 shown in FIG. 5 is merely an example, and the number of cells provided in the array may be about several tens to several thousands.

Figure 6:
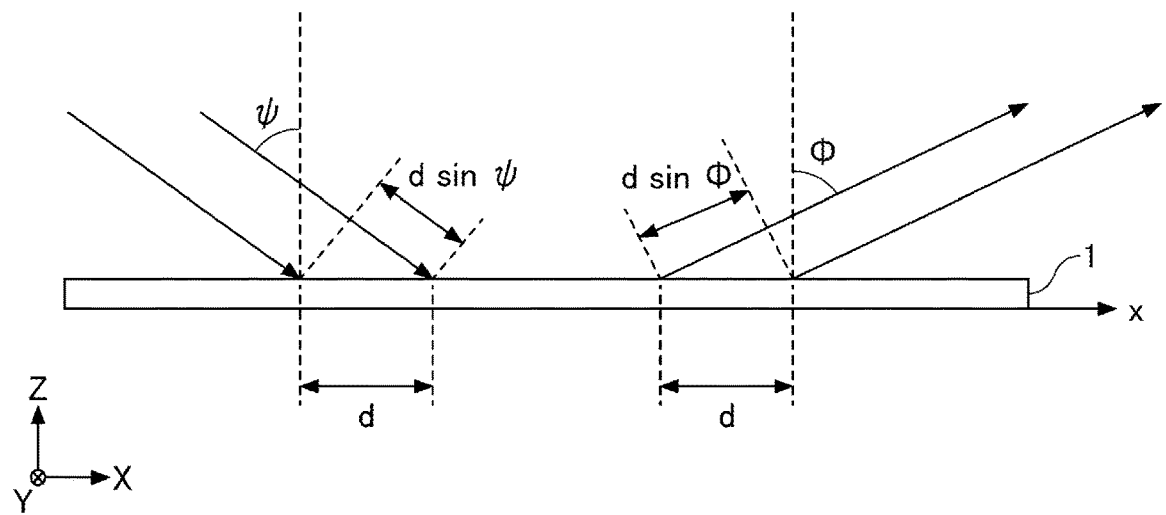
FIG. 6 is a diagram for explaining a mechanism of adjusting a reflection angle in the reflect array of the present invention.
Figure 7:
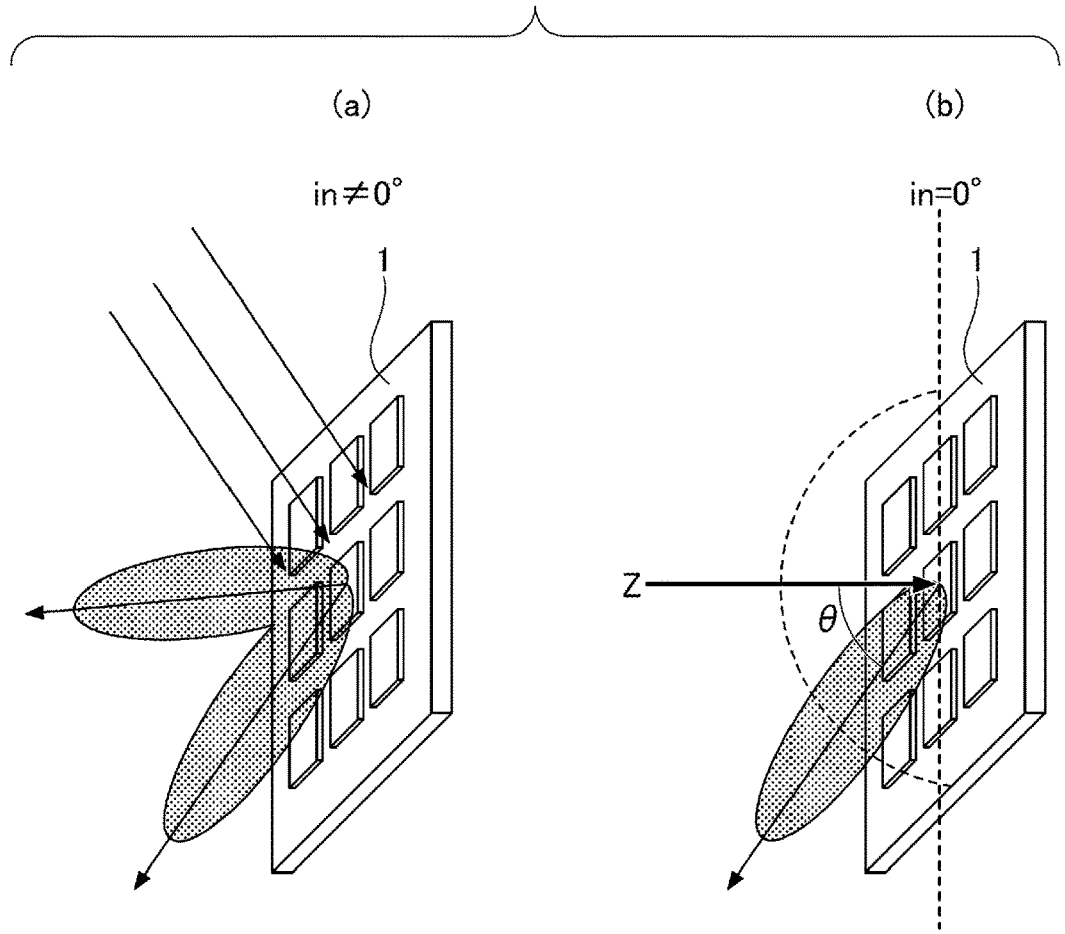
FIG. 7 is a conceptual diagram of a reflection angle of the reflect array of the present invention.

FIG. 6 is a diagram for explaining a mechanism for adjusting the reflection angle in the reflect array of the present invention. FIG. 7 is a conceptual diagram of the reflection angle of the reflect array of the present invention.

The reflect array of the present invention is called a Reconfigurable Intelligent Surface (RIS), which is an array capable of adjusting a directivity of a beam.

In the reflect array 1, when a radio wave is reflected, a phase is changed for each location, that is, for each of the cells 10, which are called unit cells and are arranged in an array, to adjust a direction of a beam which is a reflected radio wave.

Specifically, since the radio wave is obliquely incident on the outer side surface of the cell, a reflection phase is changed in one cell by setting a phase difference of the radio wave reflected by the reflective element (main resonant element) for each location in consideration of the inter-cell distance d. The direction in which the radio wave is reflected can be changed as a whole by making the reflection phase different for each location.

For example, when a plane wave incident along the X-axis is reflected along the X-axis, the reflection direction is changed by adding a phase at each location x. Here, when φ is an incident angle and ϕ is a reflection angle, a phase of an incident wave is represented by –k×sin φ and a phase of a reflected wave is represented by –k×sin ϕ.

As a result, the reflection phase difference for each position x at the time of reflection becomes "–k×(sin ϕ–sin φ)", and if this satisfies a predetermined condition, the reflection direction can be changed. Therefore, in order to change the reflection direction in each cell, it is important to ensure a phase difference of about 180° for the reflected radio wave.

In this way, the wireless communication apparatus 100 according to the present invention can change the direction of the beam of the radio wave emitted from the base stations or the like in the 5G to emit the beam in various directions or a desired direction, or can form a multi-beam.

Although FIG. 6 refers to the case where the wave incident along the X-axis is reflected along the X-axis, the reflect array of the present invention can be used as a reflection plate capable of setting the reflection angle to an angle different from the angle of the specular reflection also when the wave is incident along the Y-axis, when the wave is incident obliquely with respect to the X-axis and the Y-axis, or when a wave different from a plane wave is incident.

FIG. 7A shows a case where the incident angle of the radio wave is inclined with respect to the surface of the reflect array (radio wave incident angle in ≠0°), and FIG. 7B shows a case where the incident angle of the radio wave is perpendicular to the surface of the reflect array (radio wave incident angle in =0°).

FIG. 8 is a diagram for explaining a voltage application pattern of the cells arranged in the reflect array according to the first embodiment of the present invention. In FIGS. 8, (a), (b), (c), and (d) show voltage application patterns when radio waves are incident from the direction of the Z-axis perpendicular to the surface of the reflect array as shown in FIG. 7B, in which (a) in FIG. 8 shows a voltage application pattern when the target angle is 0°, (b) shows a voltage application pattern when the target angle is 30°, (c) shows a voltage application pattern when the target angle is 45°, and (d) shows a voltage application pattern when the target angle is 60°.

In the present invention, a voltage application pattern (ON/OFF pattern) is calculated in a microcomputer for each incident wave source position and target angle as an indication of directivity to the reflect array. As shown in FIG. 7B, the target angle of the reflection angle in the vertical polarization corresponds to the inclination angle θ in the longitudinal direction with respect to the Z-axis which is the incident direction.

In FIG. 8, cells to which a DC voltage is applied, that is, cells 10 in which the PIN diodes 41 (see FIG. 12) are turned ON, among the cells 10 which are a plurality of unit elements, are indicated by hatching.

When the reflection angle is 0°, the radio wave incident from the Z-axis returns in the direction of the Z-axis. In this case, as shown in (a) in FIG. 8, all the cells 10 of the reflect array 1 are in a state where no voltage is applied and all the diodes are OFF. In addition, when in FIG. 8, (b) to (d) are compared, as the reflection angle increases, the interval at which ON/OFF is arranged is found to become narrower in the horizontal direction.

In this embodiment, when the reflection angle is different from 0°, the reflection angle changes in the horizontal direction with respect to the vertically polarized wave.

Thus, by changing the voltage application pattern of the cells in the reflect array 1, the directivity can be adjusted. Furthermore, the directivity can be dynamically changed by changing the voltage application pattern for each time.

The ON/OFF pattern of the cells shown in FIG. 8 is an example, and the ON/OFF pattern of the cells may be changed also in the vertical direction according to the target angle.

Although FIG. 8 shows an example in which ON/OFF is controlled in the vertical direction of the cell and the angle in the horizontal direction is changed with respect to the vertically polarized wave, it is also possible to change the reflection direction to both a vertical side and a horizontal side with respect to the vertically polarized wave by changing the ON/OFF pattern of the cell in the vertical direction.

<Cell Internal Structure of Comparative Example>

Figure 9:
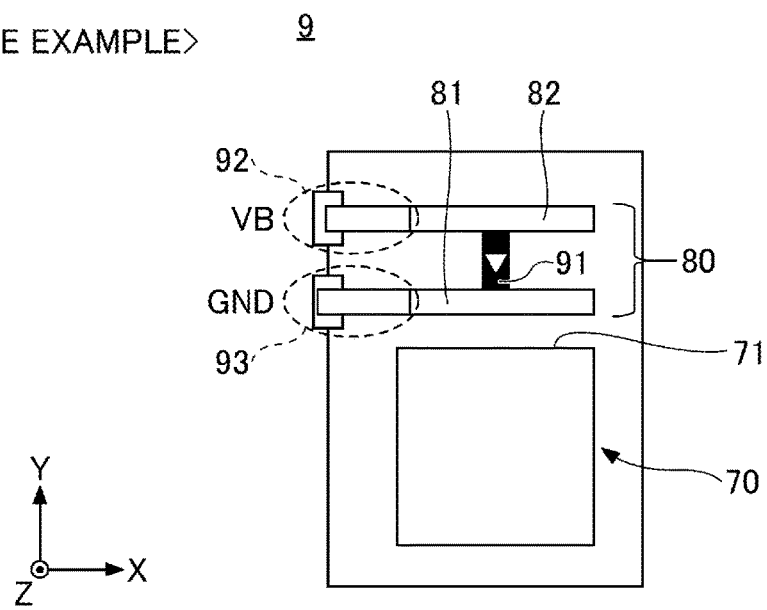
FIG. 9 is a diagram schematically illustrating a main resonant element and a parasitic resonant element of each cell of a reflect array in a comparative example.

FIG. 9 is a diagram schematically illustrating a main resonant element and a parasitic resonant element of each cell of a reflect array in a comparative example.

The cell 9 according to the comparative example includes one main resonant element 70 and one parasitic resonant element 80 adjacent to the one main resonant element 70. The parasitic resonant element 80 is provided with a PIN diode 91 for electrically controlling a resonance value.

In the comparative example, the parasitic resonant element 80 includes a first element part 81 parallel to one side of the main resonant element 70 and adjacent to the main resonant element 70, and a second element part 82 parallel to the first element part 81. In the example of FIG. 9, the first element part 81 is constituted by one linear element, and the second element part 82 is constituted by one linear element.

In the comparative example, the distance between the first element part 81, which is the closest element, and the side 71 of the main resonant element 70 is set such that the parasitic resonant element 80 interacts with the main resonant element 70.

Furthermore, the two element parts 81 and 82 of the parasitic resonant element 80 are coupled by the PIN diode 91. In the parasitic resonant element 80, RF chokes 92 and 93 are provided on both sides of the PIN diode 91 and at ends of the two element parts 81 and 82. A control voltage VB is applied to an open end of one RF choke 92, and the other RF choke 93 is grounded (GND).

Figure 10:
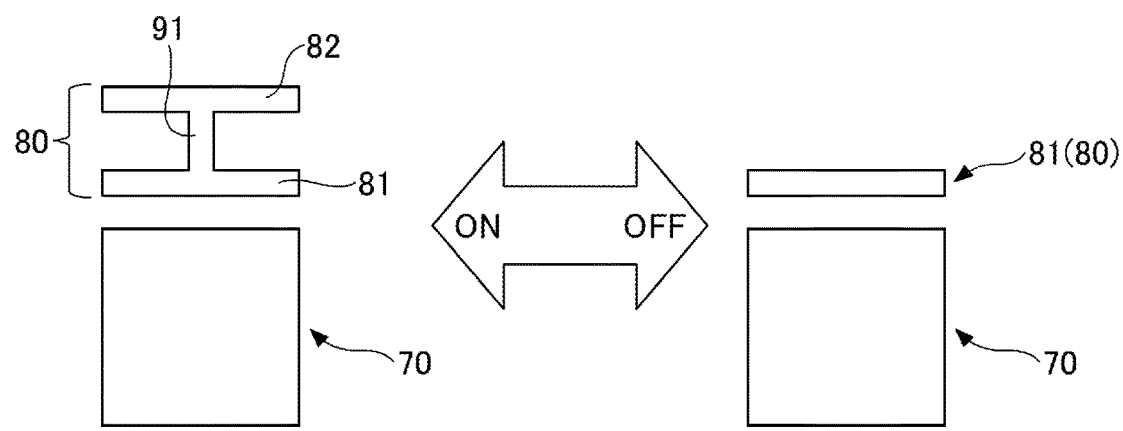
FIG. 10 is a diagram schematically illustrating a first state and a second state of the cell of the comparative example.
Figure 11:
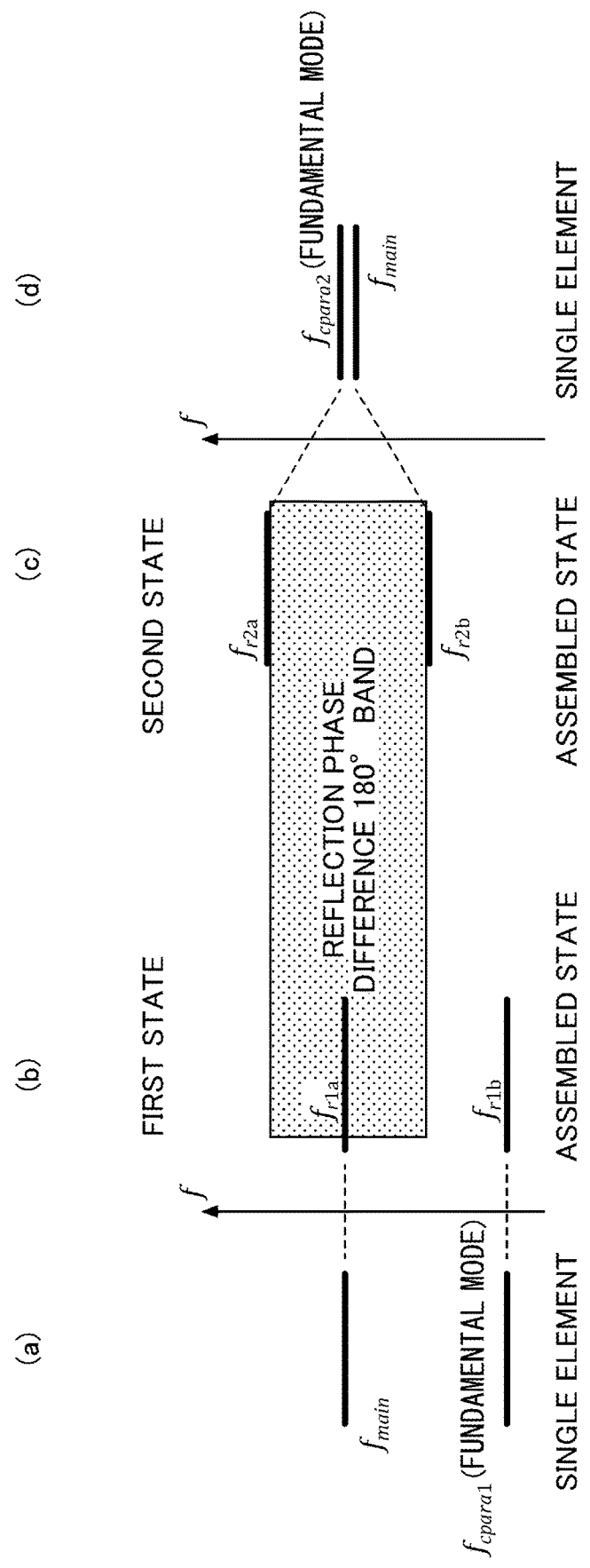
FIG. 11 is a diagram for explaining frequencies of the first state and the second state of the cell of the comparative example.

Here, the state of the cell according to the comparative example will be described with reference to FIGS. 10 and 11. FIG. 10 is a diagram schematically illustrating a first state and a second state of the cell of the comparative example. FIG. 11 is a diagram for explaining frequencies of the first state and the second state of the cell of the comparative example.

In the parasitic resonant element 80 of the comparative example, when the diode 91 is in the ON state, the first element part 81 and the second element part 82 are connected to each other as illustrated in (a) in FIG. 10.

When the diode 91 is in the OFF state, the parasitic resonant element 80 is in a state in which the first element part 81 and the second element part 82 are disconnected from each other. Therefore, in the parasitic resonant element 80, only the first element part 81 close to the main resonant element 70 interacts with the main resonant element 70, and the parasitic resonant element 80 is electrically in the state illustrated in (b) in FIG. 10.

Here, when the state shown in (a) in FIG. is compared with the state shown in (b) in FIG. 10, an element length of the parasitic resonant element 80 in the state shown in (a) in FIG. 10 is longer than the element length in (b). Therefore, when the diode is OFF, the resonant frequency of the parasitic resonant element 80 in the fundamental mode increases as the parasitic resonant element 80 becomes shorter, so that the resonant frequency of the parasitic resonant element in the fundamental mode satisfies the relation fcpara1<fcpara2 as shown in (a) to (d) in FIG. 11.

Here, the parasitic resonant element 80 is mounted assembled to the main resonant element 70 in a distance so that the elements can interact with each other.

Therefore, as shown in (a) in FIG. 11, when the parasitic resonant frequency fcpara1 of the parasitic resonant element as a single element in the OFF-state is far from the main resonant frequency fmain of the main resonant element 70 as a single element, frequencies reconfigured by the interaction in the assembled state are two reconfigured resonant frequencies fr1a and fr1b having substantially the same values as the main resonant frequency of the main resonant element as a single element and the parasitic resonant frequency of the parasitic resonance element as a single element. This state shown in (b) in FIG. 11 will be referred to as a first state of the cell.

When the parasitic resonant frequency fcpara2 of the parasitic resonant element as a single element in the ON state is close to the main resonant frequency fmain of a main resonant element as a single element, as shown in (d) in FIG. 11, in the assembled state, the frequencies reconfigured by the interaction are greatly shifted upward and downward with large changes from the resonant frequencies of the resonant element as a single element, resulting in two reconfigured resonant frequencies fr2a and fr2b that are greatly separated in height. This state shown in (c) in FIG. 11 is referred to as a second state of the cell.

In the states shown in (b) and (c) in FIG. 11 in which the frequencies are reconfigured as described above, the absolute value of the difference (reflection phase difference) between the reflection phase in the first state and the reflection phase in the second state at the frequency of the input radio wave is about 180°.

As described above, since the difference in the reflection phase between the first state and the second state is about 180°, the reflection phase of the cell 9 according to the comparative example can be adjusted, and thus the reflect array in which the cells 9 are arranged can function as a reflection plate capable of adjusting directivity.

As described above, in the known configuration according to the comparative example, one parasitic resonant element and one PIN diode for electrically controlling the parasitic resonant element are provided for one main resonant element in the cell corresponding to the polarized wave in one specific direction (in this example, the vertically polarized wave).

The power consumption of the PIN diode is high and the cost of the component is high. Furthermore, when the number of reflective elements (main resonant elements) per reflect array is large, the number may be about 1000 to 3000.

Even in this case, the number of PIN diodes disposed is the same as the number of the reflective elements, and the PIN diodes are electronic components and therefore have a higher failure frequency than the reflective elements.

Therefore, it is desirable to reduce the number of PIN diodes used per reflective element in order to reduce power consumption by the PIN diodes, reduce cost in the array, and reduce the frequency of component failure.

<Cell Structure According to First Embodiment of Present Invention>

Figure 12:
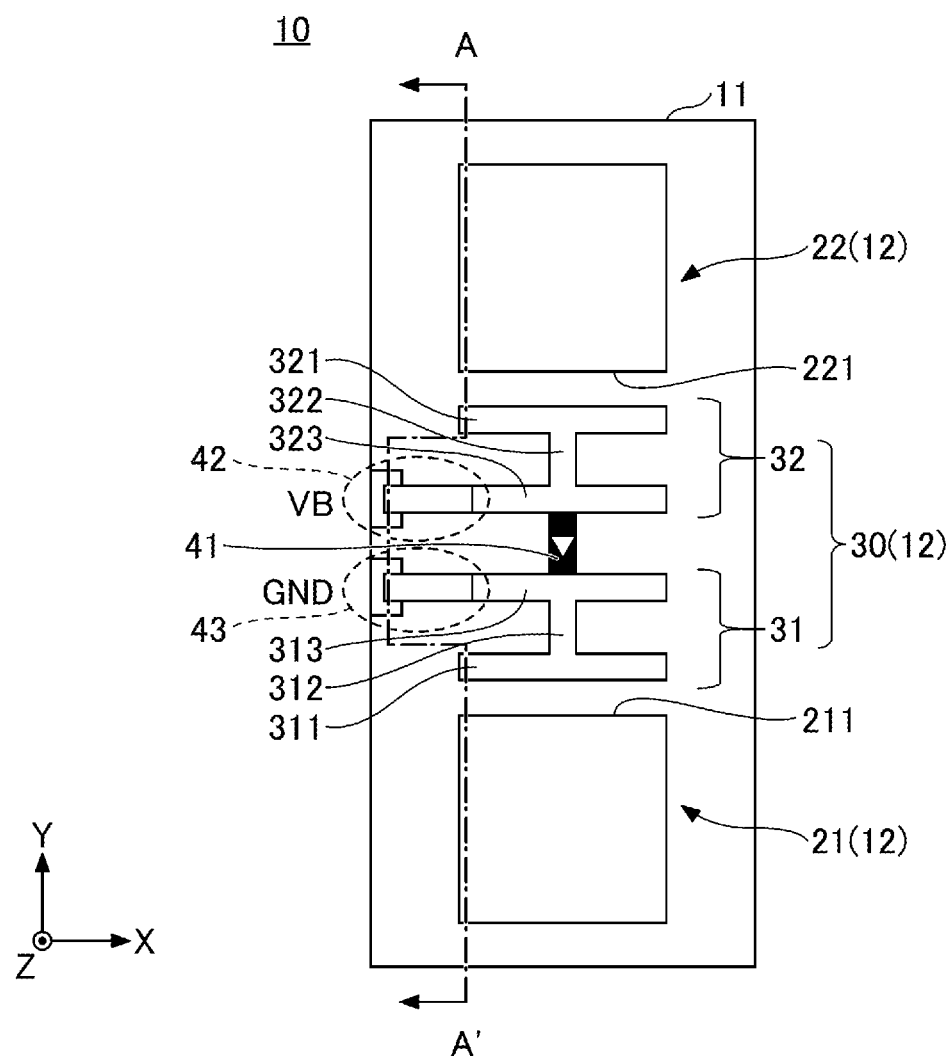
FIG. 12 is a diagram schematically illustrating a main resonant element and a parasitic resonant element of each cell of the reflect array according to the first embodiment of the present invention.

Here, the structure of each cell according to the first embodiment of the present invention will be described with reference to FIGS. 12 to 16. FIG. 12 is a diagram schematically illustrating a main resonant element and a parasitic resonant element of each cell of the reflect array according to the first embodiment of the present invention.

In the present embodiment, each cell 10 of the plurality of cells includes two main resonant elements 21 and 22 and one parasitic resonant element 30 provided between the two main resonant elements 21 and 22 and not in contact with the main resonant elements 21 and 22.

In each cell 10, the main resonant elements 21 and 22 and the parasitic resonant element 30 are conductors (also referred to as conductive portions, conductive patterns, or conductor patterns) 12 provided on the substrate 11. The cross-sectional structure will be described later with reference to FIGS. 15 and 16.

In FIG. 12, the main resonant elements 21 and 22 each have a rectangular shape (patch shape) having a predetermined area. The main resonant elements 21 and 22 have a side with a length of $(½)\lambda_g \pm 10\%$ where $\lambda_g$ is an effective wavelength on the substrate 11 of a radio wave in a frequency band in which the main resonant elements 21 and 22 operate as reflection plates.

The radio waves reflected by the reflect array 1 of the present invention are in a desired frequency band of, for example, 0.3 to 100 GHz. Specific examples of the frequency band include the ultra high frequency (UHF) band of 0.3 to 3 GHz, the super high frequency (SHF) band of frequencies 3 to GHz, and the extremely high frequency (EHF) band of frequencies 30 to 300 GHz.

In the present invention, since the frequency functioning as a reflection plate capable of adjusting the directivity varies depending on the size of one side of the main resonant elements 21 and 22 serving as reflective elements, the inter-cell distance d, and the element length of the parasitic resonant element 30, it is preferable to appropriately set the size in accordance with the frequency band to be used.

Although FIG. 12 illustrates an example in which the main resonant elements 21 and 22 have a rectangular shape, the shape of the main resonant element may be a shape obtained by partially cutting out a rectangle (see FIG. 24), a semicircular shape, a polygonal shape, or the like as long as the main resonant element has a predetermined area and has sides parallel to the first elements 311 and 321 closest to the parasitic resonant element 30.

In the example shown in FIG. 12, the parasitic resonant element 30 includes two H-shaped element parts. Specifically, the one element part 31 includes a first element 311, a second element 312, and a third element 313.

The first element 311 is closest to the main resonant element 21 and extends in parallel with the side 211 of the main resonant element 21. One end of the second element 312 is in contact with a substantial center of the first element 311 and extends in a direction away from the main resonant element 21. The third element 313 is in contact with the other end of the second element 312, and extends substantially parallel to the first element 311.

The other H-shaped element part 32 of the parasitic resonant element 30 includes similar elements 321, 322, and 323 vertically symmetrically with the element part 31.

In order for the parasitic resonant element 30 to interact with the main resonant element 21, the distance between the first element 311, which is the closest element, and the one side 211 of the main resonant element 21 is preferably $(1/10)\lambda_g$ or less, and more preferably about $(1/30)\lambda_g$, where $\lambda_g$ is the wavelength of the frequency of the incident radio wave on the substrate. Similarly, in order for the parasitic resonant element 30 to interact with the main resonant element 22, the distance between the first element 321, which is the closest element, and the side 221 of the main resonant element 22 is preferably $(1/10)\lambda_g$ or less, and more preferably about $(1/30)\lambda_g$.

Further, the third elements 313 and 323 of the two element parts 31 and 32 of the parasitic resonant element 30 are coupled to each other by the PIN diode 41.

In the parasitic resonant element 30, RF chokes 42 and 43 are provided on both sides of the PIN diode 41 and at the open ends of the respective third elements 313 and 323 of the two element parts 31 and 32. A control voltage (VB) is applied to an open end of one RF choke 42, and the other RF choke 43 is grounded (GND).

As described above, in the configuration of the present invention, one parasitic resonant element and one PIN diode for electrically controlling the parasitic resonant element are provided for two main resonant elements in a cell corresponding to a polarized wave in one specific direction (in this example, a vertically polarized wave). That is, one diode is sufficient for two reflecting elements.

Therefore, in the present invention, the number of parasitic resonant elements and the number of PIN diodes are half the number of main resonant elements, which are reflective elements, respectively. Thus, even when the same number of reflective elements (main resonant elements) as in the comparative example are provided, the number of components per reflect array, that is, the number of parasitic resonators with respect to the main resonators can be reduced.

In addition, since the number of PIN diodes for the main resonant element can be reduced, power consumption per reflect array can be reduced and the cost of components can be suppressed. Furthermore, even when the number of reflective elements (main resonant elements) per reflect array is about 1000 to 3000, it is possible to reduce the frequency of failure caused by the PIN diode.

The parasitic resonant element 30 of the present invention can be electrically controlled to adjust the resonant frequency to the first parasitic resonant frequency fpara1 or the second parasitic resonant frequency fpara2. In this example, the electric switch that electrically controls the parasitic resonant element 30 is the PIN diode 41. However, the electric switch may be a field effect transistor (FET), a transistor, a variable capacitor, or the like.

FIG. 12 illustrates an example in which the two element parts included in the parasitic resonant element are H-shaped, but the element parts may have other shapes. The other shapes of the element parts will be described later with reference to FIG. 17.

Figure 13:
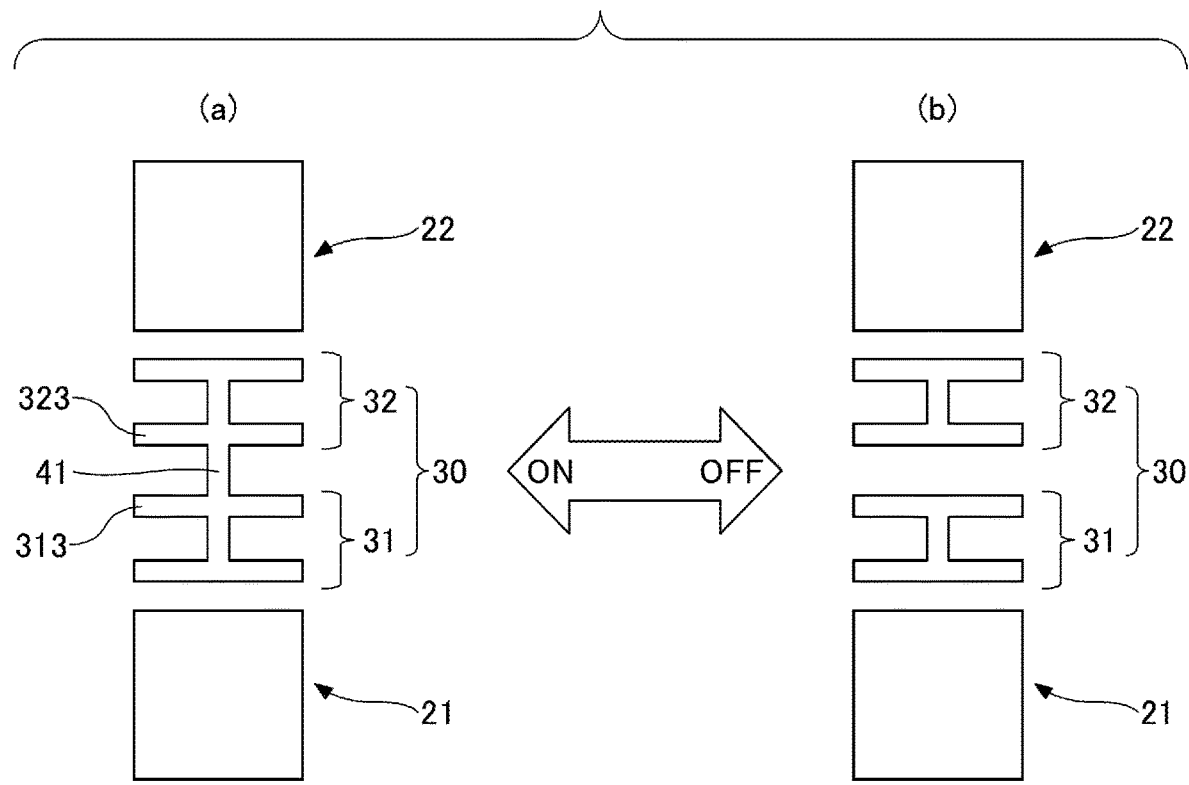
FIG. 13 is a diagram schematically illustrating a first state and a second state of the cell according to the first embodiment of the present invention.
Figure 14:
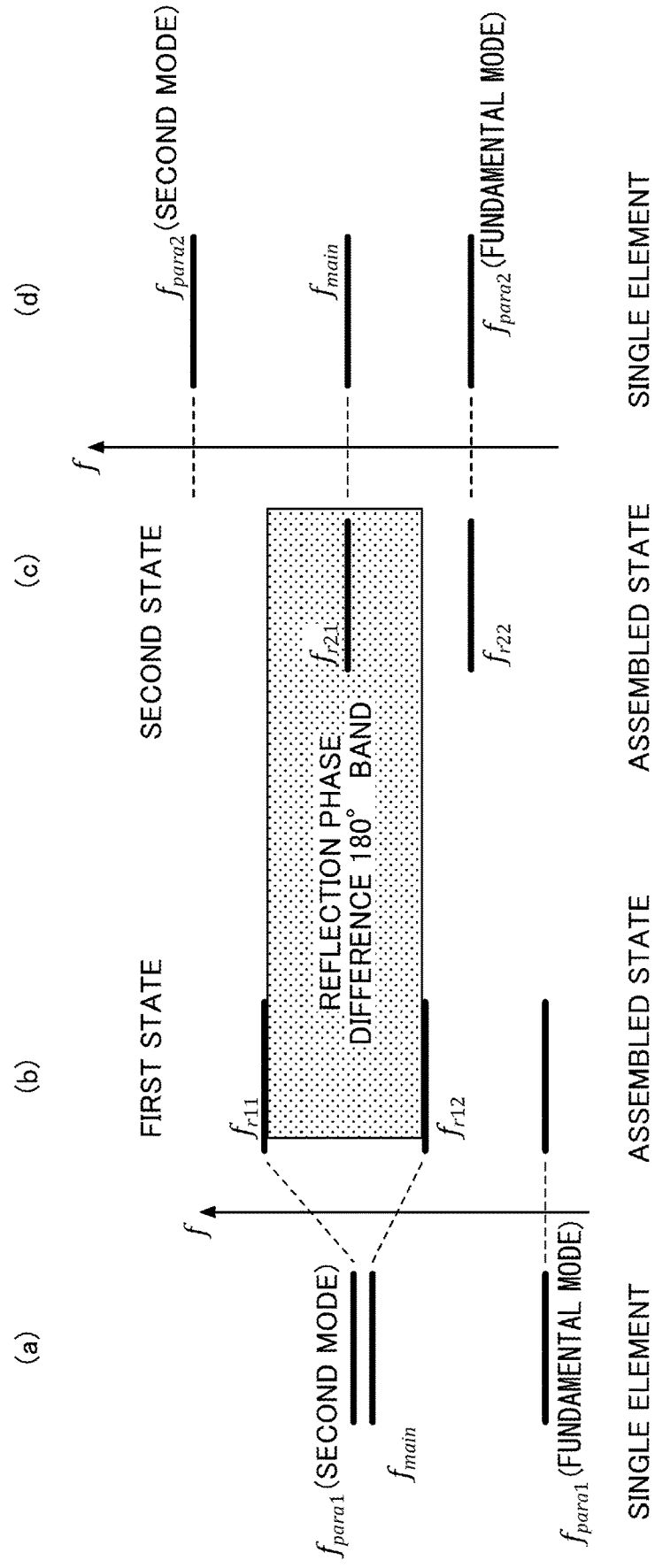
FIG. 14 is a diagram for explaining frequencies in the first state and the second state of the cell according to the first embodiment.

Next, the behavior of the cell according to the present invention will be described with reference to FIGS. 13 and 14. FIG. 13 is a diagram schematically illustrating a first state and a second state of the cell according to the first embodiment of the present invention. FIG. 14 is a diagram for explaining frequencies in the first state and the second state of the cell according to the first embodiment.

In the parasitic resonant element 30 according to the present invention, when the PIN diode 41 is ON, as shown in (a) in FIG. 13, the third elements 313 and 323 are connected to each other, and the two element parts 31 and 32 are electrically connected to each other. At this time, according to the element lengths of the two connected H-shaped element parts 31 and 32 of the parasitic resonant element 30, the resonant frequency of the parasitic resonant element as a single element is equal to the first parasitic resonant frequency fpara1 ((a) in FIG. 14). In the assembled state, the first state is obtained ((b) in FIG. 14).

When the PIN diode 41 is OFF, as illustrated in (b) in FIG. 13, the third elements 313 and 323 of the parasitic resonant element 30 are not connected to each other, and the two element parts 31 and 32 are electrically disconnected from each other. At this time, according to the element lengths of the independent single H-shaped element parts 31 (32), the resonant frequency of the parasitic resonant element 30 as a single element takes the second parasitic resonant frequency fpara2 ((d) in FIG. 14), and the second state is obtained in the assembled state ((c) in FIG. 14). A shape of the element part in the OFF state shown in (b) in FIG. 13 is the same as that in the case where the diode is ON in the cell of the comparative example shown in (a) in FIG. 10.

Here, in each cell 10 of the present embodiment, the parasitic resonant element 30 is mounted in proximity to the main resonant elements 21 and 22 with a dimension that interacts (electrically couples) with the main resonant elements 21 and 22.

When the state shown in (a) in FIG. 13 and the state shown in (b) in FIG. 13 are compared with each other, the parasitic resonant element 30 in the state shown in (a) in FIG. 13 has a longer element length. Therefore, when the diode 41 is in the OFF state, the resonant frequency fpara2 of the parasitic resonant element becomes higher as the element length decreases, so that the resonant frequency fpara1 of the parasitic resonant element becomes lower than fpara2 as shown in (a) and (d) in FIG. 14.

Furthermore, the parasitic resonant element 30 according to the present invention has a plurality of resonant modes. Because a resonant element having a plurality of resonant modes generally has a higher resonant frequency as the order becomes higher, fpara1 (fundamental mode)<fpara1 (second mode), and fpara2 (fundamental mode)<fpara2 (second mode) are obtained. From the above description, according to the relationship between fpara1 (fundamental mode) and fpara2 (fundamental mode), fpara1 (second mode)<fpara2 (second mode) is obtained.

As shown in (a) and (d) in FIG. 14, the first and second parasitic resonant frequencies fpara1 (fundamental mode) and fpara2 (fundamental mode) of the fundamental mode of the parasitic resonant element 30 are lower than the main resonant frequency fmain of the main resonant element as a single element.

In addition, when there are a plurality of resonance modes in the first state and the second state of the parasitic resonant element, a resonance mode having a frequency closest to the main resonant frequency is a target of interaction regardless of the order of the mode.

One of the higher-order modes of the first parasitic resonant frequency of the parasitic resonant element as a single element shown in (a) in FIG. 14 is closer to the main resonant frequency of the main resonant element as a single element than the fundamental mode of the first parasitic resonant frequency of the parasitic resonant element as a single element, i.e., |fpara1 (higher-order mode)−fmain|<|fpara1 (fundamental mode)−fmain|. Therefore, in this example, the mode having fpara1 (higher-order mode), the closest frequency among the modes of the first parasitic resonant frequencies, is a target that interacts with the main resonant frequency fmain of the main resonant element as a single element.

The mode having fpara1 (higher-order mode), which is one of the higher-order modes of the first parasitic resonant frequency of the parasitic resonant element as a single element and whose frequency is the closest to the main resonant frequency, is within a range of ±3% of the main resonant frequency fmain of the main resonant element as a single element. That is, one of the first parasitic resonant frequencies of the parasitic resonant element as a single element and the main resonant frequency of the main resonant element as a single element have a relationship: |(first parasitic resonant frequency of the parasitic resonant element as a single element)−(main resonant frequency of the main resonant element as a single element)|/(main resonant frequency of the main resonant element as a single element)<3%.

Therefore, since the parasitic resonant frequency fpara1 (second mode) of the parasitic resonant element as a single element is close to the main resonant frequency fmain of the main resonant element as a single element, in the assembled state, as shown in (b) in FIG. 14, the frequencies reconfigured by the interaction are greatly shifted upward and downward from the resonant frequencies of the resonant elements as a single element and become two reconfigured resonant frequencies fr11 and fr12 which are greatly separated in height. This state is referred to as a first state of the cell. The two reconfigured resonant frequencies fr11 and fr12 separated by the interaction are, for example, within a range of ±5% to ±20% with respect to the main resonant frequency fmain of the main resonant element as a single element.

As shown in (d) in FIG. 14, one of the higher-order modes of the second parasitic resonant frequency of the parasitic resonant element as a single element is farther from the main resonant frequency of the main resonant element as a single element than the fundamental mode of the second parasitic resonant frequency of the parasitic resonant element as a single element, i.e., |fpara2 (higher-order mode)−fmain|>|fpara2 (fundamental mode)−fmain|. Therefore, in this example, the mode having fpara2 (fundamental mode), the closest frequency among the modes of the second parasitic resonant frequencies, is a target that interacts with the main resonant frequency fmain of the main resonant element as a single element.

Here, the fundamental mode fpara2 (fundamental mode) having the closest frequency among the modes of the second parasitic resonant frequency of the parasitic resonant element as a single element is outside the range of ±3% of the main resonant frequency fmain of the main resonant element as a single element.

Therefore, since the parasitic resonant frequencies fpara2 (fundamental mode) of the parasitic resonant element as a single element are far from the main resonant frequency fmain of the main resonant elements 21 and 22 as a single element, in the assembled state, as shown in (c) in FIG. 14, the frequencies reconfigured by the interaction change little from the resonant frequencies of the elements as single elements. Therefore, the two reconfigured resonant frequencies fr21 and fr22 respectively have substantially the same values as the resonant frequency fmain of the main resonant element as a single element and fpara2 (fundamental mode) of the parasitic resonant element as a single element. This state is referred to as a second state of the cell.

In the states shown in (b) and (c) in FIG. 14 in which the frequencies are reconfigured in this manner, the absolute value of the difference (reflection phase difference) between the reflection phase in the first state and the reflection phase in the second state at the frequency of the input radio wave is about 180°. In the specification of the present application, "about 180°" means the range of 180°±45°.

As described above, since the difference in reflection phase between the first state and the second state is about 180°, the cell 10 according to the present invention can adjust the reflection phase, and thus the reflect array 1 in which the cells 10 are arranged can function as a reflection plate whose directivity can be adjusted.

In this configuration, since the fundamental mode in the ON state resonates at a frequency lower than the main resonant frequency, each cell 10 is designed so that "the mode of the resonant frequency coupled in the ON state is a higher-order mode, and the higher-order mode of the parasitic resonant element is within ±3% of the main resonant frequency of the single main resonant element of the main resonator".

With this configuration, the parasitic resonant element 30 can be designed to have a longer element length than in the configuration of the comparative example. Therefore, the two main resonant elements 21 and 22 can be controlled by one parasitic resonant element 30 without narrowing the distance between the adjacent main resonant elements 21 and 22.

Here, the main resonant frequency of the main resonant element is designed in accordance with the frequency of the incident radio wave. However, the frequency of the incident radio wave may also be shifted for some reason. In the present invention, in the case where the shift of the frequency of the incident radio wave from the main resonant frequency of the main resonant element as a single element is within ±20%, an absolute value of the difference between the reflection phase of the first state and the reflection phase of the second state is 180°±45°, and the reflect array according to the present disclosure, as a reflection plate with adjustable directivity, can change the angle at which the radio wave is reflected.

Application Example

Although in the present embodiment, the configuration in which each cell includes two main resonant elements and one parasitic resonant element has been described, each cell may include at least two main resonant elements including three or more main resonant elements and at least one parasitic resonant element including two or more parasitic resonant elements. In this case, when accommodating one polarization, (number of main resonant elements)>(number of parasitic resonant elements) is satisfied. Even in this case, the parasitic resonant element is adjustable to two or more parasitic resonant frequencies, and is coupled to two or more adjacent main resonant elements to form a reconfigured resonant frequency, thereby adjusting the reflection phase of the reflect array surface.

When one parasitic resonant element is provided for three or more main resonant elements in each cell, the parasitic resonant element includes a first element that is closest to each main resonant element and is parallel to a side of the main resonant element.

For example, when three main resonant elements are controlled by one parasitic resonant element, the main resonant elements are arranged in a triangular shape with one side facing inward, and the parasitic resonant element has a first element extending in a direction substantially parallel to an inner side of the main resonant element and arranged like a part of the three sides of the triangle.

Similarly, when four, five, . . . , n main resonant elements are controlled by one parasitic resonant element, the main resonant elements are arranged in an n-sided polygon with one side facing inward, and the parasitic resonant element has a first element extending in a direction substantially parallel to an inner side of the main resonant element and arranged like a part of the n sides of the n-sided polygon.

Also in this case, in the cell, when the resonant frequency is set to the first parasitic resonant frequency, one parasitic resonant element is coupled to two or more adjacent main resonant elements to generate a first state. Further, in the cell, when the resonant frequency is set to the second parasitic resonant frequency, one parasitic resonant element is coupled to two or more adjacent main resonant elements to generate a second state in the cell. Then, by designing so that the absolute value of the difference between the reflection phase in the first state and the reflection phase in the second state at a specific radio wave frequency is 180°±45°, it is possible to change the angle at which radio waves are reflected as a reflection plate with adjustable directivity.

In FIG. 14 described above, "the mode of the resonant frequency coupled in the ON state is a higher-order mode than when in the OFF state". Although the example has been described, by changing the design of the parasitic resonant element in the present invention, for example, as in the comparative example, "the modes of the resonant frequency coupled in the OFF state and in the ON state are the same resonant mode (for example, the fundamental mode)" may be used. Alternatively, by further designing, "the mode of the parasitic resonant frequency in the OFF state may be a higher-order mode than the parasitic resonant frequency in the ON state". In either case, the parasitic resonant element is designed so that one mode of the resonant frequency of the parasitic resonant element is within ±3% of the main resonant frequency of the main resonant element as a single element in the ON state or in the OFF state.

(Cross-Sectional View)

Figure 15:
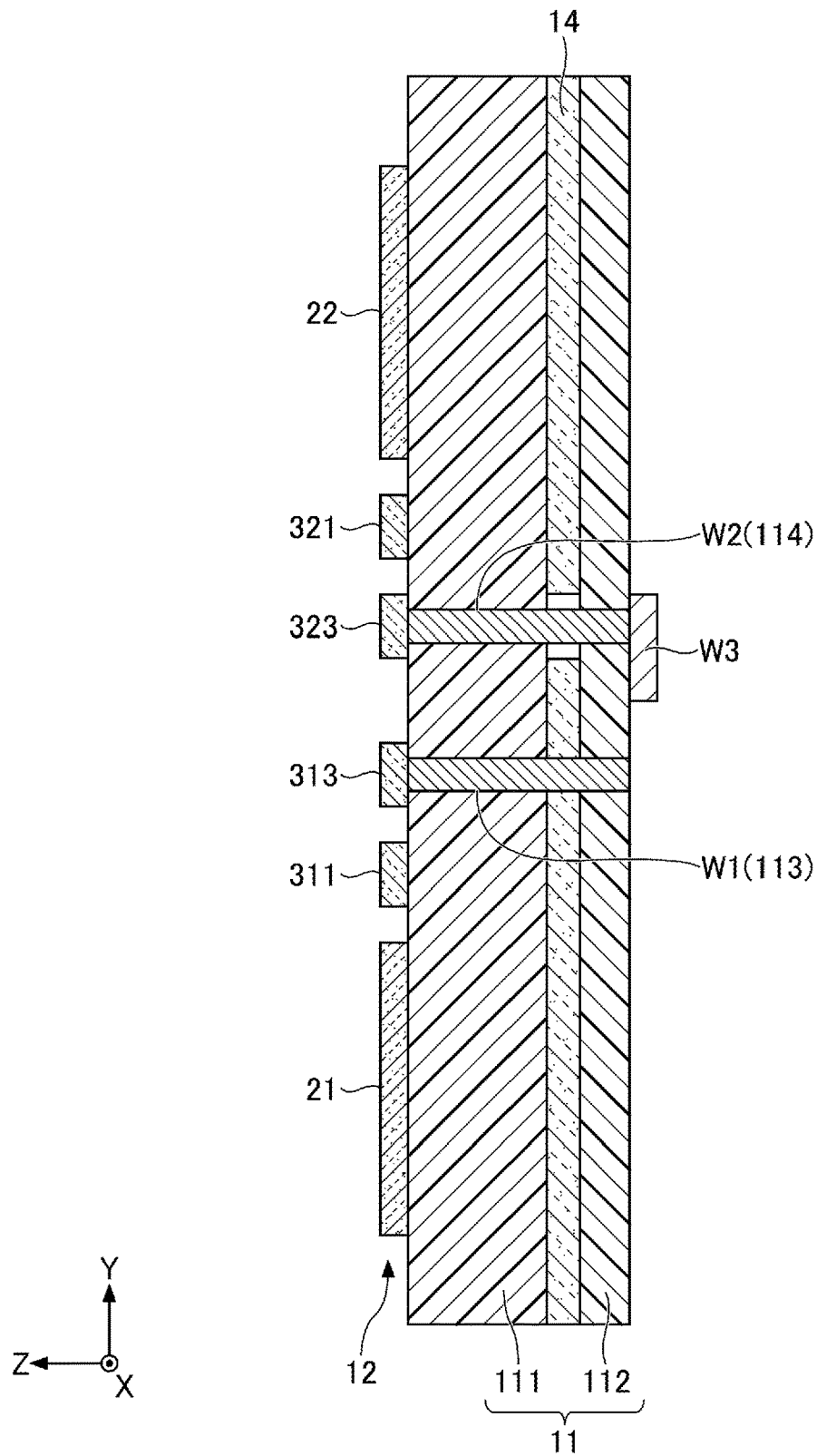
FIG. 15 is a cross-sectional view of a cell in a first configuration example according to the embodiment of the present invention.

FIG. 15 is a cross-sectional view of the cell 10 in the first configuration example according to the embodiment of the present invention. More specifically, it is a cross-sectional view taken along the line A-A' of FIG. 12.

The main resonant elements 21 and 22 and the conductor 12 of the parasitic resonant element are provided on the first surface of the substrate 11. The substrate 11 is made of, for example, resin. In this configuration, the substrate 11 is configured by laminating two substrates 111 and 112. The first substrate 111 has a first surface on which the conductor 12 is mounted, and the first surface is patterned by etching.

A ground plane 14 is provided so as to face the first surface of the substrate 11.

Through-holes 113 and 114 are formed through the substrate 111, the ground plane 14, and the substrate 112 in the thickness direction. The through-holes 113 and 114 serve as interconnection regions W1 and W2 for electrically connecting the substrates to each other by plating or the like, and are connected to the third elements 313 and 323 of the parasitic resonant element 30 through the RF chokes 42 and 43, respectively, on the first surface.

The interconnection region W1 is connected to the ground plane 14 and is at the same potential as the ground plane 14.

In addition, on the back surface side of the substrate 112, a wire W3 connected to the interconnection region W2 is exposed on the back surface side, and is connected to a control voltage VB from the microcomputer (controller 5) through a pattern formed on the back surface side. The interconnection region W1 and the wire W3 are not connected to each other.

Figure 16:
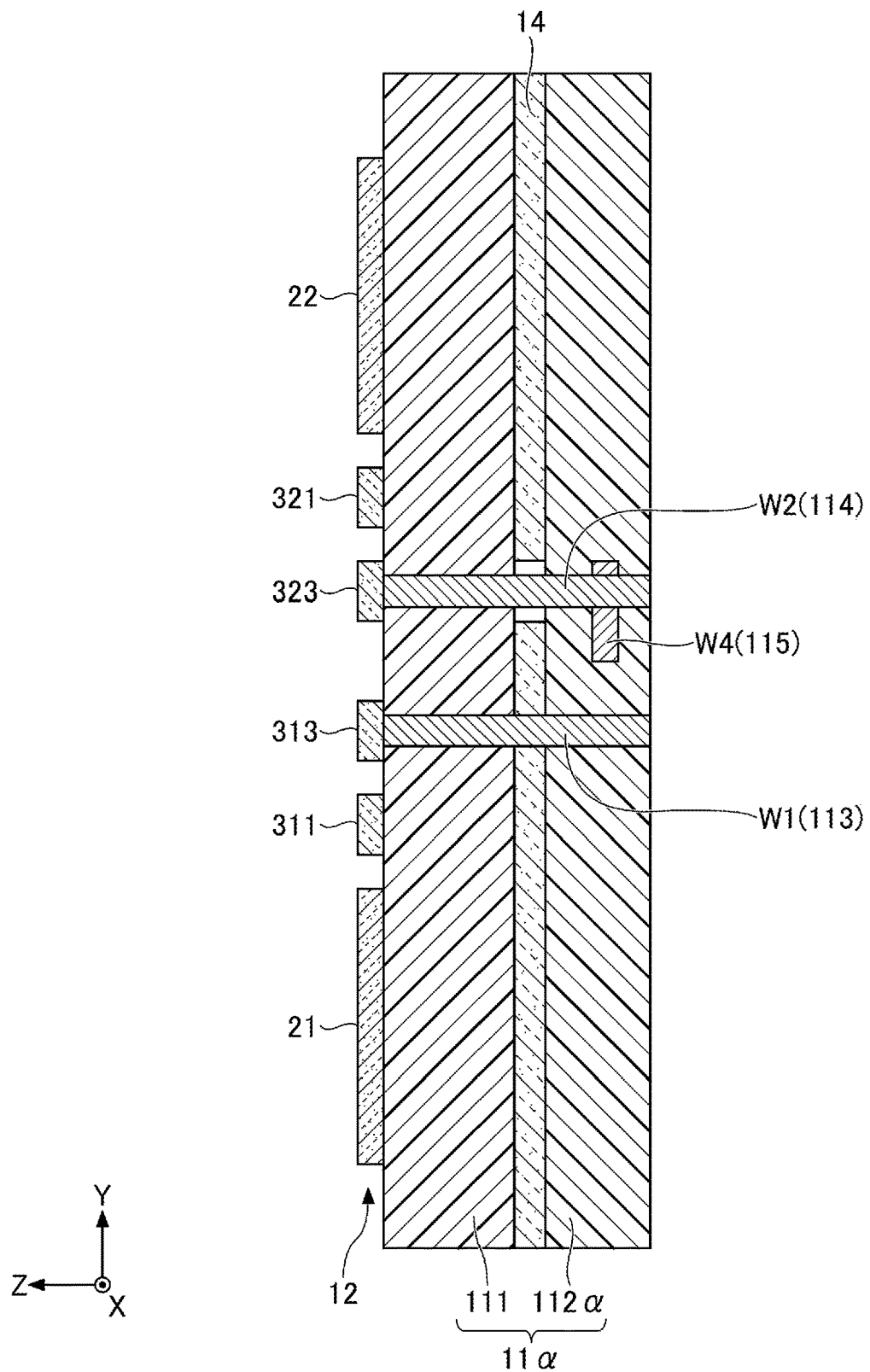
FIG. 16 is a cross-sectional view of a cell in a second configuration example according to the embodiment of the present invention.

FIG. 16 is a cross-sectional view of a cell 10a in a second configuration example according to the embodiment of the present invention.

In this configuration, a hole 115 connected to the through-hole 114 and parallel to the first surface is formed in a second substrate 112a.

In this configuration, a wire connected to the wire W2 of the through-hole 114 and connected to the control voltage VB is not exposed on the back surface side and is realized by the inner layer wire W4 in the hole 115 of the laminated substrate. The interconnection region W1 and the inner layer wire W4 are not connected to each other.

(Variation of Parasitic Resonant Element)

FIG. 12 shows an example in which the two element parts included in the parasitic resonant element according to the first embodiment of the present invention are H-shaped, but the element parts may have other shapes.

Figure 17:
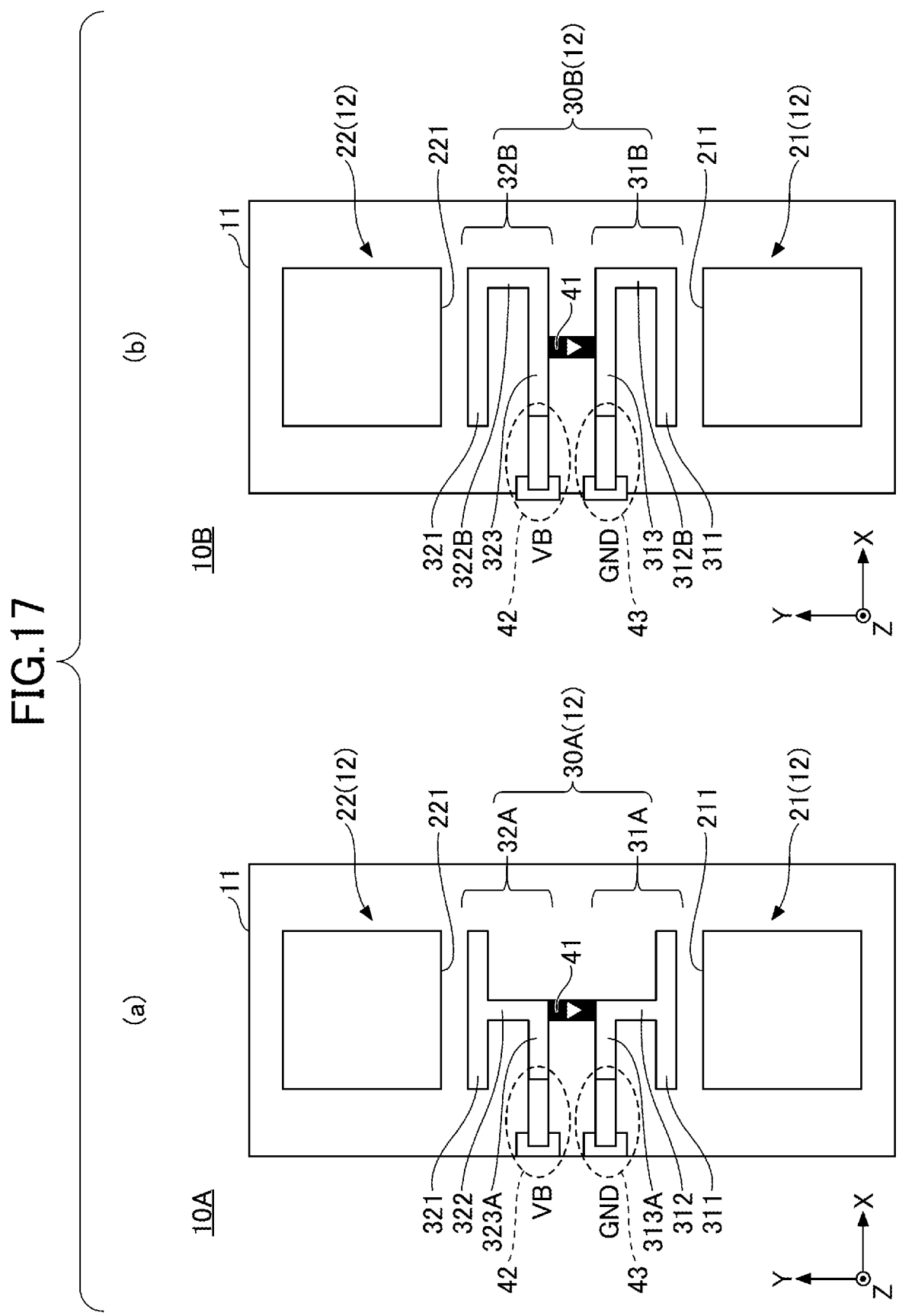
FIG. 17 is a diagram schematically illustrating a main resonant element and a parasitic resonant element of each cell including an element part of the parasitic resonant element according to a variation of the embodiment.

FIG. 17 are diagrams illustrating a modification of the parasitic resonant element. FIG. 17A shows a configuration in which the element part is h-shaped, and FIG. 17B shows a configuration in which the element part is U-shaped.

The h-shaped element part 31A included in the parasitic resonant element 30A illustrated in FIG. 17A includes a first element 311, a second element 312, and a third element 313A. The first element 311 and the second element 312 have the same configurations as those in FIG. 12.

One end of the third element 313A of the present modification is connected to the other end of the second element 312, and the third element 313A extends substantially parallel to the first element 311. The element part 32A has the same shape as that of the element part 31A in vertical symmetry.

The U-shaped element part 31B included in the parasitic resonant element 30B illustrated in FIG. 17B includes a first element 311, a second element 312B, and a third element 313. The first element 311 and the third element 313 have the same configurations as those in FIG. 12.

One end of the second element 312B of the present modification is in contact with the end of the first element 311, and extends in a direction away from the main resonant element 21, and the other end thereof is in contact with the end of the third element 313. The element part 32B has the same shape as that of the element part 31B in vertical symmetry.

Also in the above-described variations, in the parasitic resonant element 30A (30B), when the PIN diode 41 is ON, the third elements 313A and 323A (313 and 323) of the pair of element parts 31A and 32A (31B and 32B) are connected to each other, and the two element parts 31A and 32A (31B and 32B) are electrically connected to each other. At this time, according to the element length of the two element parts to which the parasitic resonant element is connected, the resonant frequency of the parasitic resonant element as a single element becomes the first parasitic resonant frequency, and the first state is obtained.

When the PIN diode 41 is OFF, the two third elements 313A and 323A (313 and 323) are not connected to each other, and the two element parts 31A and 32A (31B and 32B) are electrically disconnected from each other. At this time, in the parasitic resonant element, the resonant frequency of the parasitic resonant element as a single element becomes the second parasitic resonant frequency according to the element length of one element part, and the second state is obtained.

In the first embodiment and the modification example described above, an example has been described in which the pair of two element parts constituting the parasitic resonant element includes three elements of the first to third elements, but the element part may include four or more elements.

For example, in the configuration of FIG. 12, a fourth element that intersects the second element and is parallel to the first element and the third element may be provided between the first element, which is the closest element, and the third element connected to the PIN diode, so that the element part has a configuration like a "tandem-shape" (skewer shape). Further, the first element and the third element may be bent so as to form a step (see FIG. 24).

Second Embodiment

Figure 18:
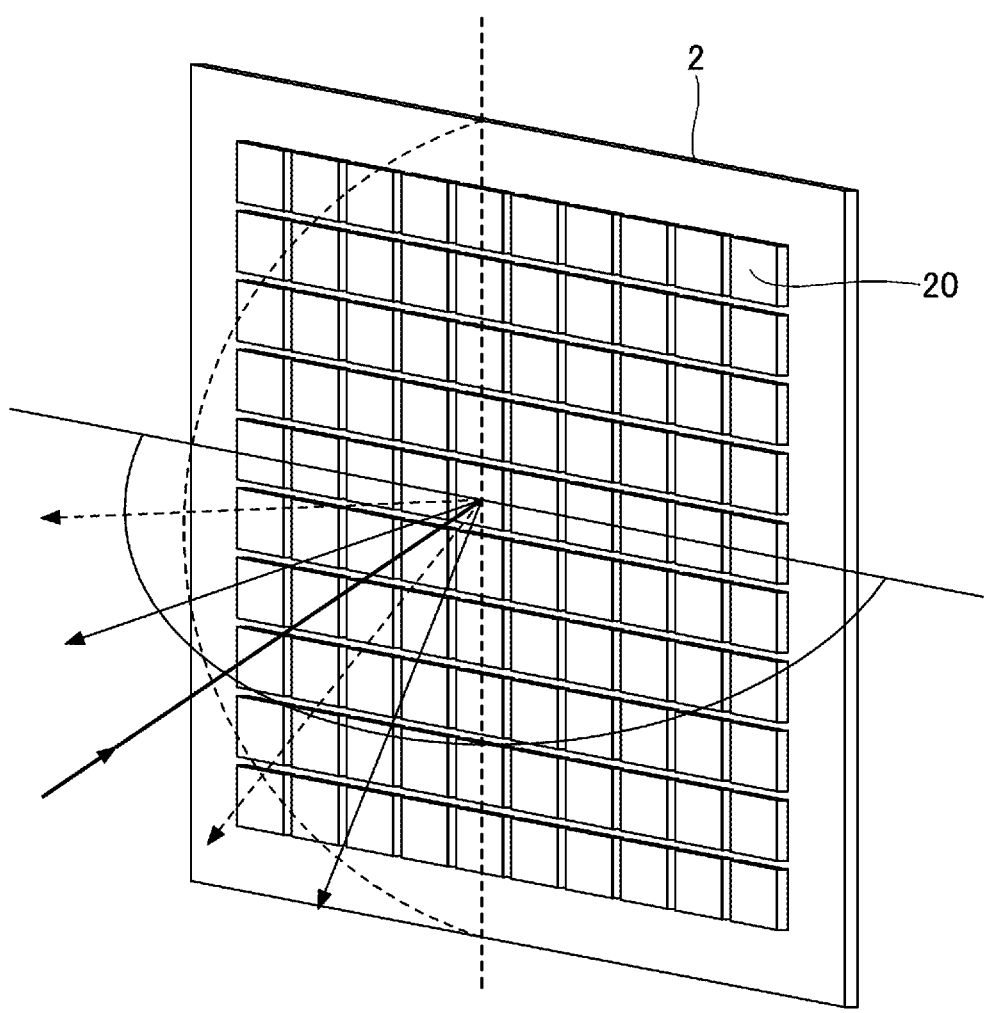
FIG. 18 is a diagram for explaining a reflection angle on a surface of a reflect array according to a second embodiment realized by a difference in a voltage application pattern.

FIG. 18 is a diagram for explaining the reflection angle on the surface of the reflect array 2 according to a second embodiment realized by difference in the voltage application pattern.

In the first embodiment, since the parasitic resonant element interacting in the vertical direction is provided in each cell 10, only the vertically polarized wave can be reflected so that the reflection angle can be adjusted in the reflect array. However, in the reflect array 2 (see FIG. 28) according to the second embodiment, a reflection angle of a horizontally polarized wave can be changed vertically and horizontally in addition to the vertically polarized wave.

Figure 19:
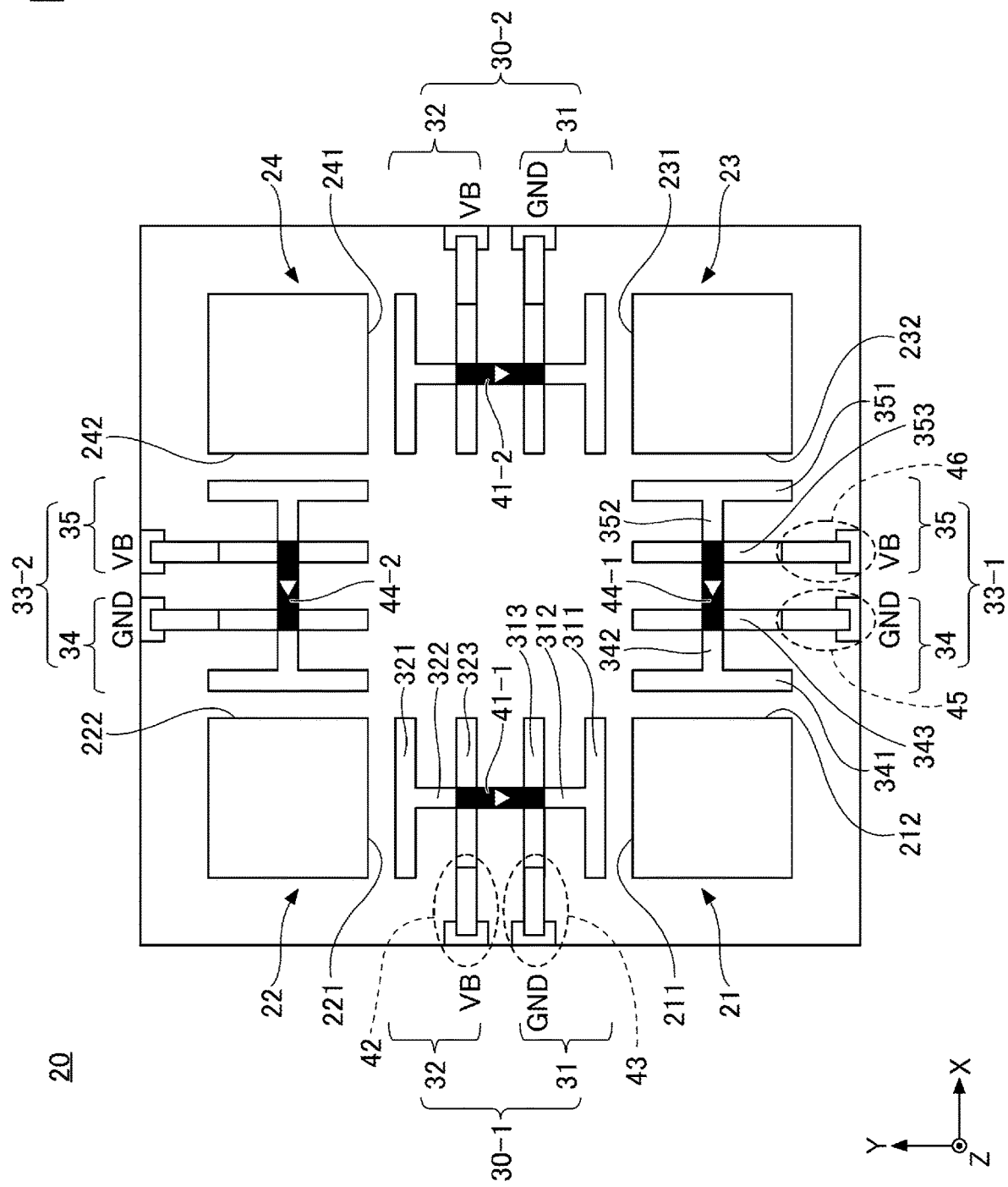
FIG. 19 is a diagram schematically illustrating a main resonant element and a parasitic resonant element in each cell of the reflect array according to the second embodiment of the present invention.

FIG. 19 is a diagram schematically illustrating a main resonant element and a parasitic resonant element in each cell 20 of the reflect array 2 according to the second embodiment of the present invention.

Each cell 20 of the plurality of cells of the present embodiment includes four main resonant elements 21, 22, 23, and 24 arranged two by two in the vertical and horizontal directions, and four parasitic resonant elements 30-1, 30-2, 33-1, and 33-2 interposed between adjacent main resonant elements.

The parasitic resonant elements 30-1, 30-2, 33-1, and 33-2 of the present embodiment are provided adjacent to each of the four main resonant elements 21, 22, 23, and 24 in two orthogonal directions.

The parasitic resonant elements 30-1 and 30-2 located on the left and right sides of the cell in FIG. 19 have the same configuration as that of the parasitic resonant element 30 shown in FIG. 12, and include two H-shaped element parts.

One element part 31 of the parasitic resonant element 30-1 includes a first element 311, a second element 312, and a third element 313. The first element 311 is the closest element and extends in parallel with the first side (one side) 211 of the main resonant element 21 close to the first element 311.

The other element part 32 of the parasitic resonant element 30-1 includes similar elements 321, 322, and 323 vertically symmetrically with the element part 31, and the first element 321 is closest to the first side (one side) 221 of the main resonant element 22.

Further, the third elements 313 and 323 of the two element parts 31 and 32 of the parasitic resonant element 30-1 are coupled by the PIN diode 41-1.

In the parasitic resonant element 30-1, RF chokes 42 and 43 are provided on both sides of the PIN diode 41 and at the open ends of the third elements 313 and 323 of the two element parts 31 and 32, respectively. A control voltage VB is applied to the open end of one RF choke 42, and the other RF choke 43 is grounded (GND).

The parasitic resonant element 30-1 and the parasitic resonant element 30-2 have the same configurations of the elements of the element parts 31 and 32 and the PIN diodes 41-1 and 41-2, but the RF chokes 42 and 43 are located outside the substrate, so that the positions of the RF chokes 42 and 43 are horizontally symmetrical.

The parasitic resonant elements 33-1 and 33-2 located on the upper and lower sides of the cell 20 shown in FIG. 19 have a configuration in which the parasitic resonant element 30 shown in FIG. 12 is arranged in a horizontal direction, and include two H-shaped element parts.

Specifically, the one element part 34 of the parasitic resonant element 33-1 includes a first element 341, a second element 342, and a third element 343. The first element 341 is closest to the main resonant element 21 and extends in parallel with a second side (another side) 212 orthogonal to the one side 211 of the main resonant element 21. One end of the second element 342 is in contact with a substantial center of the first element 341 and extends in a direction away from the main resonant element 21. The third element 343 is in contact with the other end of the second element 342, and extends substantially parallel to the first element 341.

The other element part 35 of the parasitic resonant element 33-1 includes the same elements 351, 352, and 353 horizontally symmetrically with the element part 34, and the first element 351 is closest to the second side (the other side) 232 of the main resonant element 23.

Further, the third elements 343 and 353 of the two element parts 34 and 35 of the parasitic resonant element 33-1 are coupled by the PIN diode 44-1.

In the parasitic resonant element 33-1, RF chokes 45 and 46 are provided on both sides of the PIN diode 44-1 and at the open ends of the respective third elements 343 and 353 of the two element parts. The control voltage VB is applied to an open end of one RF choke 45, and the other RF choke 46 is grounded (GND).

The parasitic resonant element 33-1 and the parasitic resonant element 33-2 have the same configurations of the elements of the element parts 34 and 35 and the PIN diodes 44-1 and 44-2. But, the RF chokes 45 and 46 are located outside the substrate, and thus the positions of the RF chokes 45 and 46 are horizontally symmetrical.

In the present preferred embodiment, the parasitic resonant element 30-1 is arranged to be able to interact with the main resonant elements 21 and 22, and the parasitic resonant element 30-2 is arranged to be able to interact with the main resonant elements 23 and 24. Therefore, the distance between the first element 311 and the one side 211 (231) of the main resonant element 21 (23) and the distance between the first element 321 and the one side 221 (241) of the main resonant element 22 (24) are preferably ($1/10$)$\lambda_g$ or less, and more preferably about ($1/30$)$\lambda_g$.

The parasitic resonant element 33-1 is arranged so as to be able to interact with the main resonant elements 21 and 23, and the parasitic resonant element 33-2 is arranged so as to be able to interact with the main resonant elements 22 and 24. Therefore, the distance between the first element 341 and the other side 212 (222) of the main resonant element 21 (22) and the distance between the first element 351 and the other side 232 (242) of the main resonant element 23 (24) are preferably ($1/10$)$\lambda_g$ or less, and more preferably about ($1/30$)$\lambda_g$.

In the configuration of the present embodiment, the parasitic resonant elements 30-1 and 30-2 are adjusted when the vertically polarized wave is incident and the angle is adjusted in the vertical direction. The parasitic resonant elements 33-1 and 33-2 are adjusted when the horizontally polarized wave is incident and the angle is adjusted in the horizontal direction.

In this configuration, one parasitic resonant element 30-1 and one parasitic resonant element 30-2 are arranged so as to be able to interact with each of two sets of two main resonant elements (21, 22) and (23, 24) with respect to the vertical polarization, and PIN diodes 41-1 and 41-2 for electrically controlling the parasitic resonant elements 30-1 and 30-2 are provided.

In addition, one parasitic resonant element 33-1 and one parasitic resonant element 33-2 are arranged so as to be able to interact with each of the two sets of two main resonant elements (21, 23) and (22, 24) for the horizontal polarization, and PIN diodes 44-1 and 44-2 are provided to electrically control the parasitic resonant elements 33-1 and 33-2.

Figure 20:
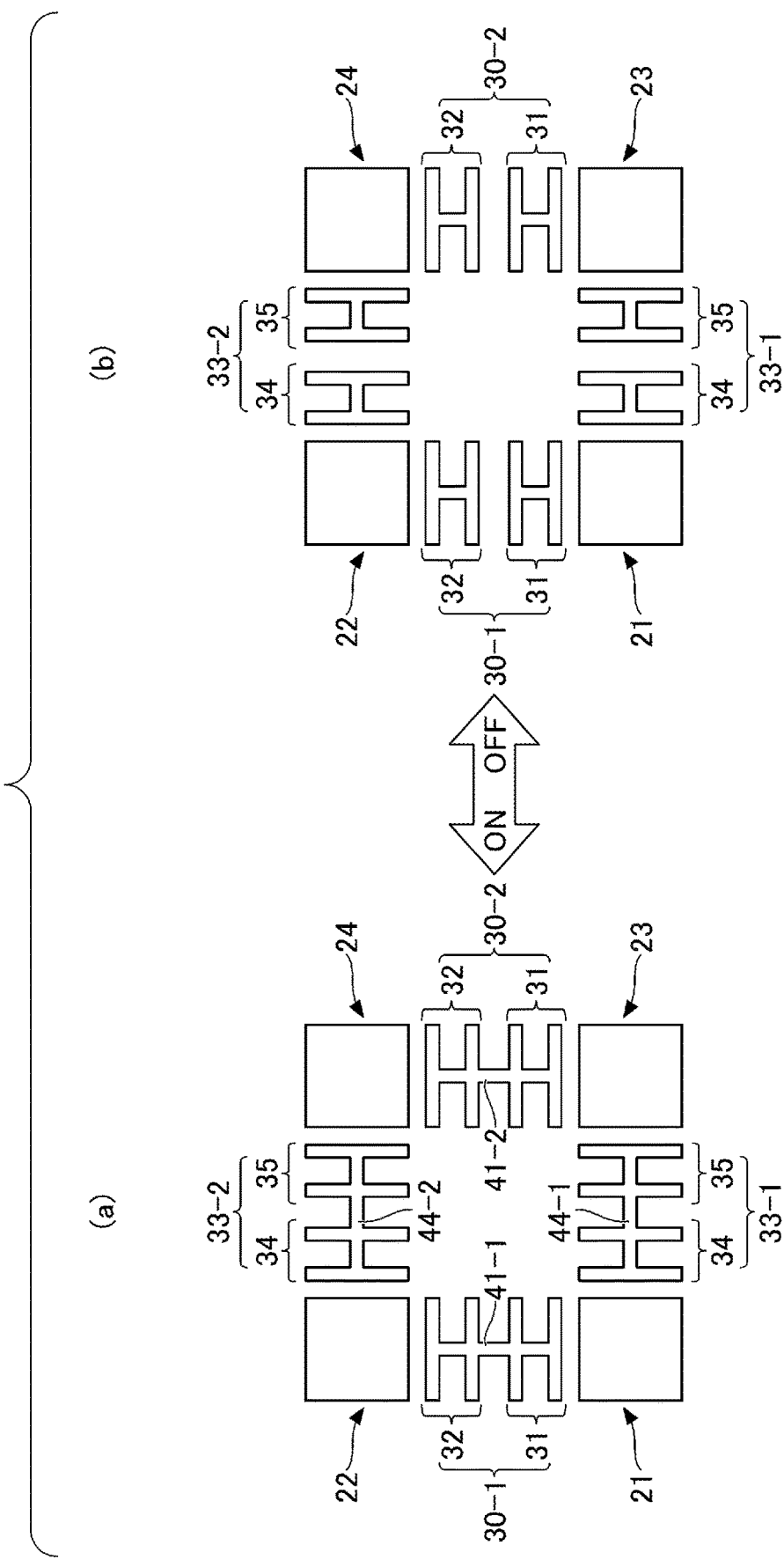
FIG. 20 is a diagram schematically illustrating a first state and a second state of the cell according to the second embodiment.

FIG. 20 is a diagram schematically illustrating a first state and a second state of the cell 20 according to the second embodiment.

In the present embodiment, when the PIN diodes 41-1 and 41-2 are ON, the third elements of the parasitic resonant elements 30-1 and 30-2 interacting with each other in the vertical direction are connected to each other and the two element parts 31 and 32 are electrically connected to each other as shown in (a) in FIG. 20. At this time, according to the element lengths of the two H-shaped element parts 31 and 32 to which the parasitic resonant elements are connected, the resonant frequency of the parasitic resonant element as a single element becomes the first parasitic resonant frequency fpara1, which is the first state.

When the PIN diodes 41-1 and 41-2 are OFF, as illustrated in (b) in FIG. 20, the third elements of the parasitic resonant elements 30-1 and 30-2 are not connected to each other, and the two element parts 31 and 32 are electrically disconnected from each other. At this time, according to the element length of one independent H-shaped element part 31 (32), the resonant frequency of the parasitic resonant elements 30-1 and 30-2 becomes the second parasitic resonant frequency fpara2, which is the second state.

Here, in order to perform regular adjustment in the cell 20, the first and second parasitic resonant frequencies fpara1 and fpara2 of the parasitic resonant element 30-1 and the first and second parasitic resonant frequencies fpara1 and fpara2 of the parasitic resonant element 30-2, where the parasitic resonant element 30-1 and the parasitic resonant element 30-2 interact with each other in the vertical direction, are set to be substantially equal.

When the PIN diodes 44-1 and 44-2 are ON, the third elements of the parasitic resonant elements 33-1 and 33-2 interacting with each other in the horizontal direction are connected to each other and the two element parts 34 and 35 are electrically connected to each other as shown in (a) in FIG. 20. At this time, according to the element lengths of the two H-shaped element parts 34 and 35 to which the parasitic resonant elements are connected, the resonant frequency of the parasitic resonant element as a single element become the first parasitic resonant frequency fpara1, which is the first state.

When the PIN diodes 44-1 and 44-2 are OFF, as illustrated in (b) in FIG. 20, the third elements of the parasitic resonant elements 33-1 and 33-2 are not connected to each other, and the two element parts 34 and 35 are electrically disconnected from each other. At this time, according to the element length of one independent H-shaped element part 34 (35), the resonant frequencies of the parasitic resonant elements 33-1 and 33-2 become the second parasitic resonant frequency fpara2, which is the second state.

In addition, in order to perform regular adjustment in the cell 20, the first and second parasitic resonant frequencies fpara1 and fpara2 of the parasitic resonant element 33-1 and the first and second parasitic resonant frequencies fpara1 and fpara2 of the parasitic resonant element 33-2, where the parasitic resonant element 33-1 and the parasitic resonant element 33-2 interact with each other in the horizontal direction, are set to be substantially equal to each other.

In the present embodiment, the first parasitic resonant frequency and the second parasitic resonant frequency of the parasitic resonant elements 30-1 and 30-2 interacting in the vertical direction may be equal to or different from the first parasitic resonant frequency and the second parasitic resonant frequency of the parasitic resonant elements 33-1 and 33-2 interacting in the horizontal direction.

The reconfigured frequencies when the cell is in the first state and the second state are the same as those in (b) and (c) in FIG. 14 described above. The first parasitic resonant frequency and the second parasitic resonant frequency shown in the present embodiment may be the same as or different from those in the first embodiment.

Also in the present embodiment, in the first state and the second state in which the frequency is reconfigured, the absolute value of the difference (reflection phase difference) between the reflection phase in the first state and the reflection phase in the second state at the frequency of the input radio wave is about 180°±45°.

As described above, also in the present embodiment, since the difference in reflection phase between the first state and the second state is about 180°, the cell 20 can adjust the reflection phase, and thus the reflect array 2 in which the cells 20 are arranged can function as a reflection plate whose directivity can be adjusted.

Further, by gathering such cells 20, the reflect array according to the present embodiment can function as an RIS capable of adjusting the reflection angle with respect to polarized waves in two directions, i.e., vertically polarized waves and horizontally polarized waves.

For this reason, in the present embodiment, when polarized waves in one direction are considered, the number of parasitic resonant elements and PIN diodes is half the number of main resonant elements which are reflective elements, and therefore the number of components per reflect array can be reduced.

EXAMPLES

The inventors of the present application prepared measurement models of a comparative example and the present invention, and verified whether the reflect array of the model functions as a reflection plate with adjustable directivity.

Example 1 (Comparative Example)

Figure 21:
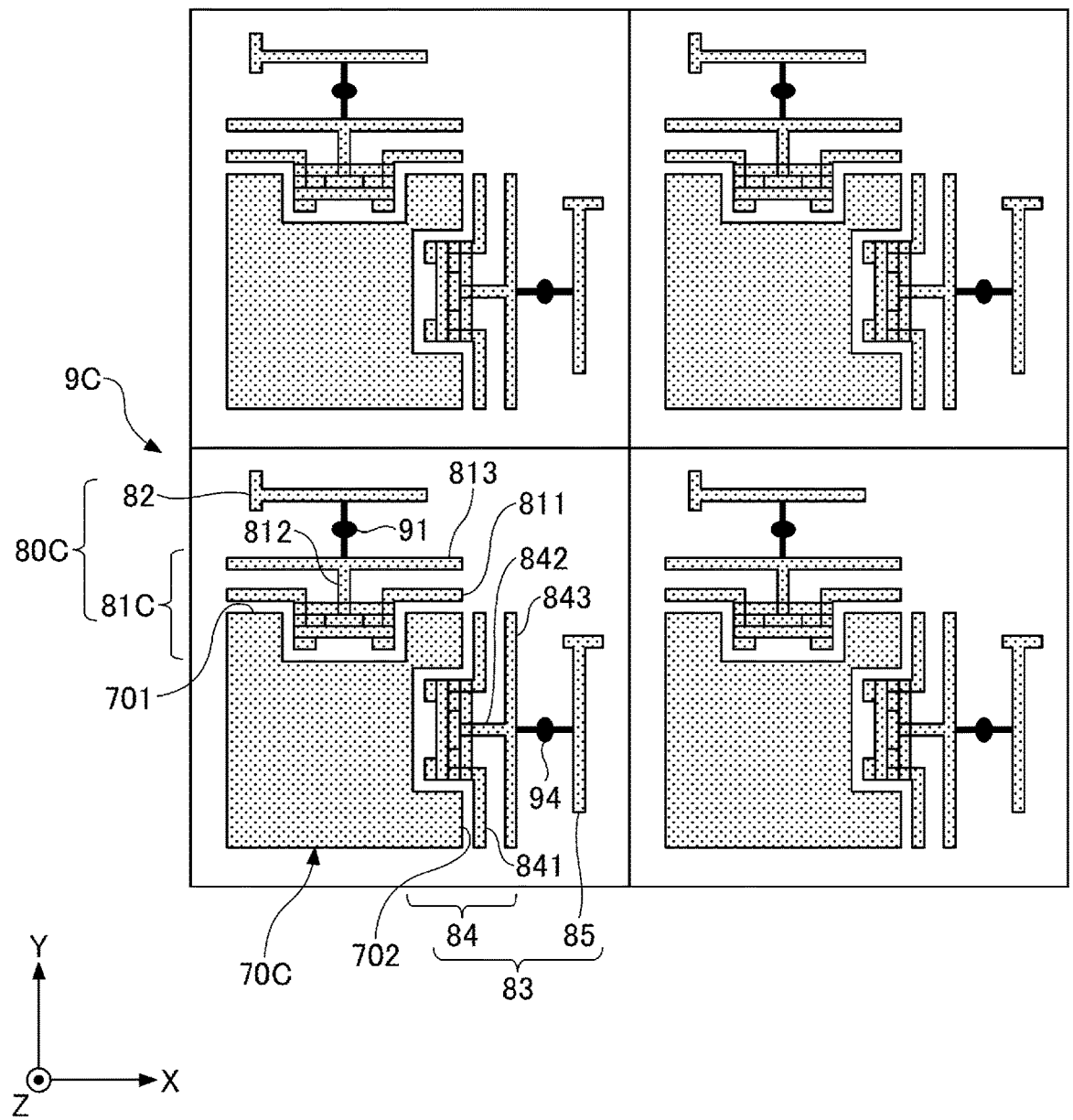
FIG. 21 is a diagram schematically illustrating a measurement model of the main resonant element and the parasitic resonant element in each cell of the reflect array according to the comparative example.

FIG. 21 is a diagram schematically illustrating a measurement model of main resonant elements and parasitic resonant elements in each cell 9C of the reflect array according to the comparative example. In FIG. 21, the RF choke is omitted.

In the cell 9C of FIG. 21, parasitic resonant elements are provided in the respective directions of the polarized waves with respect to one main resonant element in order to correspond to both the vertically polarized wave and the horizontally polarized wave. In other words, two parasitic resonant elements 80C and 83 are provided adjacent to one main resonant element 70C in two orthogonal directions.

Unlike the configuration of the comparative example of FIG. 8, the parasitic resonant element 80C of FIG. 21 corresponding to the vertically polarized wave includes an element part 81C composed of three elements and an element part 82 composed of one linear element.

The element part 81C includes a first element 811, a second element 812, and a third element 813.

The first element 811 is closest to the main resonant element 70C and extends in parallel with one side of the main resonant element 70C. One end of the second element 812 is in contact with a substantial center of the first element 811 and extends in a direction away from the main resonant element 70C. The third element 813 is in contact with the other end of the second element 812, and extends substantially parallel to the first element 811.

The parasitic resonant element 83 corresponding to the horizontal polarization has a configuration in which the direction of the parasitic resonant element 80C is changed, and includes an element part 84 constituted by three elements and an element part 85 constituted by one linear element.

The element part 84 includes a first element 841, a second element 842, and a third element 843.

The first element 841 is closest to the main resonant element 70C and extends in parallel with one side of the main resonant element 70C. One end of the second element 842 is in contact with a substantial center of the first element 841 and extends in a direction away from the main resonant element 70C. The third element 843 is in contact with the other end of the second element 842, and extends substantially parallel to the first element 841.

The main resonant element 70C according to this configuration has a shape obtained by removing a part from a quadrangle. Specifically, a center of each of two sides of the quadrangle, i.e., a first side 701 opposite the closest first element 811 of the parasitic resonant element 80C corresponding to the vertically polarized wave and a second side 702 opposite the closest first element 841 of the parasitic resonant element 83 corresponding to the horizontally polarized wave is recessed in a quadrangular shape.

The closest first elements 811 and 841 of the parasitic resonant elements 80C and 83 opposite the recessed sides 701 and 702 of the main resonant elements 70C are bent along the recessed sides 71C and 72C.

Furthermore, in this configuration, the two element parts 81C and 82 of the parasitic resonant element 80C are coupled by the PIN diode 91, and the two element parts 84 and 85 of the parasitic resonant element 83 are coupled by the PIN diode 94.

Figure 22A:
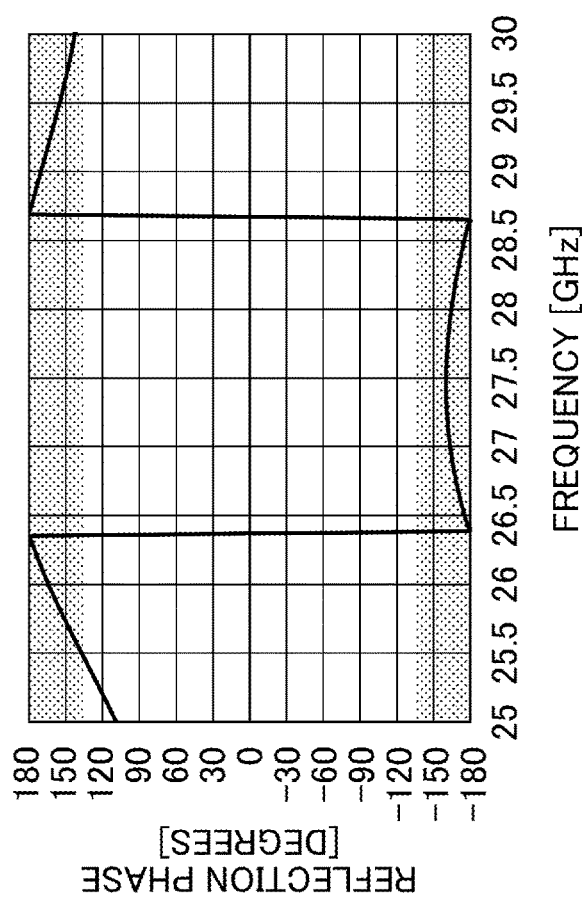
FIG. 22A and FIG. 22B are diagrams showing reflection phases and phase differences when a PIN diode is ON and OFF in the measurement model of the comparative example of FIG. 21.
Figure 22B:
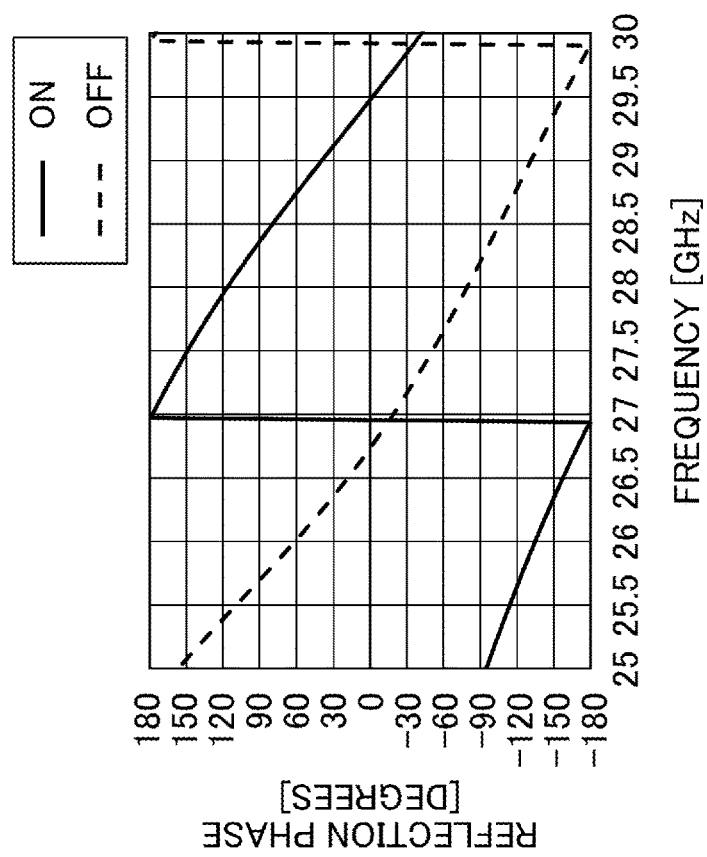

FIG. 22A and FIG. 22B are diagrams showing the reflection phase and the phase difference when the PIN diode is ON and OFF in the model of the comparative example shown in FIG. 21. In FIG. 22A, the solid line indicates the reflection phase when the PIN diode is ON, and the dotted line indicates the reflection phase when the PIN diode is OFF. In FIG. 22A, the vertical axis represents a reflection phase, and the horizontal axis represents a frequency.

FIG. 22B shows the phase difference between the reflection phases shown in FIG. 22A when the PIN diode is ON and the reflection phase when the PIN diode is OFF. In FIG. 22B, the vertical axis represents a reflection phase difference and the horizontal axis represents a frequency.

The diagram of FIG. 22A shows the reflection phase of a radio wave returning to the Z-axis when the radio wave is incident from the Z-axis as shown in FIG. 7B. As shown in FIG. 22A, the reflection phase of the reflected wave at the time of ON and the reflection phase of the reflected wave at the time of OFF shift with substantially the same inclination in the band of 25 to 30 GHz.

Therefore, in the band from 25.4 to 30 GHz of the diagram of the phase differences in FIG. 22B, the phase differences are +180° or −180°, and thus the absolute values of the phase differences fall within the range of 180°±45° indicated by hatching.

When the absolute value of the phase difference is in the range of 180°±45°, the reflection plate functions as a reflection plate capable of adjusting the directivity. Therefore, a portion above 135° and a portion below −135° in FIG. 22B is a frequency range in which the reflection plate particularly suitably operates.

Figure 23:
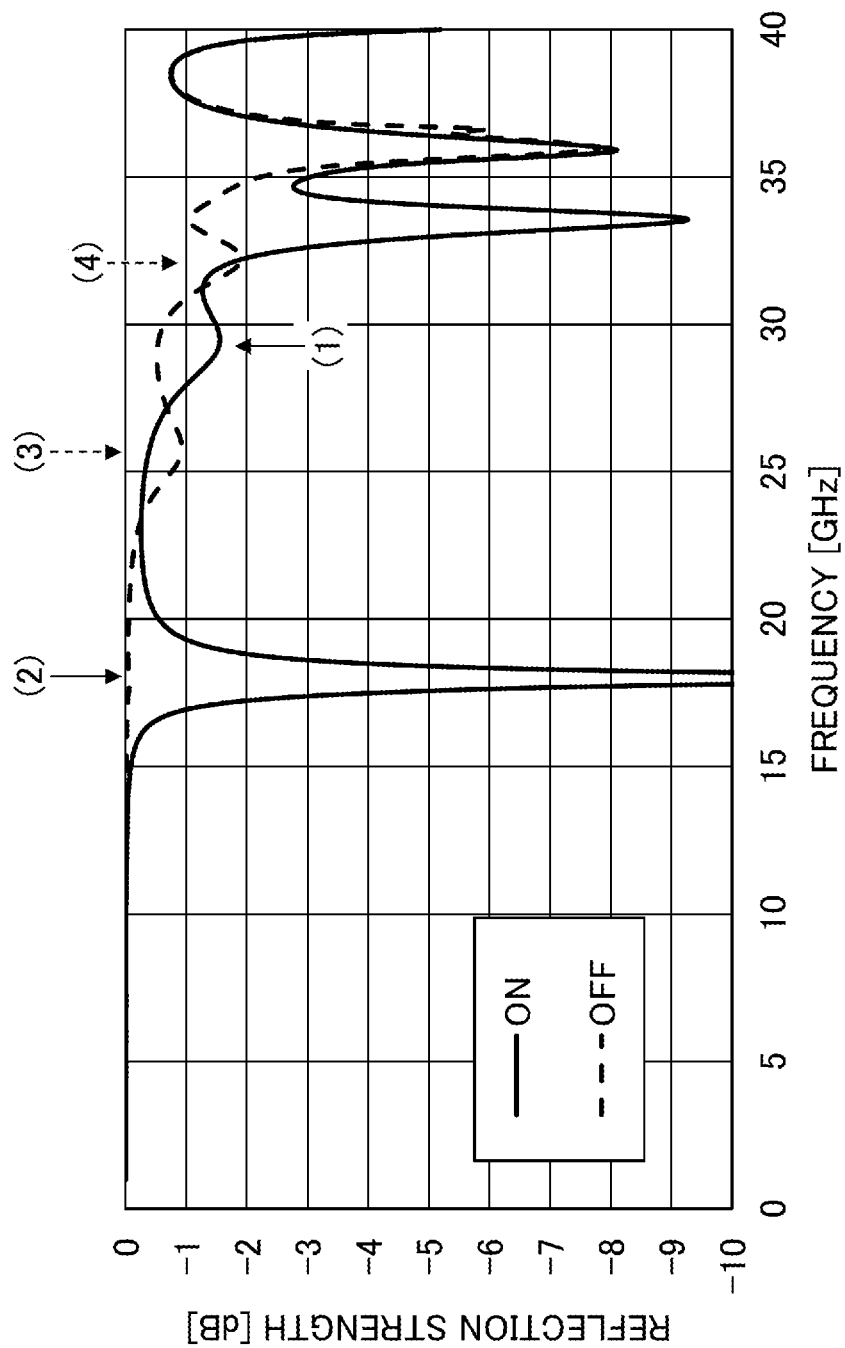
FIG. 23 is a diagram showing a reflection intensity of the measurement model of the comparative example of FIG. 21 when the PIN diode is ON and OFF.

FIG. 23 is a diagram showing reflection intensities of the model of the comparative example shown in FIG. 21 when the PIN diode is ON and OFF.

In FIG. 23, the solid line indicates the reflection intensity when the PIN diode is ON, and the dotted line indicates the reflection intensity when the PIN diode is OFF. In addition, a drop position of the waveform indicates a resonance position.

A drop (1) when the PIN diode is ON in FIG. 23 is a loss due to resonance of the main resonant element. A drop (2) is a loss due to resonance of the parasitic resonant element which is in the ON state and is constituted by one element part.

Drops (3) and (4) when the PIN diode is OFF are losses due to resonance generated by reconfiguration (coupling) according to interaction in the fundamental mode.

Here, it is preferable that the reflection intensity is large (for example, about 0 to −3 dB) in the band (phase 180°±30°). When the measurement model of this comparative example is used for radio waves of 28 GHz frequencies, the reflection intensity satisfies this requirement.

When the measurement results are applied to the example of the behavior of frequencies shown in FIG. 11, as shown in FIG. 23, the main resonant frequency fmain of the main resonant element as a single element is 29 GHz at (1), and the first parasitic resonant frequency fcpara1 of the parasitic resonant element as a single element is 18 GHz at (2). The second parasitic resonant frequency fcpara2 of the parasitic resonant element as a single element is 29 GHz, the same as the main resonant frequency. In the second state, the resonant frequency fr2a reconfigured by the interaction is 32.0 GHz at (4), and the resonant frequency fr2b is 25.4 GHz at (3).

Therefore, the band of frequencies between the reconfigured two resonant frequencies fr2a and fr2b shown in (b) in FIG. 11 is a band of frequencies realized by the difference of frequencies of 180°±45° as shown in FIG. 22B, and a range of frequencies of 25.4 to 32.0 GHz is a range of frequencies in which the reflection plate in the model of the comparative example operates suitably.

Example 2 (Second Embodiment of the Present Invention)

Figure 24:
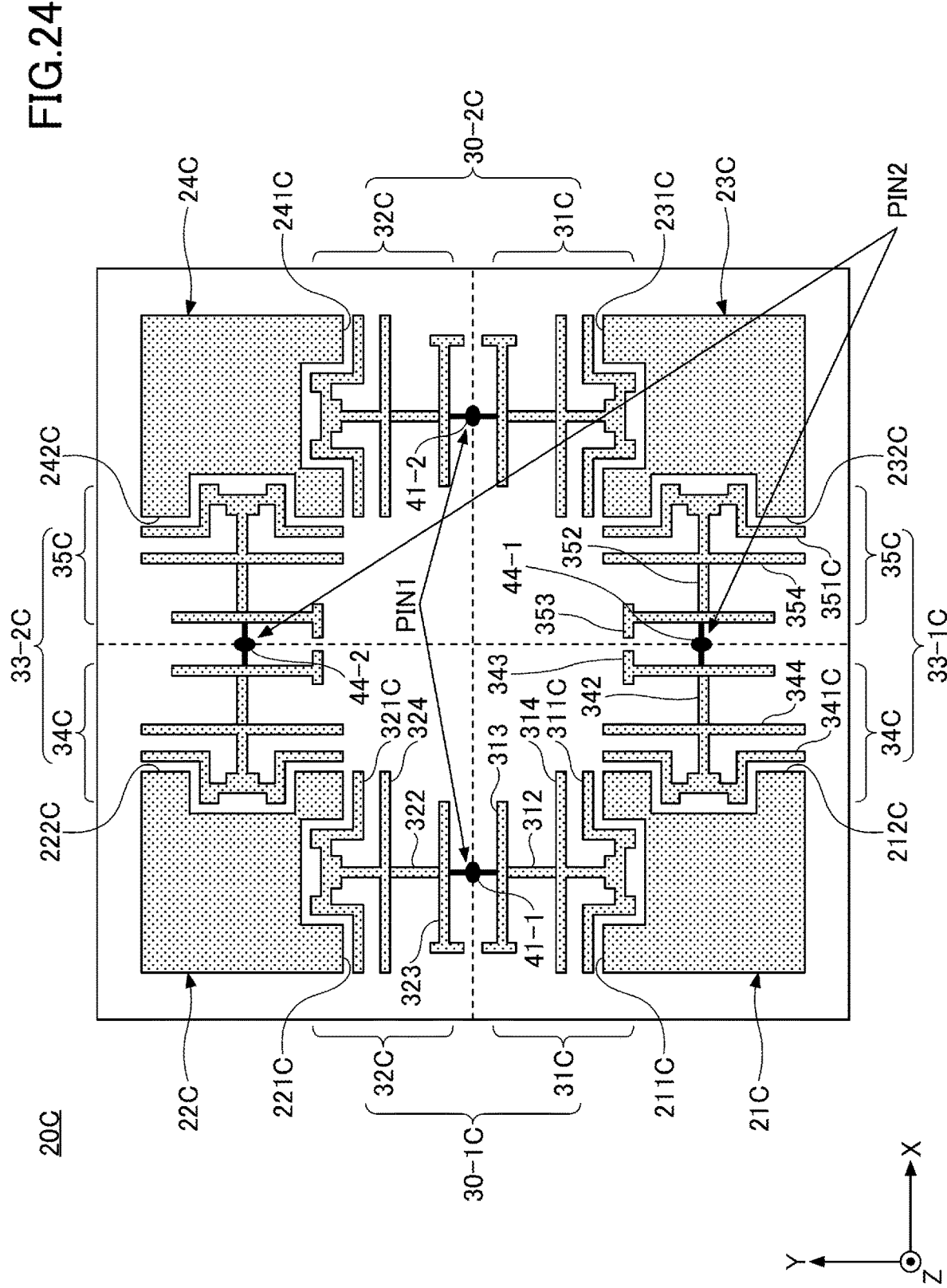
FIG. 24 is a diagram schematically illustrating a measurement model of the main resonant element and the parasitic resonant element in each cell of the reflect array according to the present invention.

FIG. 24 is a diagram schematically illustrating a measurement model of a main resonant element and a parasitic resonant element in each cell of the reflect array according to the present invention. In FIG. 24, the RF choke is omitted.

As in the second embodiment, this measurement model corresponds to polarized waves in two directions, and each cell 20C of the plurality of cells includes four main resonant elements 21C, 22C, 23C, and 24C arranged two by two in the vertical and horizontal directions, and four parasitic resonant elements 30-1C, 30-2C, 33-1C, and 33-2C interposed between adjacent main resonant elements.

The parasitic resonant elements 30-1C, 30-2C, 33-1C, and 33-2C in the present measurement model are provided adjacent to each of the four main resonant elements 21C, 22C, 23C, and 24C in two orthogonal directions.

The main resonant element according to this configuration has a shape obtained by removing a part from a quadrangle. Specifically, two sides of each quadrangle, i.e., first sides 211C, 221C, 231C, and 241C opposite the closest first elements of the parasitic resonant elements 30-1C and 30-2C corresponding to the vertically polarized wave and second sides 212C, 222C, 232C, and 242C opposite the closest first elements of the parasitic resonant elements 33-1C and 33-2C corresponding to the horizontally polarized wave are recessed in a quadrangular shape.

The closest first elements 311C, 321C, 341C, and 351C opposite the recessed sides of the main resonant elements are bent along the recessed sides.

In the element part 31C of the parasitic resonant element 30-1C corresponding to the vertical polarization, the fourth element 314 orthogonal to the second element 312 is provided between the first element 311C and the third element 313. Similarly, the fourth elements 324, 344, and 354 are provided in the element parts 32C of the parasitic resonant elements 30-1C and 30-2C and the element parts 34C and 35C of the parasitic resonant elements 33-1C and 33-2C.

Figure 25B:
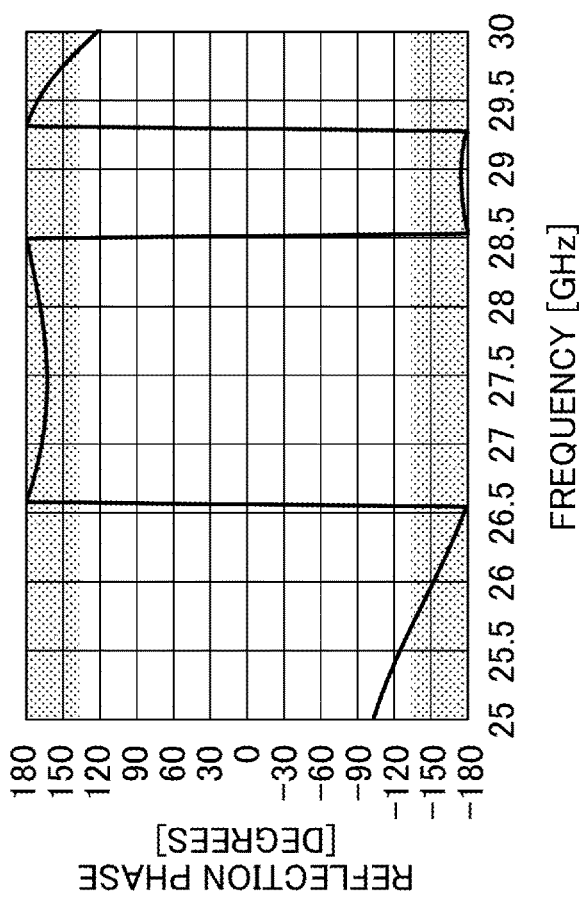
FIG. 25A and FIG. 25B are diagrams showing reflection phases and phase differences when a PIN diode is ON and OFF in the measurement model of the present invention shown in FIG. 24.
Figure 25A:
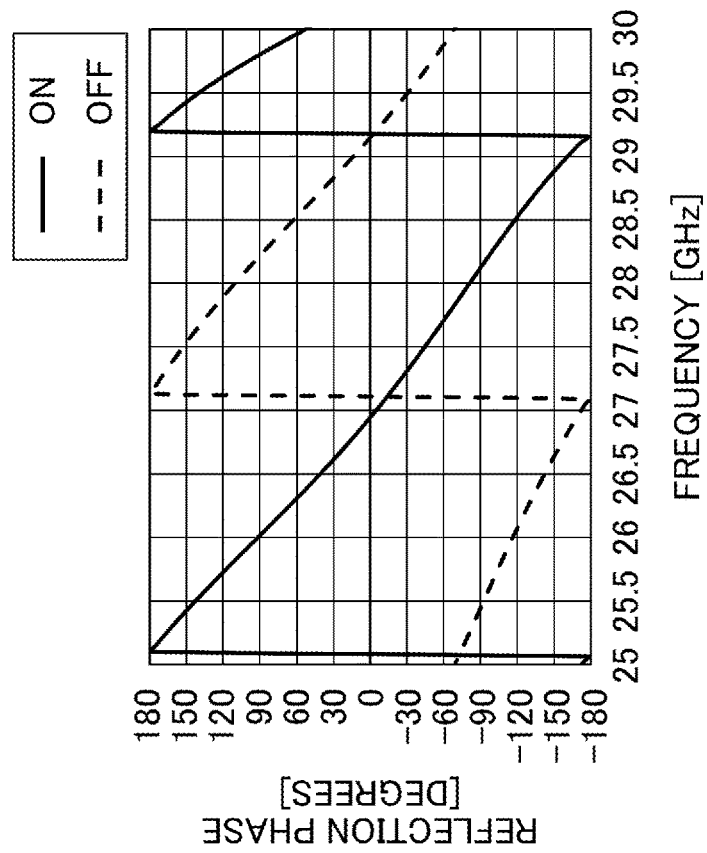

FIG. 25A and FIG. 25B are diagrams showing the reflection phase and the phase difference when the PIN diode is ON and OFF in the measurement model of the present invention shown in FIG. 24. In FIG. 25A, the solid line indicates the reflection phase when the PIN diode is ON, and the dotted line indicates the reflection phase when the PIN diode is OFF. In FIG. 25A, the vertical axis represents a reflection phase, and the horizontal axis represents a frequency.

FIG. 25B shows the phase difference between the reflection phase when the PIN diode of FIG. 25A is ON and the reflection phase when the PIN diode is OFF. In FIG. 25B, the vertical axis represents a reflection phase difference and the horizontal axis represents a frequency.

The diagram of FIG. 25A shows the reflection phase of the radio wave returning to the Z-axis when the radio wave is incident from the Z-axis as shown in FIG. 7B. As shown in FIG. 25A the reflection phase of the reflected wave at the time of ON and the reflection phase of the reflected wave at the time of OFF shift with substantially the same inclination in the band of 25 to 30 GHz.

Therefore, in the range of 25.7 to 29.9 GHz in the diagram of FIG. 25B, the phase differences are +180° or −180°, and thus the absolute values of the phase differences in this range are within the range of 180°±45° indicated by hatching.

When the absolute value of the phase difference is in the range of 180°±45°, the reflection plate functions as a reflection plate capable of adjusting the directivity. Therefore, a portion above 135° or a portion below −135° in FIG. 25B is a frequency range in which the reflection plate particularly suitably operates.

Figure 26:
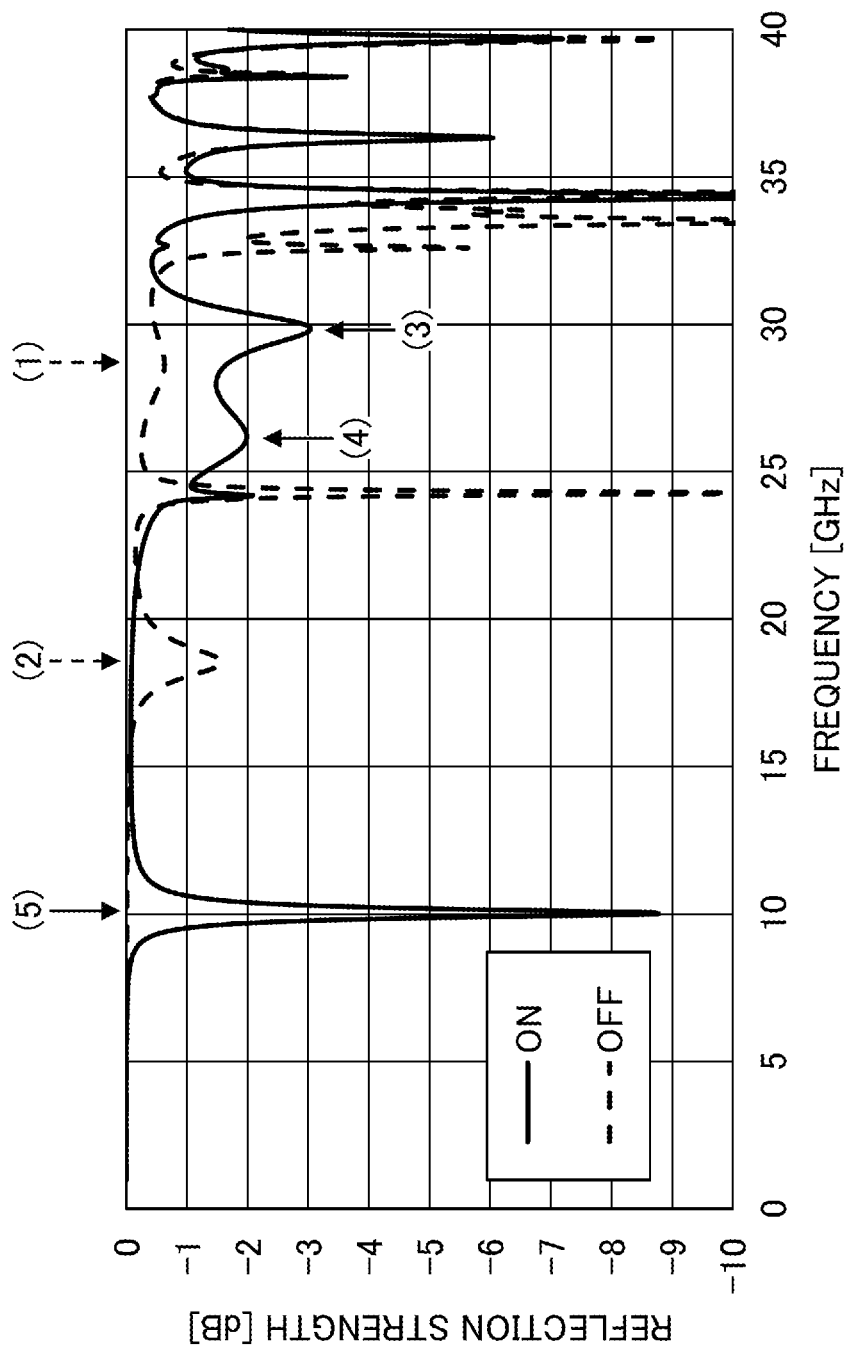
FIG. 26 is a diagram showing a reflection intensity of the measurement model of the present invention shown in FIG. 24 when the PIN diode is ON and OFF.

FIG. 26 is a diagram showing the reflection intensities of the measurement model of the present invention shown in FIG. 24 when the PIN diode is ON and OFF.

In FIG. 26, the solid line indicates the reflection intensity when the PIN diode is ON, and the dotted line indicates the reflection intensity when the PIN diode is OFF. In addition, a drop position of the waveform indicates a resonance position.

A drop (1) when the PIN diode is OFF in FIG. 26 is a loss due to resonance of the main resonant element. The drop (2) is a loss according to resonance of the parasitic resonant element which is in the OFF state and is constituted by one element part.

Drops (3) and (4) when the PIN diode is ON are losses due to resonance generated by reconfiguration (coupling) according to interaction in a higher-order mode. The drop (5) is a loss according to the fundamental resonance mode in which the parasitic resonant element does not interact.

Here, it is preferable that the reflection intensity is large (for example, about 0 to −3 dB) in the band (phase 180°±30°). When the measurement model of the present invention is used for radio waves of 28 GHz frequencies, this reflection intensity satisfies this requirement.

For example, when the measurement results are applied to the example of the frequencies shown in FIG. 14, the main resonant frequency fmain of the main resonant element and the parasitic resonant frequency fpara1 of the second order mode of the parasitic resonant elements in the first state are 28 GHz at (1) as shown in FIG. 26. The parasitic resonant frequency in the fundamental mode of the parasitic resonant element in the first state is 10 GHz at (5). The second parasitic resonant frequency fpara2 of the parasitic resonant element as a single element is 18 GHz at (2). In the first state, the resonant frequency fr11 reconfigured by the interaction is 29.9 GHz at (3), and the resonant frequency fr12 is 25.7 GHz at (4).

Therefore, the band of frequencies between the reconfigured two resonant frequencies fr11 and fr12 shown in (b) in FIG. 14 is a band of frequencies realized by the difference of frequencies of 180°±45° as shown in FIG. 25B, and a range of frequencies of 25.7 to 29.9 GHz is a range of frequencies in which the reflection plate in the present model operates suitably.

Figure 27:
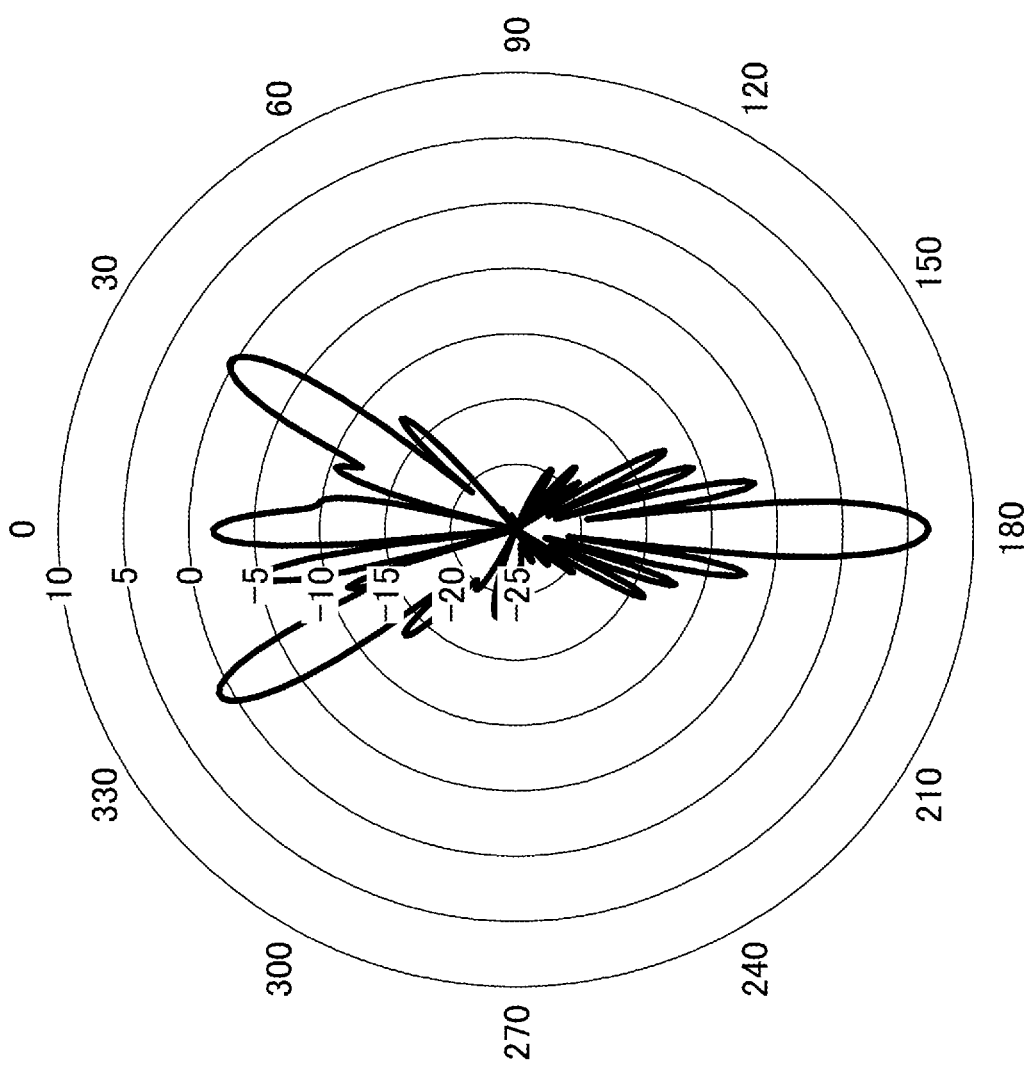
FIG. 27 is a radar chart showing a reflection in the measurement model of the present invention of FIG. 24 at a target reflection angle of 30°.

FIG. 27 is a radar chart showing reflection in the measurement model of the present invention shown in FIG. 24 at a target reflection angle of 30°.

The target reflection angle of 30° in the present measurement is realized by turning ON/OFF the diode of the cell as shown in (b) in FIG. 29 described later.

As shown in FIG. 27, when radio waves are incident from a surface in a direction perpendicular to the surface of the reflect array, the radio waves are found to be greatly reflected in the directions of 30° and −30°. As a result, by controlling at a target angle of 30°, it was possible to reflect radio waves in desired directions of 30° and −30°.

As described above, in the reflect array of the present invention, even if the number of parasitic reflective elements (parasitic resonant elements) and diodes for control is reduced, the directivity of radio waves of the reflect array can be directed to a desired direction.

Control of Second Embodiment

Figure 28:
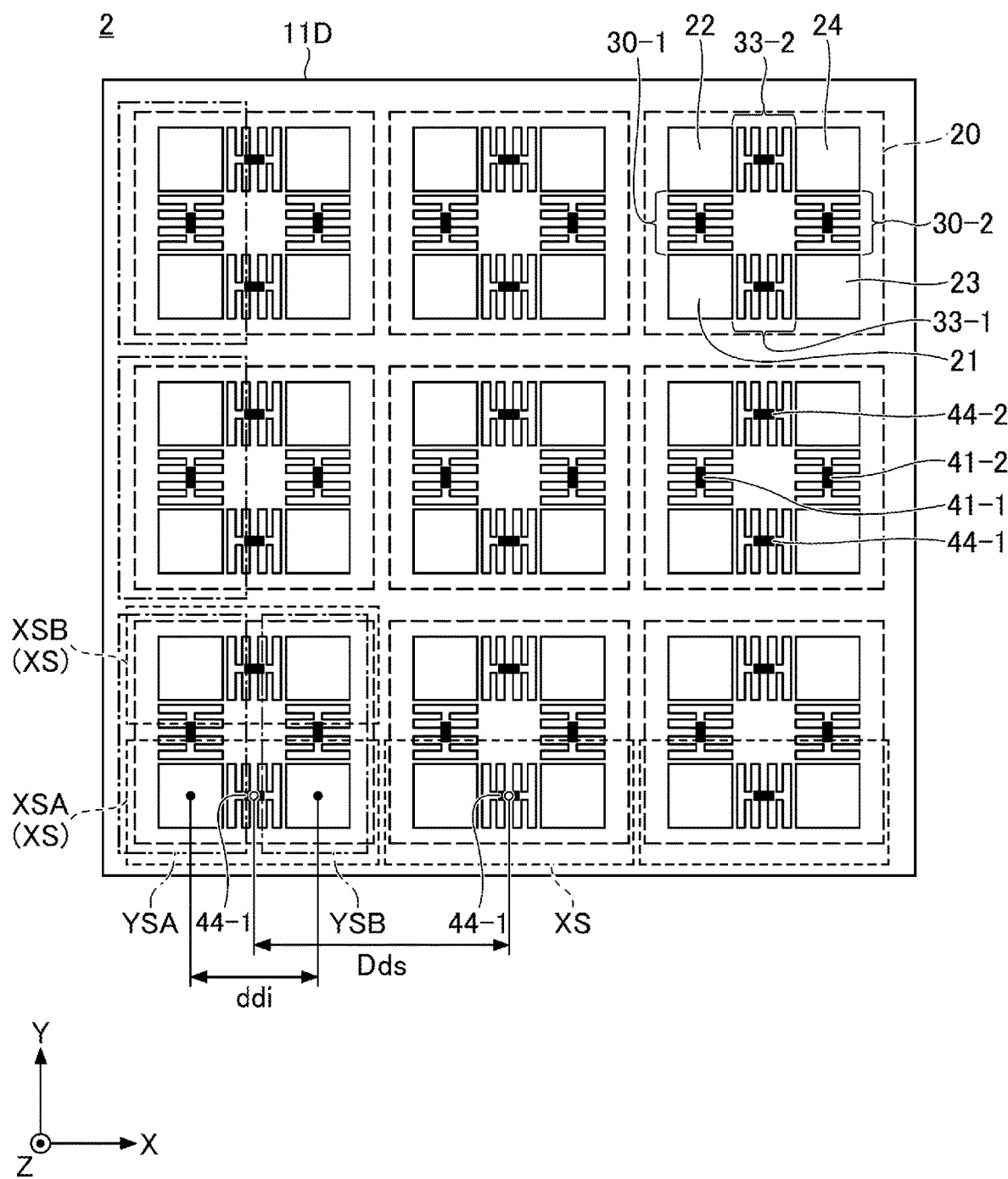
FIG. 28 is a diagram showing an arrangement of the plurality of cells and sub-arrays in the reflect array according to the second embodiment of the present invention.

FIG. 28 is a diagram showing an arrangement of the plurality of cells 20 and sub-arrays in the reflect array 2 according to the second embodiment of the present invention.

As shown in FIG. 28, the plurality of cells 20 according to the second embodiment can be arranged on the substrate 11D in the vertical and horizontal directions to form the reflect array 2.

In the present embodiment, each of the plurality of cells 20 has two horizontal sub-arrays XSA and XSB in the vertical direction and two vertical sub-arrays YSA and YSB in the horizontal direction.

The horizontal sub-array XS is a region to which the same phase shift is applied when the angle is adjusted with respect to the horizontally polarized wave, and is a horizontally long region in which the main resonant element, the parasitic resonant element, and the main resonant element are arranged in the X-axis direction (horizontal direction) so as to be (21, 33-1, 23)/(22, 33-2, 24). In the horizontal sub-array XS, the parasitic resonant elements 33-1 and 33-2, whose resonance values are electrically controlled by the PIN diodes 44-1 and 44-2, respectively, are coupled to the two main resonant elements (21, 23) and (22, 24) being arranged horizontally, thereby adjusting the reconfigured resonant frequency.

The vertical sub-array YS is a region to which the same phase shift is applied when the angle is adjusted with respect to the vertically polarized wave, and is a vertically long region in which the main resonant element, the parasitic resonant element, and the main resonant element are arranged in the Y-axis direction (vertical direction) so as to be (21, 30-1, 22)/(23, 30-2, 24). In the vertical sub-array YS, the parasitic resonant elements 30-1 and 30-2, whose resonance values are electrically controlled by the PIN diodes 40-1 and 40-2, respectively, are coupled to the two main resonant elements (21, 22) and (23, 24) being arranged in the vertical direction, thereby adjusting the reconfigured resonant frequency.

Figure 29:
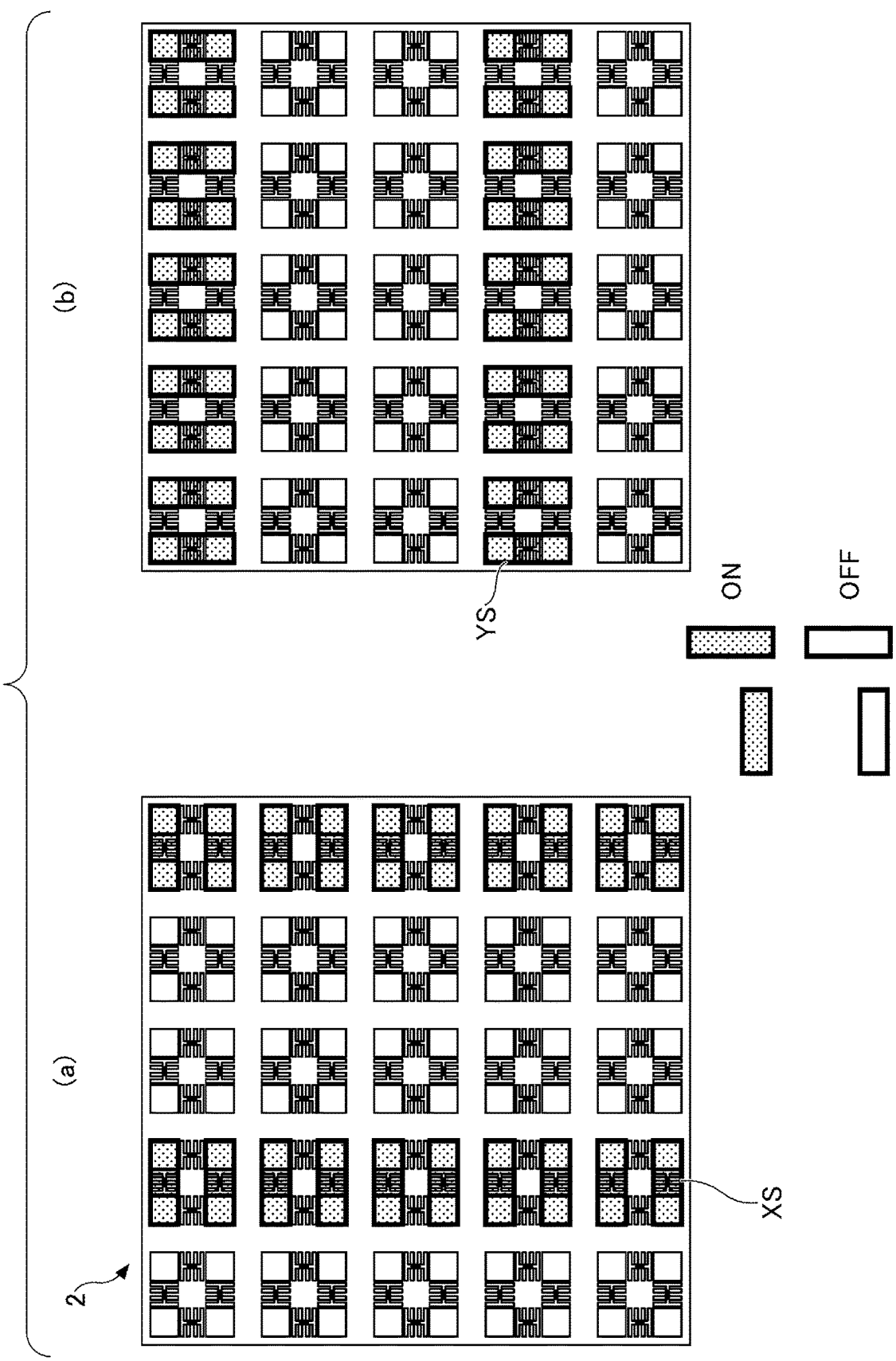
FIG. 29 is a diagram for explaining a voltage application pattern for the cells arranged in the reflect array according to the second embodiment.

FIG. 29 is a diagram for explaining a voltage application pattern of cells arranged in the reflect array 2 according to the second embodiment.

In the reflect array 2 of FIG. 28, when an angle in the horizontal direction is changed with respect to a horizontally polarized wave, as shown in (a) in FIG. 29, the horizontal sub-arrays XS indicated by thick frames are controlled so as to be ON/OFF aligned in the vertical direction.

In the reflect array 2 of FIG. 28, when an angle in the vertical direction is changed with respect to a vertically polarized wave, as shown in (b) in FIG. 29, the vertical sub-arrays YS indicated by thick frames are controlled so as to be ON/OFF aligned in the horizontal direction.

Here, in the reflect array 2 having the configuration shown in FIG. 28 of the present embodiment, when the interval (inter-element distance) between the main resonant elements 21 and 23 in the horizontal sub-array XS is ddi, the interval between the horizontal sub-arrays XS adjacent to each other in the horizontal direction, more specifically, the interval Dds between the PIN diodes 44-1 as the electric switches of the horizontal sub-arrays XS adjacent to each other in the horizontal direction is 2ddi.

Here, the interval ddi between the main resonant elements 21 and 23 is preferably set to about $(1/2)\lambda_0$, where $\lambda_0$ is the free space wavelength of the frequency of the radio wave. For example, the range of the wave length is $(1/2)\lambda_0 \pm 20\%$. Therefore, in the present embodiment, since the distance Dds between the horizontal sub-arrays in the X-axis direction is twice the interval ddi between the main resonant elements 21 and 23, the interval between the adjacent horizontal sub-arrays XS is $\lambda_0$.

The same applies to the vertical sub-arrays YS, and since the distance between the vertical sub-arrays YS in the Y-axis direction is twice the interval between the main resonant elements 21 and 22, the interval between the adjacent vertical sub-arrays YS is $\lambda_0$.

Third Embodiment

Figure 30:
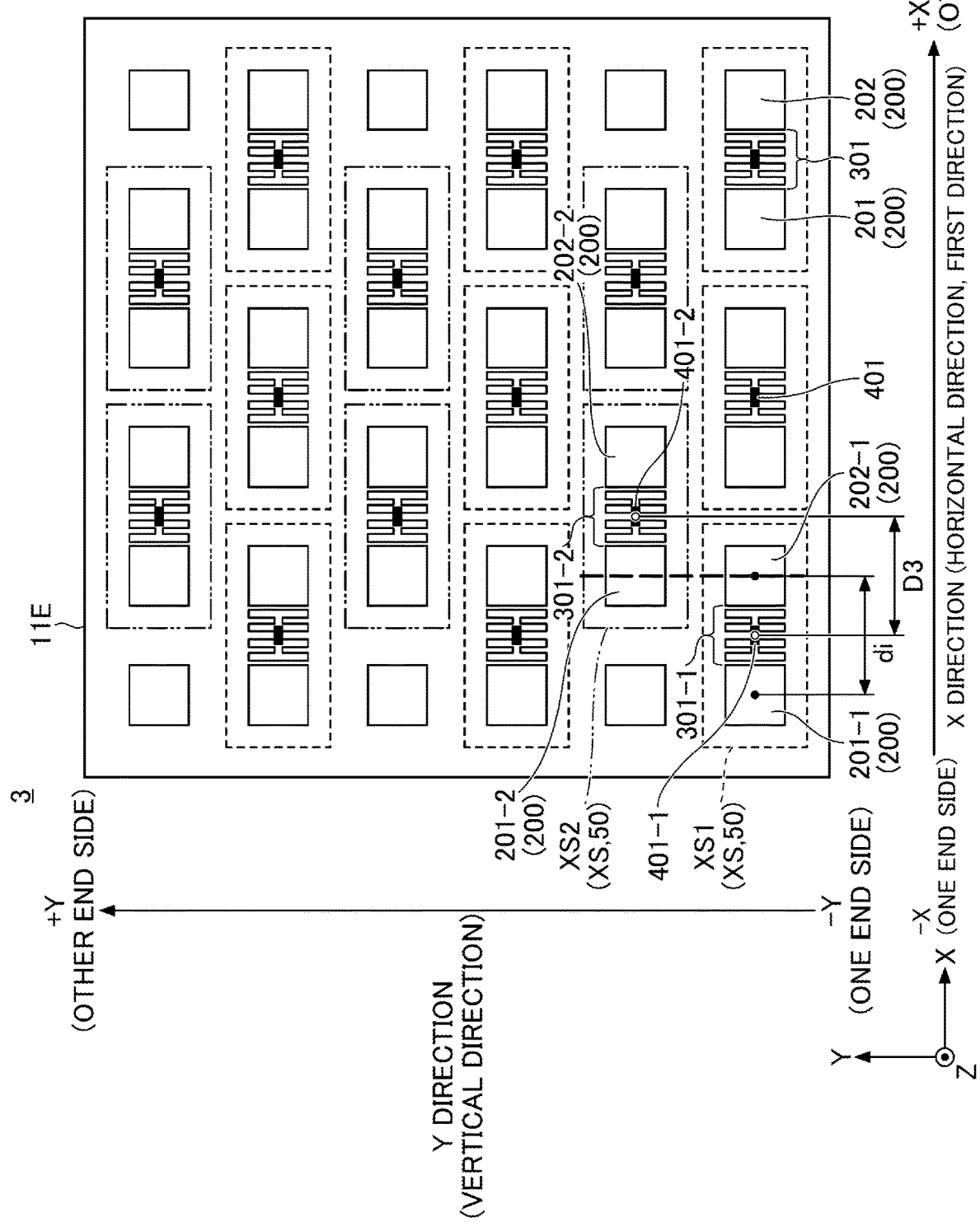
FIG. 30 is a diagram showing an arrangement of a plurality of cells and sub-arrays in a reflect array according to a third embodiment of the present invention.

FIG. 30 is a diagram showing an arrangement of a plurality of cells and sub-arrays in the reflect array 3 according to the third embodiment of the present invention.

In the present embodiment, the plurality of cells 50 in the reflect array 3 are arranged in a staggered manner, unlike the first embodiment in which the cells are regularly arranged in the vertical and horizontal directions shown in FIG. 5.

Specifically, in the present embodiment, each of the plurality of cells 50 includes two main resonant elements 201 and 202 and a parasitic resonant element 301 coupled to the two main resonant elements 201 and 202, so that the main resonant element 201, the parasitic resonant element 301, and the main resonant element 202 are arranged in this order in the X-axis direction (horizontal direction, first direction). In each cell 50, a parasitic resonant element 301, whose resonance value of the parasitic resonant element as a single element is electrically controlled by a PIN diode 401, is coupled to two main resonant elements 201 and 202 arranged side by side, thereby adjusting a reconfigured resonant frequency.

Further, the plurality of cells 50 are provided in the X-axis direction and the Y-axis direction orthogonal to the X-axis direction, and in the reflect array 3, the main resonant elements 200 which are reflective elements are arranged at equal intervals at least in the horizontal direction.

In the present embodiment, since the main resonant element 201, the parasitic resonant element 301, and the main resonant element 202 are arranged in the X-axis direction in each of the plurality of cells 50, each cell 50 serves as a horizontal sub-array which is a region to which the same phase shift is applied when the angle is adjusted with respect to the horizontally polarized wave.

In the present embodiment, a cell group of first cell (a cell group indicated by a dotted line in FIG. 30) and a cell group of second cell adjacent to the first cell in the Y-axis direction (a cell group indicated by a double dot chain line in FIG. 30) are shifted in the horizontal direction (X-axis direction) for each row, so that the plurality of cells are arranged in a staggered manner. The shift width in the horizontal direction between the cell group of first cell and the cell group of second cell is the sum of one main resonant element and one parasitic resonant element. Thus, in the staggered arrangement, the main resonant elements 202-1 on the other end side (+X side) in the X-axis direction of the first horizontal sub-array (XS1) and the main resonant elements 201-2 on one end side (−X side) in the X-axis direction of the second horizontal sub-array (XS2) adjacent to the first horizontal sub-array (XS1) in the Y-axis direction are located at the same position (overlap) in the X-axis direction.

Figure 31:
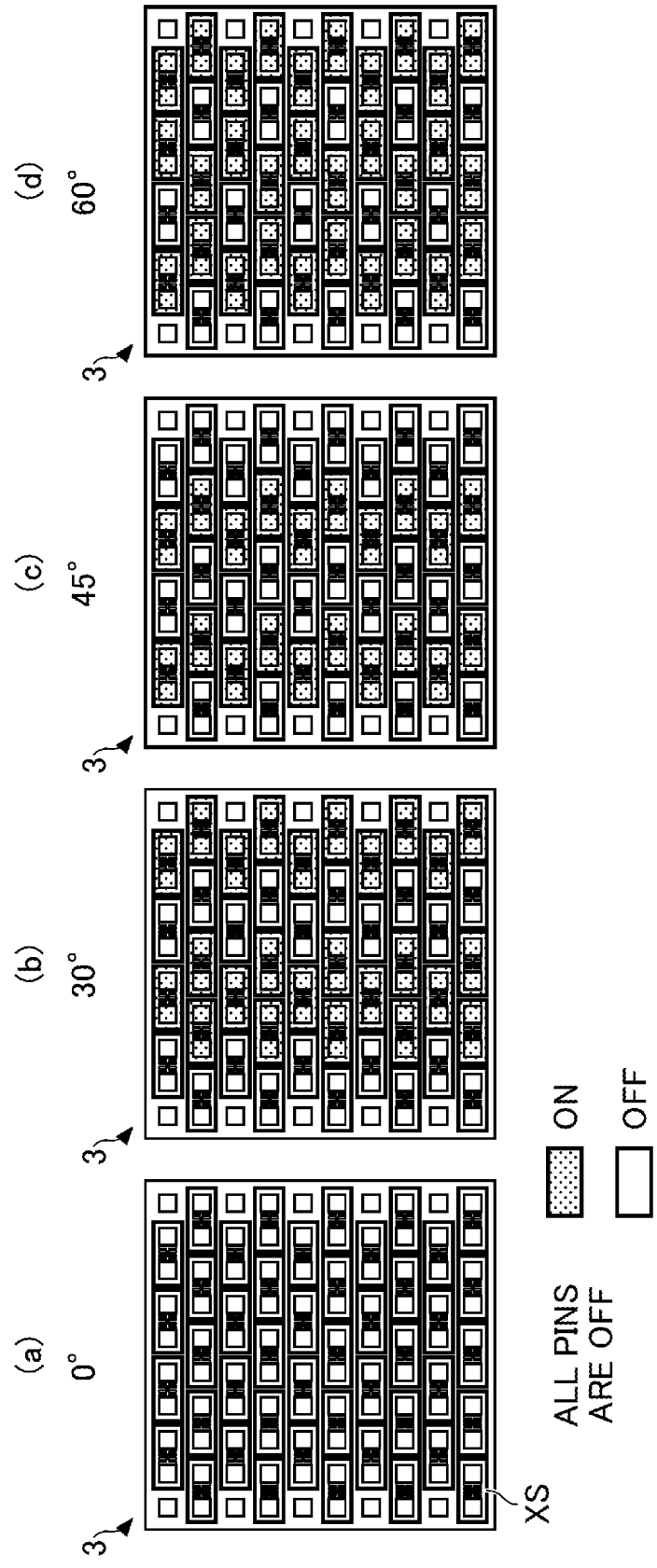
FIG. 31 is a diagram for explaining a voltage application pattern of cells arranged in a reflect array according to the third embodiment.

FIG. 31 is a diagram for explaining a voltage application pattern of the horizontal sub-array XS arranged in the reflect array 3 according to the third embodiment. FIG. 31 shows voltage application patterns when radio waves are incident from the direction of the Z-axis perpendicular to the surface of the reflect array 3. Specifically, (a) in FIG. 31 shows a case where the target angle is 0°, (b) in FIG. 31 shows a case where the target angle is 30°, (c) in FIG. 31 shows a case where the target angle is 45°, and (d) in FIG. 31 shows a case where the target angle is 60°. More specifically, the target angles in (b) to (d) in FIG. correspond to the cases where the target angles in the X-axis direction ($\phi=0°$ direction) are 30° ($\phi=0°$, $\theta=30°$), 45° ($\phi=0°$, $\theta=45°$), and 60° ($\phi=0°$, $\theta=$) 60°).

In the present invention, as described above, a voltage application pattern (ON/OFF pattern) is calculated in the microcomputer for each incident wave source position and target angle as an indication of directivity to the reflect array. The target angle of the reflection angle in the horizontally polarized wave in FIG. 30 corresponds to the inclination angle in the horizontal direction with respect to the Z-axis which is the incident direction.

In the reflect array 3 of the present embodiment, when the angle is changed in the horizontal direction with respect to the horizontally polarized wave, as illustrated in (b) to (d) in FIG. 31, the horizontal sub-array XS is subjected to ON/OFF control so as to extend in the vertical direction while increasing, decreasing, or meandering while including the main resonant element having the same X-axis direction.

Here, it is known that in an antenna or a reflection plate, as the distance between sub-arrays increases, a phenomenon called a grating lobe occurs in which a beam is radiated in an undesired direction different from the direction in which the beam is directed. When the grating lobe occurs, a scanning angle in a direction in which the beam is directed is narrowed in the reflective element in the array. Such a reduction in the beam scanning angle due to the grating lobe hardly occurs when the element interval d is $(\frac{1}{2})\lambda_0$, but as the element interval d becomes larger than $(\frac{1}{2})\lambda_0$, the reduction of the scanning angle increases.

In the present embodiment, the interval di between the main resonant elements 201 and 202 in the horizontal sub-array XS is set to $(\frac{1}{2})\lambda_0 \pm 20\%$, where $\lambda_0$ is the free space wavelength of the frequency of the radio wave. In this case, the interval between the adjacent horizontal sub-arrays XS (cells 50), that is, the interval D3 between the PIN diodes 401-1 and 401-2 serving as the connection points of the parasitic resonant elements 301-1 and 301-2 is equal to the interval di between the main resonant elements in the X-axis direction, and is $(\frac{1}{2})\lambda_0 \pm 20\%$ similarly to di.

Therefore, in the present embodiment, when the reflection direction is set in the horizontal direction (X-axis direction) as shown in (b) to (d) in FIG. 31, since the interval between the horizontal sub-arrays in the X-axis direction is about $(\frac{1}{2})\lambda_0$, it is considered that it is possible to reduce the angle region in which the reduction of the beam scanning angle due to the grating lobe occurs.

In the examples of FIGS. 30 and 31, the reflect array 3 capable of adjusting the angle in the horizontal direction with respect to the horizontally polarized wave is shown, and an example in which the first direction is the horizontal direction (X-axis direction) of FIG. 30 is shown. However, in the reflect array of the present embodiment, a configuration in which the angle in the vertical direction with respect to the vertically polarized wave can be adjusted is also possible. In this case, the first direction is set to the Y-axis direction (vertical direction), and each of the plurality of cells is similarly arranged in a staggered arrangement such that the main resonant element, the parasitic resonant element, and the main resonant element are arranged in the Y-axis direction (vertical direction).

With such a configuration, the reflect array 3 according to the present embodiment can change the reflection angle of a polarized wave in a specific direction without causing a reduction in the beam scanning angle due to the grating lobe.

Also in the present embodiment, one parasitic resonant element and one PIN diode for electrically controlling the parasitic resonant element are provided for two main resonant elements in a corresponding cell with respect to a polarized wave in a specific direction (horizontally polarized wave in the example of FIG. 30). That is, one diode is sufficient for two reflective elements.

Therefore, also in the present embodiment, the number of parasitic resonant elements and PIN diodes is half the number of main resonant elements which are reflective elements, and thus the number of components per reflect array, that is, the number of parasitic resonant elements and PIN diodes with respect to the main resonant elements in the reflect array can be reduced.

Fourth Embodiment

Figure 32:
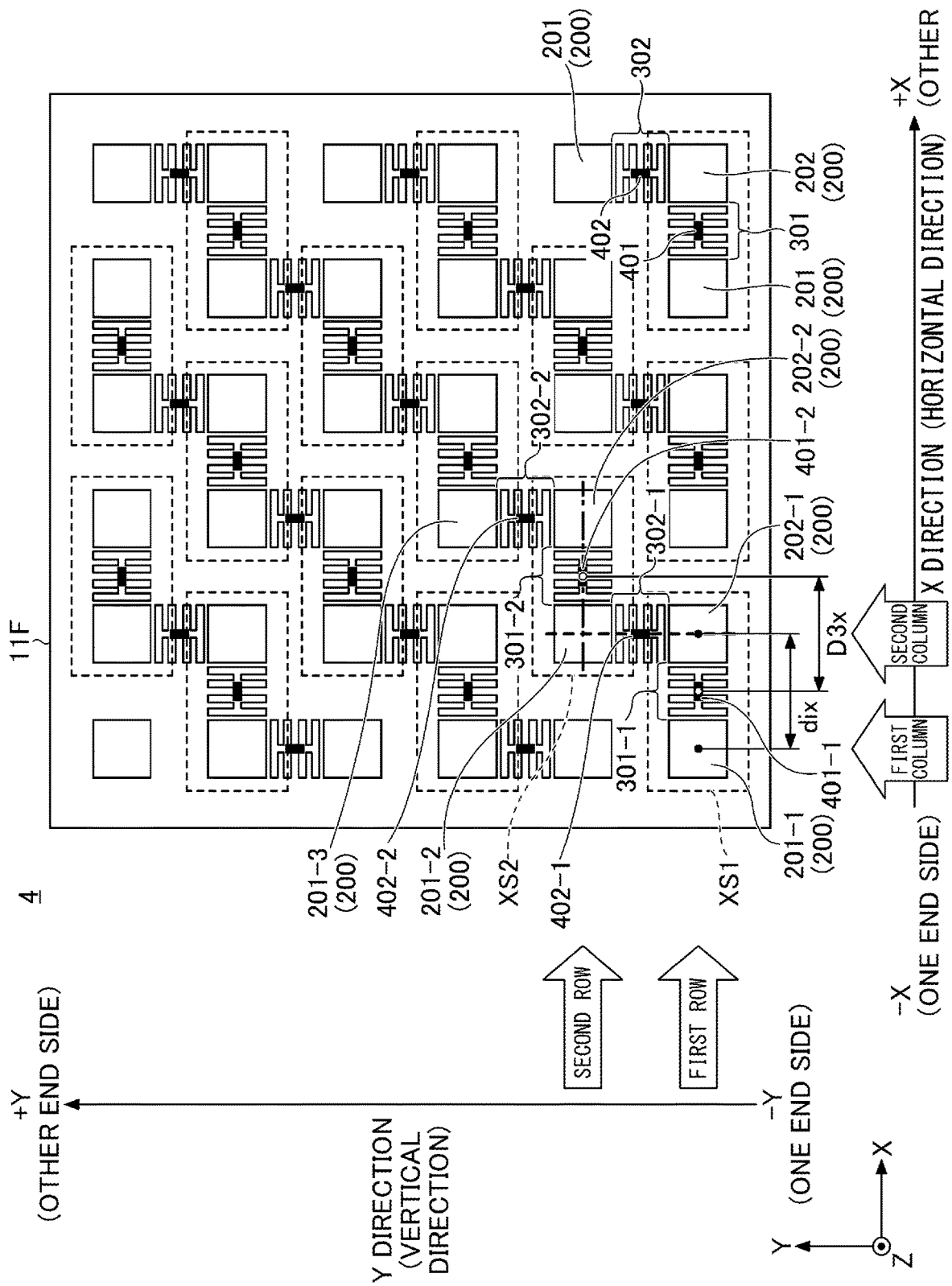
FIG. 32 is a diagram showing a cell for a case of horizontal polarization in a reflect array according to a fourth embodiment of the present invention.
Figure 33:
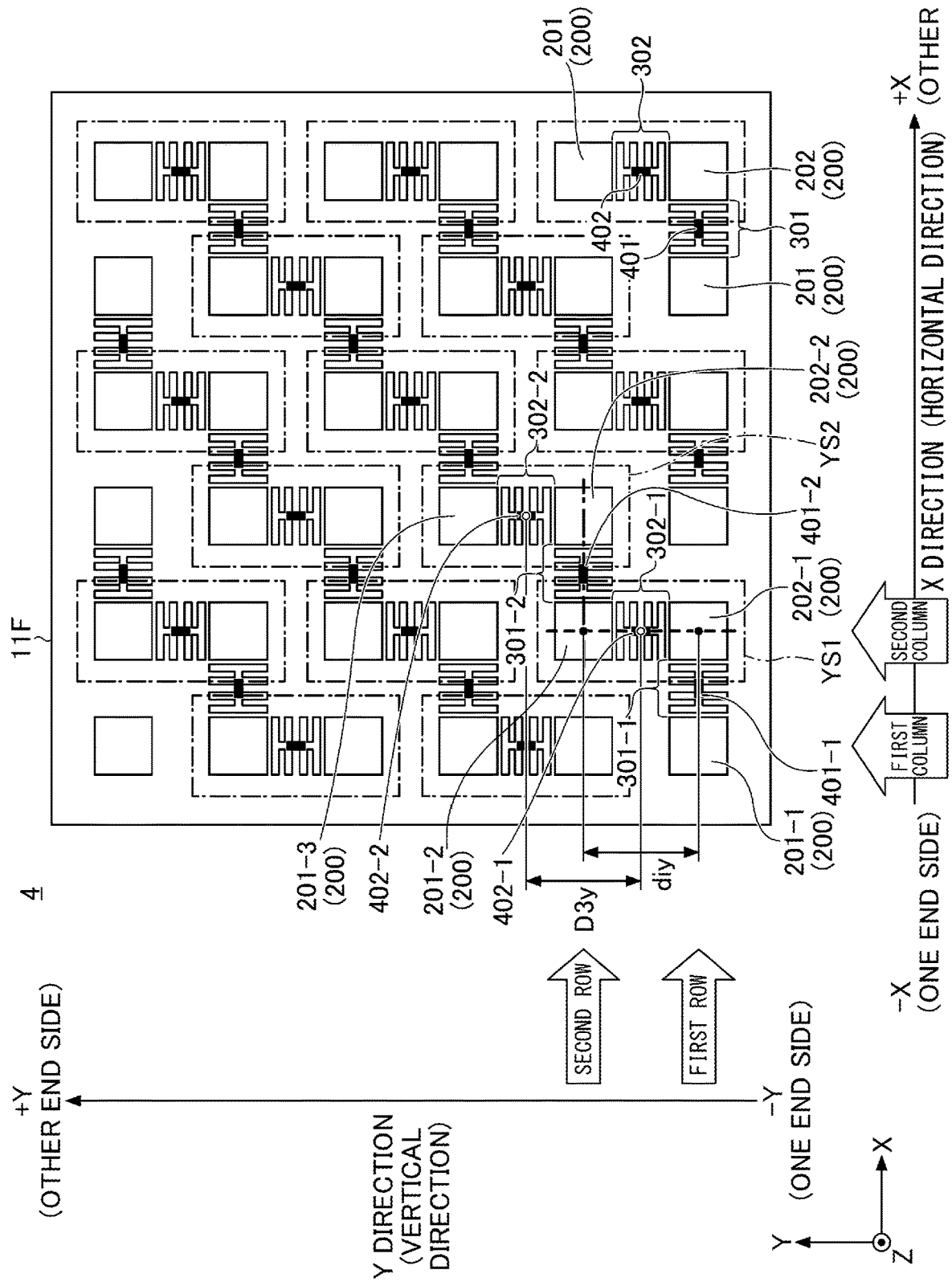
FIG. 33 is a diagram showing a cell for a case of vertical polarization in a reflect array according to the fourth embodiment of the present invention.

FIG. 32 is a diagram showing a cell in the case of horizontal polarization in the reflect array 4 according to a fourth embodiment of the present invention. FIG. 33 is a diagram showing a cell in the case of vertical polarization in the reflect array 4 according to the fourth embodiment of the present invention.

In the present embodiment, the cell boundary changes depending on the polarization direction. In the case of a horizontally polarized wave (a polarized wave having an electric field in the X-axis direction), as indicated by a dotted line in FIG. 32, the main resonant element, the parasitic resonant element, and the main resonant element arranged in the X-axis direction form a horizontally long unit cell. In the case of vertically polarized waves (polarized waves having an electric field in the Y-axis direction), as indicated by the alternate long and short dash line in FIG. 33, the main resonant element, the parasitic resonant element, and the main resonant element arranged in the Y-axis direction form a vertically long unit cell.

In the reflect array 4 of the present embodiment, in addition to the horizontal sub-arrays XS, the vertical sub-arrays YS are also arranged in a staggered manner.

Specifically, as shown in FIG. 32, the reflect array 4 of the present embodiment has a plurality of horizontal sub-arrays XS each having two main resonant elements 201 and 202 and one parasitic resonant element 301 provided between the two main resonant elements 201 and 202 and coupled thereto so that the main resonant element 201, the parasitic resonant element 301, and the main resonant element 202 are arranged in the horizontal direction as in the third embodiment. In the case of horizontal polarization, the horizontal sub-array XS becomes a unit cell. In each horizontal sub-array XS, a parasitic resonant element 301 whose resonance frequency as a single element is electrically controlled by a PIN diode 401 is coupled to two main resonant elements 201 and 202 arranged horizontally, thereby adjusting a reconfigured resonant frequency.

Further, as shown in FIG. 33, there are the reflect array 4 of the present embodiment has a plurality of vertical sub-arrays YS each including two main resonant elements 202 and 201 and one parasitic resonant element 302 provided between the two main resonant elements 202 and 201 and coupled thereto are provided so that the main resonant element 202, the parasitic resonant element 302, and the main resonant element 201 are arranged in the vertical direction. In the case of vertical polarization, the vertical sub-array YS is a unit cell. In each vertical sub-array YS, a parasitic resonant element 302 whose resonance frequency as a single element is electrically controlled by a PIN diode 402 is coupled to two vertically arranged main resonant elements 202 and 201, thereby adjusting a reconfigured resonant frequency.

In the present embodiment, the main resonant elements 200, which are reflective elements, are arranged at equal intervals in the vertical direction and the horizontal direction, that is, arranged in a square shape.

In the horizontal direction, similarly to the third embodiment, the plurality of horizontal sub-arrays XS are arranged in a staggered manner such that the horizontal positions of the main resonant elements 202-1 on the other horizontal end side (+X side) of the first horizontal sub-array XS1 coincide with the horizontal positions of the main resonant elements 201-2 on one horizontal end side (−X side) of the second horizontal sub-array XS2 vertically adjacent to the first horizontal sub-array XS1.

Furthermore, the parasitic resonant elements 301-1 of the vertical sub-arrays YS1 are provided adjacent to the main resonant elements 202-1 on the other end side in the horizontal direction of the first horizontal sub-array XS1 and the main resonant elements 201-2 on one end side in the horizontal direction of the second horizontal sub-array XS2, so that the plurality of vertical sub-arrays YS are arranged in a staggered manner.

By connecting in this way, in the plurality of vertical sub-arrays YS as well, the main resonant elements 201-2 on the other end side (+Y side) in the vertical direction of the first vertical sub-array YS1 and the main resonant elements 202-2 on one end side (−Y side) in the vertical direction of the second vertical sub-array YS2 adjacent to the first vertical sub-array YS1 in the horizontal direction are arranged in a staggered manner so that the positions in the horizontal direction coincide with each other.

In other words, on the substrate 11F of the reflect array 4, the main resonant elements 200 are arranged at equal intervals in the vertical and horizontal directions, and the parasitic resonant elements 301 (control elements) are present, absent, present, absent, . . . , in order in the horizontal direction in odd-numbered rows such as the first row, and the parasitic resonant elements 301 are absent, present, absent, present, . . . , in order in the horizontal direction in even-numbered rows such as the second row. Similarly, in the odd-numbered columns such as the first column, the parasitic resonant elements (control elements) 302 are absent, present, absent, present, . . . , in order in the vertical direction, and in the even-numbered columns such as the second column, the parasitic resonant elements 302 are present, absent, present, absent, . . . , in order in the vertical direction.

With such a configuration, the reflect array 4 of the present embodiment can change the reflection angle with respect to the vertically polarized wave and the horizontally polarized wave.

FIG. 34 is a diagram for explaining a voltage application pattern of sub-arrays in the reflect array 4 according to the fourth embodiment. (a) in FIG. 34 illustrates an example in which the target angle is 30° (ϕ=0°, θ=30°) in the X-axis direction (direction of ϕ=0°) with respect to the horizontally polarized wave. (b) in FIG. 34 illustrates an example in which the target angle is 30° (ϕ=30°, θ=0°) in the Y-axis direction (direction of θ=0°) with respect to the vertically polarized wave.

In the reflect array 4 of the present embodiment, when the angle in the vertical direction is changed with respect to the horizontally polarized wave, as shown in (a) in FIG. 34, the horizontal sub-array XS indicated by the thick frame is subjected to ON/OFF control so as to extend in the vertical direction while increasing or decreasing, including the main resonant element having the same X-axis direction. When the target angle is 30°, as shown in (a) in FIG. 34, the cells to be turned ON extend in the vertical direction while increasing or decreasing, but when the target angle is an angle different from 30°, the cells to be turned ON may extend in the vertical direction while meandering as shown in (c) and (d) in FIG. 31.

In the present embodiment, when the reflection direction is set in the horizontal direction (X-axis direction) as shown in (a) in FIG. 34, since the interval between the horizontal sub-arrays in the X-axis direction is about (½)λ$_0$ similarly to the third embodiment, it is considered to be possible to reduce the angular region in which the beam scanning angle by the grating lobe.

In the reflect array 4 of the present embodiment, when the angle in the horizontal direction is changed with respect to the vertically polarized wave, as shown in (b) in FIG. 34, the vertical sub-array YS is subjected to ON/OFF control so that the vertical sub-array YS extends in the horizontal direction while increasing or decreasing, including the main resonant elements whose Y-axis directions coincide with each other. When the target angle is 30°, as shown in (b) in FIG. 34, the cells to be turned ON extend in the horizontal direction while increasing or decreasing, but when the target angle is an angle different from 30°, the cells to be turned ON may extend in the horizontal direction while meandering.

In this embodiment, since the main resonant elements 200 are arranged at equal intervals in the vertical direction and the horizontal direction, the interval diy between the main resonant elements 202 and 201 in the horizontal sub-array XS is also set to (½)λ$_0$±20%, where λ$_0$ is the free space wavelength of the frequency of the radio wave. In this case, the interval between the adjacent vertical sub-arrays YS shown in FIG. 33, i.e., the interval D3y between the PIN diodes 402-1 and 402-2 serving as the connection points of the parasitic resonant elements 302-1 and 302-2 is equal to diy in the Y-axis direction, and therefore becomes (½)λ$_0$±20% similarly to diy.

Therefore, in the present embodiment, when the reflection direction is set to the vertical direction (Y-axis direction) as shown in (b) in FIG. 34, since the interval between the horizontal sub-arrays in the Y-axis direction is about (½)λ$_0$, it is considered to be possible to reduce the angular region in which the reduction of the beam scanning angle due to the grating lobe occurs.

Example 3

Figure 35B:
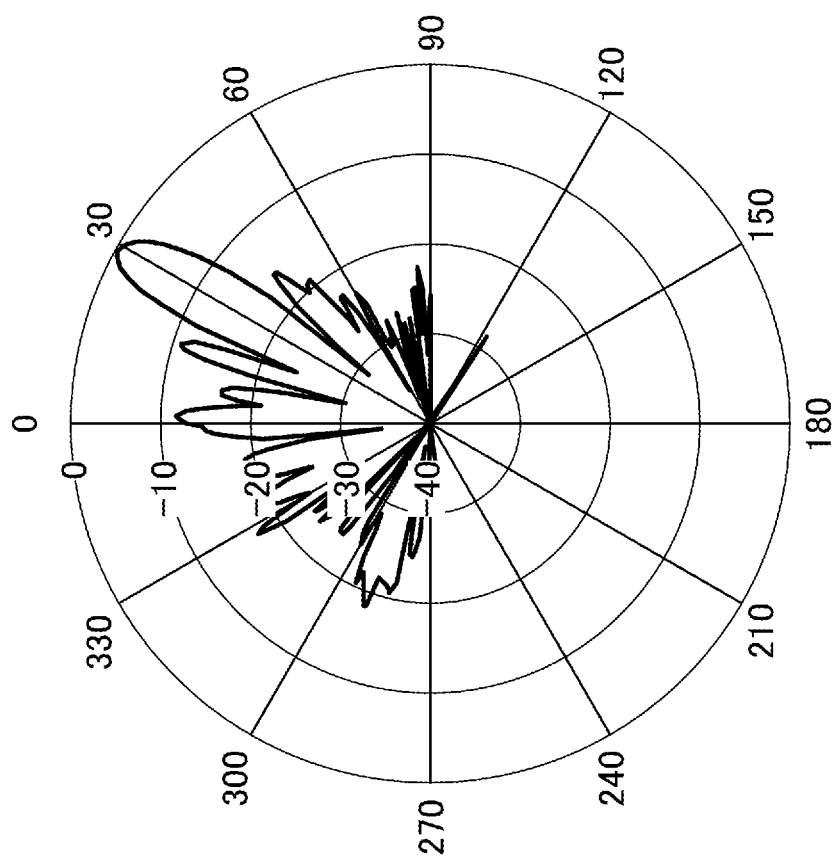
FIG. 35A and FIG. 35B are radar charts showing a reflection of a vertically polarized wave in the measurement model of the fourth embodiment at a target reflection angle of 0° and the target reflection angle of 30°.
Figure 35A:
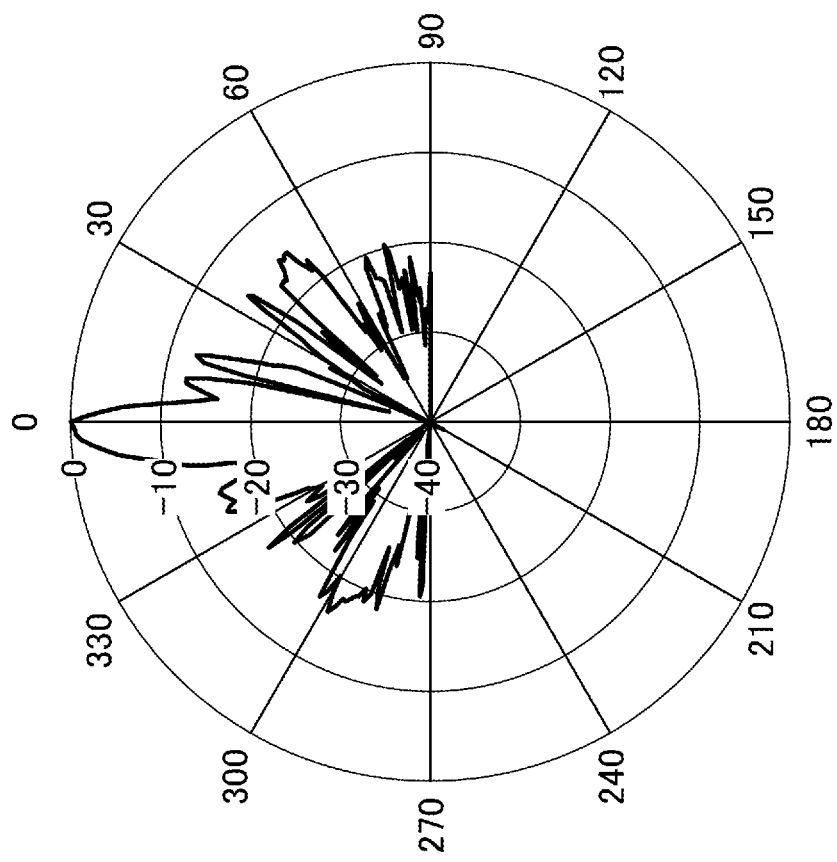

FIG. 35A and FIG. 35B show radar charts of the vertically polarized wave in the measurement model of the fourth embodiment. FIG. 35A shows the reflection when the target reflection angle is 0°, and FIG. 35B shows the reflection when the target reflection angle is 30°.

As shown in (b) in FIG. 34, the target reflection angle of 0° and the target reflection angle of 30° in this measurement are realized by turning ON/OFF the diode of the cell with respect to the vertically polarized wave.

In the case of the target angle of 0° shown in FIG. 35A, it can be seen that when a radio wave is incident from a direction orthogonal to the surface of the reflect array, the radio wave is found to be largely reflected in the direction of 0°. As a result, by controlling at the target angle of 0°, it is possible to reflect the radio wave in the direction of 0° which is the desired direction.

In the case of the target angle of 30° shown in FIG. 35B, when radio waves are incident from a direction orthogonal to the surface of the reflect array, the radio wave is found to be largely reflected in the direction of 30°. As a result, by controlling at the target angle of 30°, the radio wave can be reflected in the direction of 30°, which is the desired direction.

From this measurement result, it can be said that in the reflect array of this embodiment, the directivity of radio wave of the reflect array can be directed to a desired direction. In addition, since the radio wave is reflected at the target angle in both cases of the target angles of 0° and 30°, it can be said that the reflection angle with respect to the vertically polarized wave can be changed.

FIG. 35A and FIG. 35B show an example of measurement of vertical polarization, but in the case of horizontal polarization as well, it can be assumed that the directivity of radio waves of the reflect array can be directed to a desired direction in the reflect array of the present embodiment. In addition, it can be assumed that it is possible to change the angle with respect to the vertical polarization and the horizontal polarization while reducing the angle region in which the reduction of the beam scanning angle occurs due to the generation of the grating lobe.

(Variation for Reflect Array)

In the first to fourth embodiments, the reflect array included in the wireless communication apparatus has been described as a reflection plate capable of changing the reflection angle. However, the reflect array of the present invention may be a fixed reflect array that reflects radio waves in a direction different from an angle of specular reflection. Also in this case, a plurality of cells are regularly arranged in the reflect array. Each of the plurality of cells has at least two main resonant elements and at least one parasitic resonant element, and the parasitic resonant element is coupled to two or more adjacent main resonant elements.

As described above, exemplary reflect array and wireless communication apparatus according to the present disclosure have been described. However, the present disclosure is not limited to the specifically disclosed embodiments, and various variations, modifications and changes can be made without departing from the scope of the claims.

What is claimed is:

1. A reflect array that sets a reflection angle of a radio wave to an angle that is different from an angle of specular reflection, the reflect array comprising:
a plurality of cells arranged in an array,
wherein
each of the plurality of cells includes at least two main resonant elements and a parasitic resonant element coupled to the at least two main resonant elements,
an element interval of the main resonant elements is $(½)\lambda_g \pm 20\%$, where $\lambda_0$ is a free space wavelength of a frequency of the radio wave, and
the parasitic resonant element is configured to adjust a resonant frequency of the parasitic resonant element and adjust a reflection phase of a surface of the reflect array by adjusting a resonant frequency of the at least two main resonant elements each adjacent to the parasitic resonant element, the parasitic resonant element being coupled to the at least two main resonant elements each adjacent to the parasitic resonant element.

2. The reflect array according to claim 1, wherein
a main resonant element as a single element resonates at a main resonant frequency, each of the at least two main resonant elements being the main resonant element,
the parasitic resonant element as a single element resonates at a first parasitic resonant frequency or a second parasitic resonant frequency,
when the resonant frequency of the parasitic resonant element is set to the first parasitic resonant frequency in the cell, the parasitic resonant element is coupled to two or more adjacent main resonant elements to form a first state,
when the resonant frequency of the parasitic resonant element is set to the second parasitic resonant frequency in the cell, the parasitic resonant element is coupled to two or more adjacent main resonant elements to form a second state, and
an absolute value of a difference between a reflection phase in the first state and a reflection phase in the second state at a frequency of the radio wave is $180° \pm 45°$.

3. The reflect array according to claim 2, wherein
a fundamental mode of the first parasitic resonant frequency and a fundamental mode of the second parasitic resonant frequency are lower than the main resonant frequency of the main resonant element as a single element, and
one of higher-order modes of the first parasitic resonant frequency has a value that is the same as the main resonant frequency of the main resonant element as a single element or close to the main resonant frequency of the main resonant element as a single element so as to enable interaction.

4. The reflect array according to claim 2, wherein
when a difference between a frequency of an incident radio wave and the main resonant frequency of the main resonant element as a single element is within $\pm 20\%$ of the main resonant frequency of the main resonant element as a single element, the absolute value of the difference between the reflection phase in the first state and the reflection phase in the second state is $180° \pm 45°$.

5. The reflect array according to claim 2, wherein
the parasitic resonant element is configured to adjust the resonant frequency of the parasitic resonant element to the first parasitic resonant frequency or the second parasitic resonant frequency by electric control.

6. The reflect array according to claim 5, wherein
the parasitic resonant element is configured to adjust the resonant frequency to the first parasitic resonant frequency or the second parasitic resonant frequency by turning ON/OFF an electric switch, the electric switch being a PIN diode, an FET, or a transistor.

7. The reflect array according to claim 6, wherein
when electric control of the parasitic resonant element is ON, a resonant frequency of the parasitic resonant element closest to the main resonant frequency is set as a first parasitic resonant frequency of the parasitic resonant element as a single element, and
when the electric control of the parasitic resonant element is OFF, a resonant frequency of the parasitic resonant element closest to the main resonant frequency is set as a second parasitic resonant frequency of the parasitic resonant element as a single element,
a relation of | the first parasitic resonant frequency of the parasitic resonant element as a single element−the main resonant frequency of the main resonant element as a single element |<| the second parasitic resonant frequency of the parasitic resonant element as a single element−the main resonant frequency of the main resonant element as a single element | is satisfied, and
in the first state, the first parasitic resonant frequency of the parasitic resonant element as a single element and the main resonant frequency of the main resonant element as a single element interact to form two separated reconfigured frequencies.

8. The reflect array according to claim 7, wherein
the first parasitic resonant frequency of the parasitic resonant element as a single element and the main resonant frequency of the main resonant element as a single element satisfy a relation of | the first parasitic resonant frequency of the parasitic resonant element as a single element−the main resonant frequency of the main resonant element as a single element |/the main resonant frequency of the main resonant element as a single element≤3%.

9. The reflect array according to claim 1, wherein
the plurality of cells are regularly arranged, and
each of the plurality of cells includes two main resonant elements and one parasitic resonant element provided between the two main resonant elements.

10. The reflect array according to claim 1, wherein
each of the plurality of cells includes four main resonant elements arranged two by two in a vertical direction and a horizontal direction, and four parasitic resonant elements interposed between adjacent main resonant elements,
for each of the four main resonant elements, parasitic resonant elements, from among the four parasitic resonant elements, are provided adjacent to the main resonant element in two directions orthogonal to each other,
the parasitic resonant element interposed between the two vertically arranged main resonant elements couples the two vertically arranged main resonant elements adjacent to each other, and
the parasitic resonant element interposed between the two horizontally arranged main resonant elements couples the two horizontally arranged main resonant elements adjacent to each other.

11. The reflect array according to claim 1, wherein
each of the plurality of cells includes two main resonant elements and one parasitic resonant element coupled to the two main resonant elements so that the main resonant element, the parasitic resonant element, and the main resonant element are arranged in this order in a first direction,
the plurality of cells are provided in the first direction and in a second direction orthogonal to the first direction,
the main resonant elements are arranged at equal intervals in the first direction, and
the plurality of cells are arranged in a staggered manner such that a position in the first direction of the main resonant element on another end side in the first direction of a first cell coincides with a position in the first direction of the main resonant element on one end side in the first direction of a second cell adjacent to the first cell in the second direction.

12. The reflect array according to claim 1, wherein
a plurality of horizontal sub-arrays each including two main resonant elements and one parasitic resonant element coupled to the two main resonant elements such that the main resonant element, the parasitic resonant element, and the main resonant element are arranged in a horizontal direction, are arranged; and
a plurality of vertical sub-arrays each including two main resonant elements and one parasitic resonant element coupled to the two main resonant elements such that the main resonant element, the parasitic resonant element, and the main resonant element are arranged in a vertical direction, are arranged,
the main resonant elements are arranged at equal intervals in the vertical direction and the horizontal direction,
the plurality of horizontal sub-arrays are arranged in a staggered manner such that a position in the horizontal direction of the main resonant element on another end side in the horizontal direction of a first horizontal sub-array coincides with a position in the horizontal direction of the main resonant element on one end side in the horizontal direction of a second horizontal sub-array adjacent to the first horizontal sub-array in the vertical direction, and
the parasitic resonant element of the vertical sub-array is provided adjacent to the main resonant element of the first horizontal sub-array on the another end side in the horizontal direction and to the main resonant element of the second horizontal sub-array on the one end side in the horizontal direction, so that the plurality of horizontal sub-arrays are arranged in a staggered manner.

13. The reflect array according to claim 1, wherein
a main resonant element, each of the at least two main resonant elements being the main resonant element, has a side with a length of $(½)\lambda_g \pm 10\%$, where $\lambda_g$ is an effective wavelength of a frequency of the radio wave on the substrate.

14. The reflect array according to claim 1, wherein
a main resonant element, each of the at least two main resonant elements being the main resonant element, has a rectangular shape having a predetermined area or a shape obtained by partially cutting out a rectangular shape.

15. The reflect array according to claim 2, wherein
the parasitic resonant element includes two element parts, each having a H-shape, a h-shape or a U-shape, and including:
a first element that is parallel to one side of an adjacent main resonant element and is not in contact with the main resonant element;
a second element having one end in contact with the first element and extending in a direction away from the main resonant element; and
a third element that is in contact with the other end of the second element and is substantially parallel to the first element,
the third elements of the two element parts of the parasitic resonant element are coupled by a PIN diode,
when the PIN diode is ON, the two element parts are electrically connected to each other and the two element parts connected to each other resonate at a first parasitic resonant frequency, to be in a first state, and
when the PIN diode is OFF, the two element parts are electrically disconnected, and one element part resonates at a second parasitic resonant frequency, to be in a second state.

16. The reflect array according to claim 15, wherein a distance between the one side of the main resonant element and the first element of the parasitic resonant element is less than or equal to $(1/10)\lambda_g$, where $\lambda_g$ is an effective wavelength of a frequency of a radio wave on the substrate.

17. The reflect array according to claim 15, wherein
in the parasitic resonant element, an RF choke of two RF chokes is provided at one end of each third element of the two element parts, each of the two RF chokes being on a corresponding side of both sides of the PIN diode.

18. The reflect array according to claim 1, wherein
a main resonant element, each of the at least two main resonant elements being the main resonant element, and the parasitic resonant element are provided on a first surface of a substrate, and
a ground plane is provided on a surface of the substrate opposite the first surface.

19. The reflect array according to claim 1, wherein
a frequency band of radio waves incident on the reflect array is a range of 0.3 GHz to 100 GHz.

20. A wireless communication apparatus comprising:

the reflect array according to claim 1; and a controller to which a reflection direction instruction is input and which controls reflection angles of the plurality of cells of the reflect array.

21. A reflect array that reflects a radio wave in a direction different from a direction of specular reflection, the reflect array comprising:

a plurality of cells arranged regularly, wherein each of the plurality of cells includes at least two main resonant elements and at least one parasitic resonant element, an element interval of the main resonant elements is $(½)\lambda_g \pm 20\%$, where $\lambda_g$ is a free space wavelength of a frequency of the radio wave, and the parasitic resonant element is coupled to the at least two adjacent main resonant elements.

* * * * *